United States Patent
Cheadle et al.

(10) Patent No.: US 11,407,330 B2
(45) Date of Patent: Aug. 9, 2022

(54) THERMAL MANAGEMENT SYSTEMS AND HEAT EXCHANGERS FOR BATTERY THERMAL MODULATION

(71) Applicant: Dana Canada Corporation, Oakville (CA)

(72) Inventors: Brian E. Cheadle, Brampton (CA); Michael J. R. Bardeleben, Oakville (CA); Doug Vanderwees, Mississauga (CA)

(73) Assignee: DANA CANADA CORPORATION, Oakville (CA)

( * ) Notice: Subject to any disclaimer, the term of this patent is extended or adjusted under 35 U.S.C. 154(b) by 216 days.

(21) Appl. No.: 16/426,368

(22) Filed: May 30, 2019

(65) Prior Publication Data

US 2019/0366876 A1    Dec. 5, 2019

Related U.S. Application Data

(60) Provisional application No. 62/744,294, filed on Oct. 11, 2018, provisional application No. 62/677,824, filed on May 30, 2018.

(51) Int. Cl.
*B60L 58/26* (2019.01)
*F28D 9/00* (2006.01)
(Continued)

(52) U.S. Cl.
CPC .............. *B60L 58/26* (2019.02); *F28D 1/035* (2013.01); *F28D 1/0308* (2013.01);
(Continued)

(58) Field of Classification Search
CPC ...... F28D 1/0308; F28D 1/0358; F28D 1/035; F28D 1/0366; F28D 1/0383;
(Continued)

(56) References Cited

U.S. PATENT DOCUMENTS

RE35,890 E    9/1998   So
6,273,182 B1  8/2001   Pautler
(Continued)

FOREIGN PATENT DOCUMENTS

CN    106532178    3/2017
CN    106785192    5/2017
(Continued)

OTHER PUBLICATIONS

Regenerative Braking—Leis-Pretto (Nov. 2017) (Year: 2017).*
(Continued)

*Primary Examiner* — Jenna M Hopkins
(74) *Attorney, Agent, or Firm* — McCoy Russell LLP

(57) ABSTRACT

A heat exchanger such as a cold plate or ICE plate has an integrated electric heating element provided on an external heater support surface of the heat exchanger. The external heater support surface is directly opposite to an internal surface of the heat exchanger which at least partly defines one or both of the inlet manifold and the outlet manifold. A thermal management system for a vehicle having a plurality of rechargeable battery units includes a circulation loop for circulating a first volume of the heat transfer fluid, and a plurality of battery heat exchangers, including a first heat exchanger with an integrated electric heating element. A sub-loop of the circulation loop includes the internal fluid flow passage of the first heat exchanger, and is adapted for a second, smaller volume of the heat transfer fluid.

34 Claims, 44 Drawing Sheets

(51) Int. Cl.
| | |
|---|---|
| *H01M 10/613* | (2014.01) |
| *H01M 10/625* | (2014.01) |
| *F28F 3/02* | (2006.01) |
| *F28D 1/03* | (2006.01) |
| *H01M 10/60* | (2014.01) |
| *H01M 10/6551* | (2014.01) |
| *H01M 10/6568* | (2014.01) |
| *H01M 6/50* | (2006.01) |
| *H01M 10/6552* | (2014.01) |
| *F28F 3/12* | (2006.01) |
| *F28F 3/14* | (2006.01) |

(52) U.S. Cl.
CPC ......... *F28D 1/0341* (2013.01); *F28D 1/0358* (2013.01); *F28D 1/0366* (2013.01); *F28D 1/0383* (2013.01); *F28D 9/0025* (2013.01); *F28D 9/0056* (2013.01); *F28D 9/0062* (2013.01); *F28D 9/0068* (2013.01); *F28F 3/02* (2013.01); *F28F 3/025* (2013.01); *F28F 3/12* (2013.01); *F28F 3/14* (2013.01); *H01M 6/5038* (2013.01); *H01M 10/60* (2015.04); *H01M 10/613* (2015.04); *H01M 10/625* (2015.04); *H01M 10/6551* (2015.04); *H01M 10/6552* (2015.04); *H01M 10/6568* (2015.04); *H01M 2220/20* (2013.01)

(58) Field of Classification Search
CPC .... F28D 1/0341; F28D 9/0025; F28D 9/0012; F28D 9/0056; F28D 9/0068; F28F 3/02; F28F 3/12; F28F 3/14; H01M 10/60; H01M 10/625; H01M 10/6551; H01M 10/6552; H01M 10/6568; H01M 6/5038; H01M 10/613; B60L 58/26; B60L 3/0046
See application file for complete search history.

(56) References Cited

U.S. PATENT DOCUMENTS

| | | | |
|---|---|---|---|
| 7,416,801 | B2 | 8/2008 | Isogai |
| 7,547,482 | B2 | 6/2009 | Gallagher |
| 7,841,431 | B2 | 11/2010 | Zhou |
| 8,653,423 | B2 | 2/2014 | Olding |
| 9,373,873 | B2 * | 6/2016 | Lev ..................... H01M 10/625 |
| 9,379,392 | B2 | 6/2016 | Yan |
| 9,553,346 | B2 | 1/2017 | Hermann |
| 9,755,283 | B2 * | 9/2017 | Hirsch ..................... B60L 58/26 |
| 9,796,241 | B2 | 10/2017 | Takeuchi |
| 10,005,339 | B2 | 6/2018 | Kakade |
| 10,040,363 | B2 | 8/2018 | Beaston |
| 2009/0317694 | A1 | 12/2009 | Aengquist |
| 2011/0070511 | A1 | 3/2011 | Nelson |
| 2011/0318626 | A1 * | 12/2011 | Bartenschlager ....... B60L 50/66 429/120 |
| 2012/0070511 | A1 | 3/2012 | Lampidis |
| 2013/0108896 | A1 | 5/2013 | Daniel |
| 2014/0038009 | A1 * | 2/2014 | Okawa .............. H02J 7/007192 429/62 |
| 2014/0227568 | A1 * | 8/2014 | Hermann ............ H01M 10/482 429/62 |
| 2015/0053385 | A1 * | 2/2015 | Said .................... F28D 1/05316 165/174 |
| 2015/0200427 | A1 | 7/2015 | Haskins |
| 2016/0020496 | A1 | 1/2016 | Burrows |
| 2016/0204486 | A1 * | 7/2016 | Kenney ..................... F28F 3/12 429/120 |
| 2017/0133731 | A1 | 5/2017 | Hermann |
| 2017/0200993 | A1 * | 7/2017 | Song ................. H01M 10/6568 |
| 2017/0214008 | A9 | 7/2017 | Mardall |
| 2018/0108956 | A1 | 4/2018 | Fortenbacher |
| 2018/0118174 | A1 | 5/2018 | Moskowitz |

FOREIGN PATENT DOCUMENTS

| | | |
|---|---|---|
| JP | 2013098081 | 5/2013 |
| WO | 2013008882 | 1/2013 |
| WO | 2017218906 | 12/2017 |
| WO | 2019062590 | 4/2019 |

OTHER PUBLICATIONS

Canadian Patent Office, International Search Report and Written Opinion in Application No. PCT/CA2019/050744, dated Jul. 29, 2019, 10 pages, Gatineau, Quebec Canada.

The Chevrolet Volt Cooling/Heating Systems Explained, GM-VOLT: Chevy Volt Electric Car Site, https://gm-volt.com/2010/12/09, 9 pages, archive for Dec. 9, 2010.

* cited by examiner

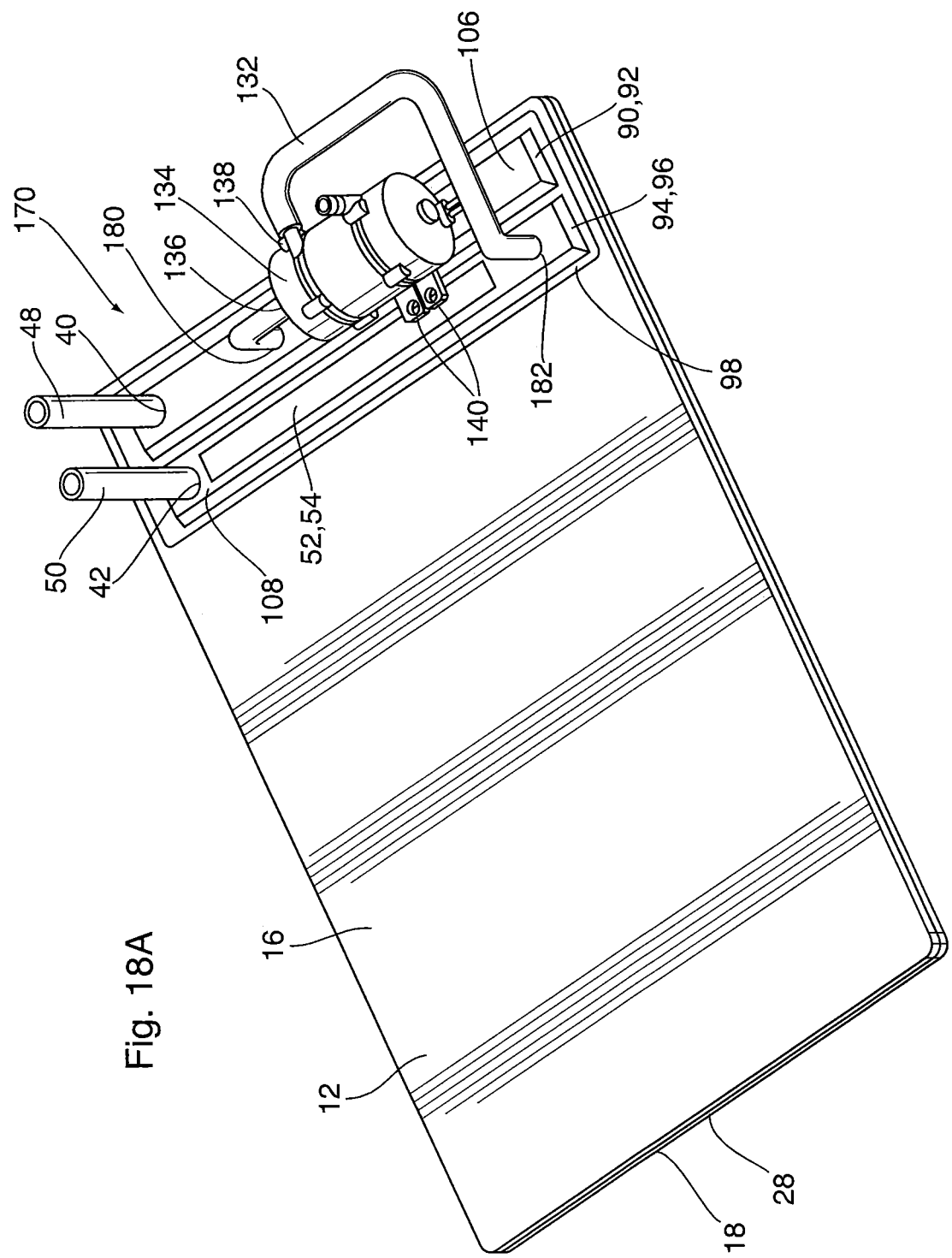

THERMAL MANAGEMENT SYSTEMS AND HEAT EXCHANGERS FOR BATTERY THERMAL MODULATION

CROSS-REFERENCE TO RELATED APPLICATIONS

This application claims priority to and the benefit of U.S. Provisional Patent Application No. 62/677,824 filed May 30, 2018; and U.S. Provisional Patent Application No. 62/744,294 filed Oct. 11, 2018; the contents of which are incorporated herein by reference.

TECHNICAL FIELD

The present disclosure relates to thermal management of rechargeable batteries within an energy storage system of a battery electric vehicle (BEV) or hybrid electric vehicle (HEV), and particularly to systems and heat exchangers adapted for rapidly warming up the rechargeable batteries under cold start conditions, and for cooling the rechargeable batteries once they reach their desired operating temperature range.

BACKGROUND

Energy storage systems such as those used in BEVs and HEVs comprise rechargeable batteries, such as lithium-ion batteries. A typical rechargeable battery for a BEV or HEV will comprise a number of battery modules which are electrically connected together in series and/or in parallel to provide the battery with the desired system voltage and capacity. Each battery module comprises a plurality of battery cells which are electrically connected together in series and/or parallel, wherein the battery cells may be in the form of pouch cells, prismatic cells or cylindrical cells. The operation of the battery may be endothermic or exothermic, depending on temperature conditions.

These rechargeable batteries suffer performance, range, reliability and life reduction losses when operated or charged at temperatures much below 0° C., and especially below −5° C. Ideally, the rechargeable battery should be brought to a temperature of about 5-20° C. as quickly as possible from a cold start. However, the amount of energy required to heat the battery to this temperature range can be considerable, and the time required for heating too long. For example, it can take up to 30 minutes and 6.12 MJ (1.7 kWhr) of energy to heat a 16 kW battery from −30° C. to 10° C.

There is a need for thermal management systems and heat exchangers which will decrease heating time and energy consumption of the energy storage system under cold start conditions, and which will cool the energy storage system once it reaches its operating temperature range.

SUMMARY

In accordance with an aspect of the present disclosure, there is provided a thermal management system for a vehicle having an energy storage system including a plurality of rechargeable battery units.

According to an aspect, the thermal management system comprises a battery cooling/heating subsystem, comprising a circulation loop for circulating a first volume of the heat transfer fluid throughout the battery cooling/heating subsystem. The circulation loop comprises a plurality of conduits for transporting the heat transfer fluid.

According to an aspect, the thermal management system further comprises a plurality of battery heat exchangers provided in the circulation loop. Each of the battery heat exchangers is in thermal contact with one or more of the battery units, each of the battery heat exchangers having an internal fluid flow passage and plurality of fluid openings including an inlet and an outlet of the internal fluid flow passage.

According to an aspect, the thermal management system further comprises an electric heating element integrated with a first battery heat exchanger of the plurality of battery heat exchangers so as to heat the heat transfer fluid flowing through the internal fluid flow passage of the first heat exchanger.

According to an aspect, the thermal management system further comprises a sub-loop of the circulation loop. The sub-loop comprises one or more of the conduits, which are in fluid flow communication with the inlet and outlet of the fluid flow passage of the first battery heat exchanger. The sub-loop further comprises the internal fluid flow passage of the first battery heat exchanger.

According to an aspect, the sub-loop is adapted for circulation of a second volume of the heat transfer fluid, wherein the second volume is less than the first volume and comprises a volume of the fluid flow passage of the first battery heat exchanger.

In accordance with another aspect of the present disclosure, there is provided a battery heat exchanger which comprises a first plate having an inner surface and an outer surface; a second plate having an inner surface and an outer surface, wherein the first and second plates are joined together with their inner surfaces in opposed facing relation to one another, and with portions of the inner surfaces being spaced apart from one another.

According to an aspect, the battery heat exchanger further comprises a plurality of fluid flow passages adapted for flow of a heat transfer fluid, and located between the spaced apart portions of the inner surfaces of the first and second plates.

According to an aspect, the battery heat exchanger further comprises an inlet port for supplying the heat transfer fluid to the plurality of fluid flow passages; an outlet port for discharging the heat transfer fluid from the plurality of fluid flow passages; an inlet manifold in fluid communication with the inlet port and the plurality of fluid flow passages, the inlet manifold defining a fluid distribution chamber in which the heat transfer fluid supplied through the inlet port is distributed to the plurality of fluid flow passages; and an outlet manifold in fluid communication with the outlet port and the plurality of fluid flow passages, the outlet manifold defining a fluid collection chamber in which the heat transfer fluid discharged through the outlet port is collected from the plurality of fluid flow passages.

According to an aspect, the battery heat exchanger further comprises an electric heating element having an area; and an external heater support surface on which the electric heating element is provided and having an area which is the same as the area of the electric heating element, wherein the external heater support surface is directly opposite to an internal surface of the first battery heat exchanger which at least partly defines one or both of the inlet manifold and the outlet manifold.

BRIEF DESCRIPTION OF THE DRAWINGS

Exemplary embodiments of the present disclosure will now be described, by way of example, with reference to the accompanying drawings, in which:

FIG. 18A is a top perspective view of a heat exchanger according to a seventh embodiment;

DETAILED DESCRIPTION

Figure 1:
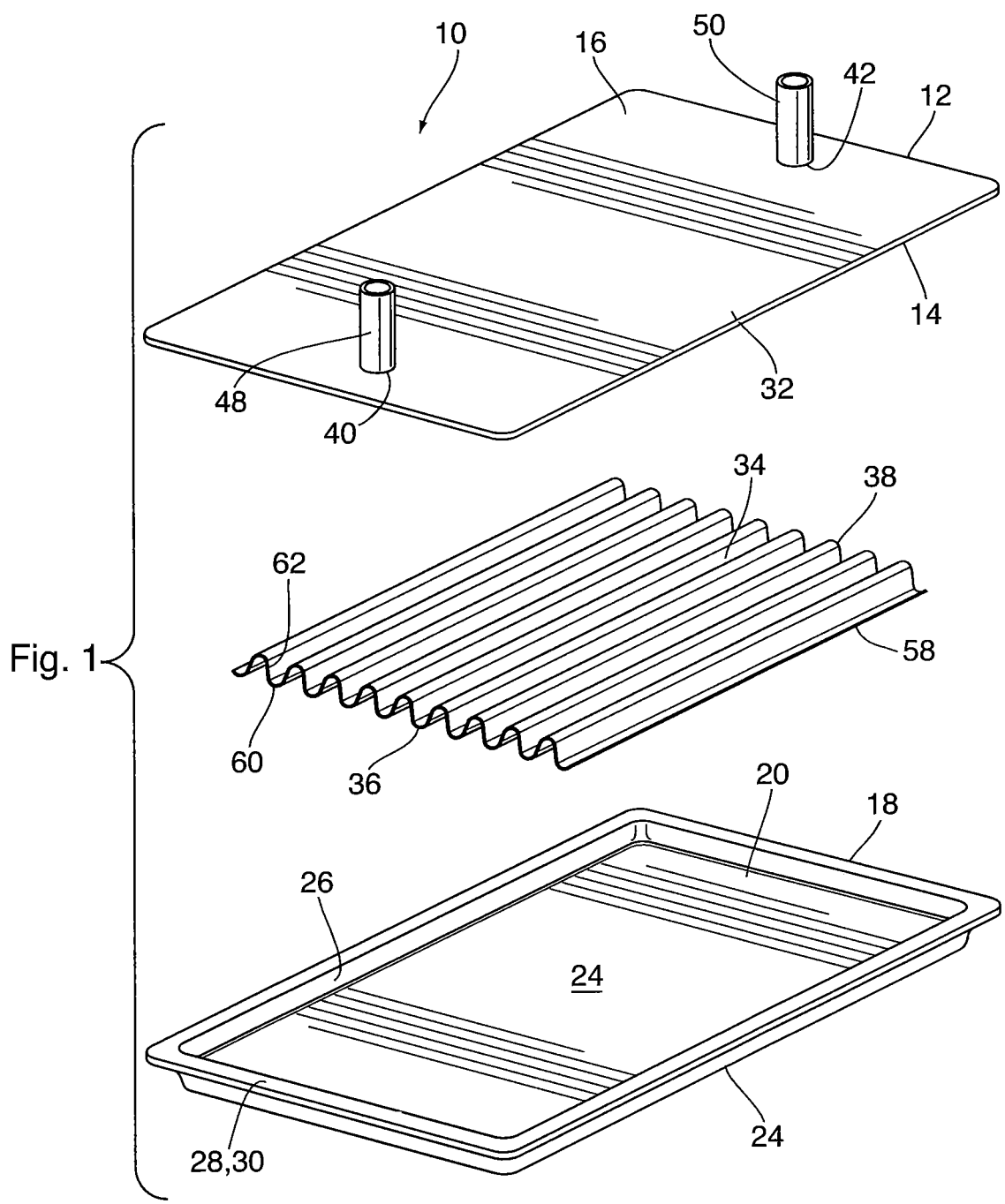
FIG. 1 is an exploded perspective view of a heat exchanger according to a first embodiment.

FIGS. 1 to 4 illustrate a heat exchanger 10 according to a first embodiment, adapted for heating and cooling a portion of the rechargeable battery of a BEV or HEV, as further discussed below.

Heat exchanger 10 comprises a first plate 12 having an inner surface 14 and an opposite outer surface 16. In the present embodiment the first plate 12 and the inner and outer surfaces 14, 16 are substantially flat and planar.

Heat exchanger 10 further comprises a second plate 18 having an inner surface 20 and an opposite outer surface 22. The second plate 18 of heat exchanger 10 is shaped, for example by stamping, drawing or molding, such that it has a generally flat, planar base 24 surrounded on all sides by a raised peripheral sidewall 26 extending from the base 24 to a planar flange 28 defining a planar peripheral sealing surface 30 on the inner surface 20 of second plate 18.

The first and second plates 12, 18 are sealingly joined together with their inner surfaces 14, 20 in opposed facing relation to one another, and with portions of the inner surfaces 14, 20 being spaced apart from one another. In particular, in the present embodiment, the planar peripheral sealing surface 30 on the inner surface 20 of second plate 18 is sealingly joined to a planar, peripheral sealing surface 32 on the inner surface 14 of first plate 12, and with portions of the inner surfaces 14, 20 inward of respective sealing surfaces 32, 30 being spaced apart from one another.

The first and second plates 12, 18 may be comprised of aluminum or alloys thereof, and may be joined together by brazing in a brazing oven. Although the first and second plates 12, 18 are shown as having the same or similar thickness, the first plate 12 may comprise a heat sink having a thickness which is greater than that of the second plate 18.

Heat exchanger 10 further comprises a plurality of fluid flow passages 34 adapted for flow of a heat transfer fluid, and located between the spaced apart portions of the inner surfaces 14, 20 of the first and second plates 12, 18. The shapes and arrangement of the fluid flow passages 34 are variable, and are not limited by the present disclosure. For example, in the present embodiment, the individual fluid flow passages 34 are straight, and extend in a lengthwise or longitudinal direction between opposite ends of the heat exchanger 10. The fluid flow passages 34 each have a first end 36 and a second end 38. The first and second ends 36, 38 of fluid flow passages 34 are open and are located proximate to opposite ends of the heat exchanger 10. Where the heat exchanger 10 is used for heating and/or cooling a portion of a rechargeable vehicle battery, the area of heat exchanger 10 occupied by fluid flow passages 34 at least generally corresponds to an area of the external surface of heat exchanger 10 which will be in thermal contact with at least one battery cell and/or battery, module of the vehicle battery.

Heat exchanger 10 further comprises a first fluid port 40 and a second fluid port 42, each of which may either be the inlet port or the outlet port. In the following description the first fluid port 40 is sometimes referred to as the "inlet port", and the second fluid port 42 is sometimes referred to as the "outlet port". The first fluid port 40 is provided for supplying the heat transfer fluid to the first ends 36 of the plurality of fluid flow passages 34, while the outlet port 42 is provided for discharging the heat transfer fluid from the second ends 38 of the plurality of fluid flow passages 34. In the present embodiment, the inlet and outlet ports 40, 42 are spaced apart in the longitudinal direction and are located proximate to opposite ends of the heat exchanger 10. More specifically, the inlet port 40 is located between the first ends 36 of the fluid flow passages 34 and the sealingly joined surfaces 30, 32 at one end of the heat exchanger 10, and the outlet port 42 is located between the second ends 38 of the fluid flow passages 34 and the sealingly joined surfaces 30, 32 at the other end of the heat exchanger 10.

Further, in the present embodiment, the inlet and outlet ports 40, 42 of heat exchanger 10 comprise apertures in the first plate 12 and are located inwardly of the planar peripheral sealing surface 32 thereof.

Heat exchanger 10 further comprises a first manifold 44 and a second manifold 46, which are designated the "inlet manifold" and the "outlet manifold" in the following description. The inlet manifold 44 is in fluid communication with the inlet port 40 and with the plurality of fluid flow passages 34 through the first ends 36 thereof. The inlet manifold 44 defines a fluid distribution chamber in which the heat transfer fluid supplied through the inlet port 40 is distributed to the first ends 36 of the plurality of fluid flow passages 34. In the present embodiment, the inlet manifold 44 is defined as the space bounded on its top and bottom by the inner surfaces 14, 20 of the first and second plates 12, 18, and bounded along its edges by the sealing surfaces 32, 30 of plates 12, 18, and by the first ends 36 of the plurality of fluid flow passages 34.

Similarly, the outlet manifold 46 is in fluid communication with the outlet port 42 and with the plurality of fluid flow passages 34, through the second ends 38 thereof. The outlet manifold 46 defines a fluid collection chamber in which the heat transfer fluid discharged from the second ends 38 of fluid flow passages 34 is collected before being discharged through the outlet port 42. In the present embodiment, the outlet manifold 46 is defined as the space bounded on its top and bottom by the inner surfaces 14, 20 of the first and second plates 12, 18, and bounded along its edges by the sealing surfaces 32, 30 of plates 12, 18, and the second ends 38 of the plurality of fluid flow passages 34.

The first fluid port 40 of heat exchanger 10 is provided with a first tubular fitting 48 and the second fluid port 42 is provided with a second tubular fitting 50, the fittings 48, 50 allowing flow communication between the fluid flow passages 34 and a fluid circulation system (not shown) of the vehicle. In the following description the first tubular fitting 48 is sometimes referred to as the "inlet fitting", and the second tubular fitting 50 is sometimes referred to as the "outlet fitting".

Heat exchanger 10 further comprises at least one electric heating element 52 which is provided on an external heater support surface 54, wherein the area of the electric heating element 52 is the same as the area of the heater support surface 54, such that each support surface. 54 is defined as a portion of the external surface of heat exchanger 10 which is occupied by an electric heating element 52. In the present embodiment the external surface of heat exchanger 10 includes the outer surfaces 16, 22 of first and second plates 12, 18.

Each electric heating element 52 and its corresponding external heater support surface 54 are located directly opposite to an internal surface of the heat exchanger 10 which at least partly defines one or both of the inlet manifold 44 and the outlet manifold 46. The inventors have found that partial or complete alignment of the electric heating element 52 and the external heater support surface 54 with one or both of the manifolds 44, 46 provides a more uniform temperature distribution throughout the area of the heat exchanger 10, within the heat transfer fluid flowing through the heat exchanger 10, and throughout the external surface of heat exchanger 10, as compared to locating the electric heating element 52 and the external heater support surface 54 only between the ends 36, 38 of fluid flow passages 34. Where the heat exchanger 10 is used for heating one or more battery cells and/or battery modules of a rechargeable vehicle battery which is/are in thermal contact with the external surface of the heat exchanger 10, a uniform temperature distribution throughout the area of heat exchanger 10 ensures uniform heating of the battery cell(s) and/or battery module(s), and avoids hot spots which could negatively affect battery performance and longevity.

Figure 2:
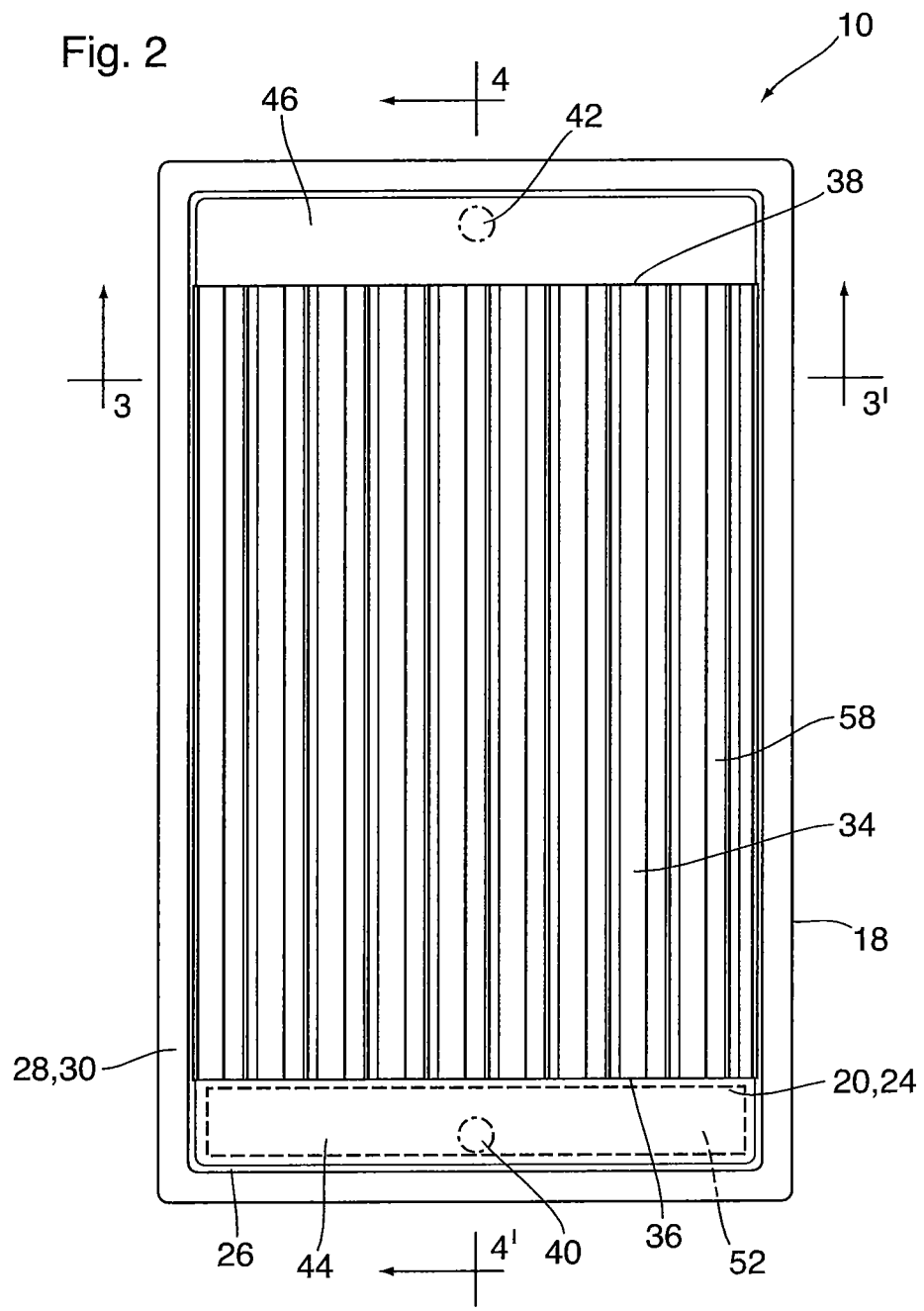
FIG. 2 is a top plan view of the heat exchanger of FIG. 1, with the first plate removed.
Figure 3:
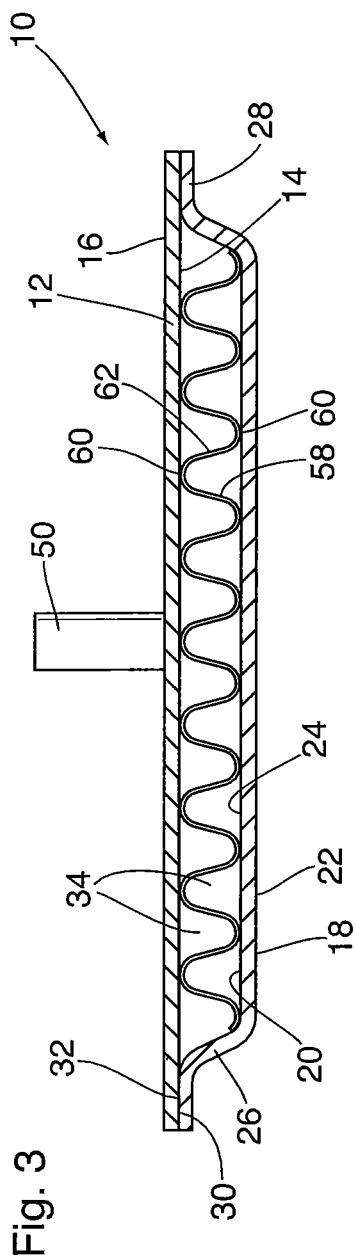
FIG. 3 is a transverse cross-section along line 3-3' of FIG. 2.
Figure 4:
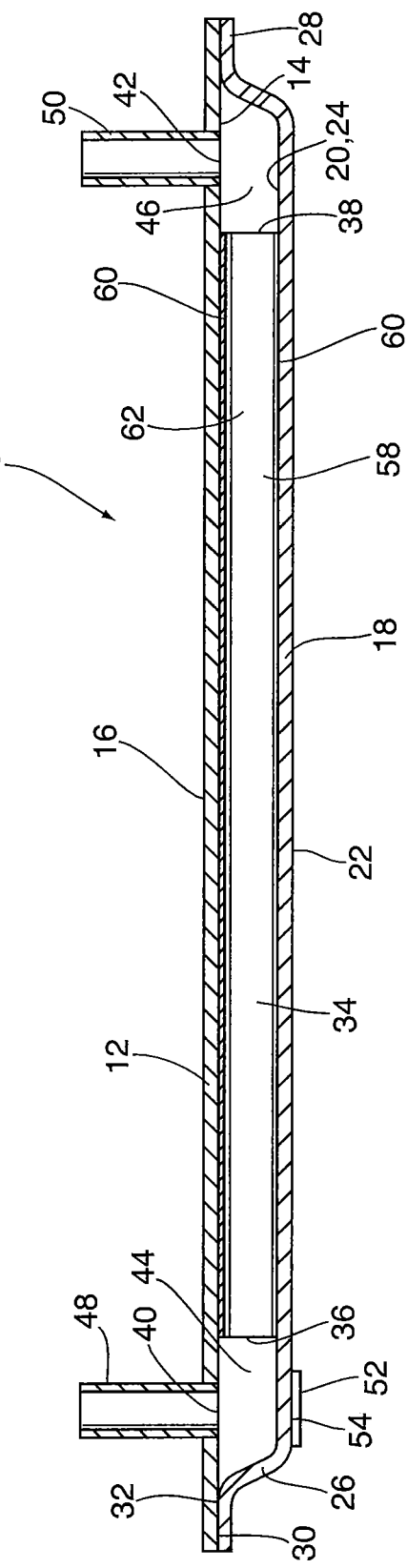
FIG. 4 is a longitudinal cross-section along line 4-4' of FIG. 2.

In the embodiment of FIGS. 2 to 4, the external heater support surface 54 on which electric heating element 52 is provided is part of the outer surface 22 of second plate 18, and specifically a portion of the outer surface 22 which is directly opposite to a portion of the inner surface 20 which defines the bottom wall of first manifold 44, which may either be the inlet manifold or outlet manifold. With the electric heating element 52 and the external heater support surface 54 provided in this location, the electric heating element 52 will heat the fluid as it passes through the inlet manifold 44.

Figure 5:
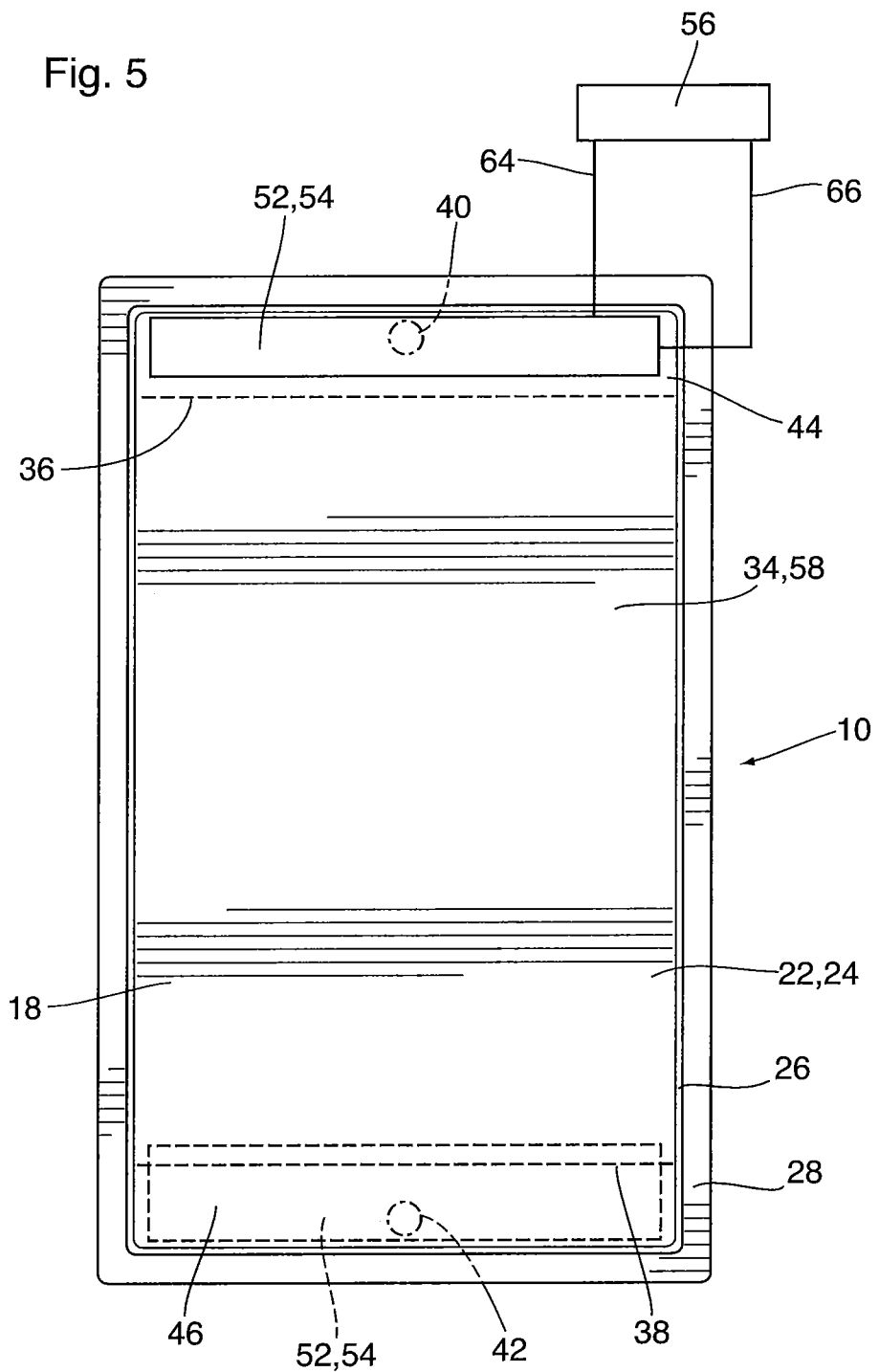
FIG. 5 is a bottom plan view of the heat exchanger of FIG. 1.

In a variant of the first embodiment shown in the bottom plan view of FIG. 5, heat exchanger 10 has an external heater support surface 54 and electric heating element 52 which are part of the outer surface 16 or 22 of the first or second plate 12 or 18, and specifically a portion of the outer surface 16 or 22 which is directly opposite to a portion of the inner surface 14 which defines the top or bottom wall of the second manifold 46. For example, FIG. 5 shows an external heater support surface 54 and a second heating element 52 (in dotted lines) which are located directly opposite to a portion of the inner surface 20 which defines the bottom wall of second manifold 46. Either one or both of the heating elements 52 may be provided in heat exchanger 10.

Figure 6:
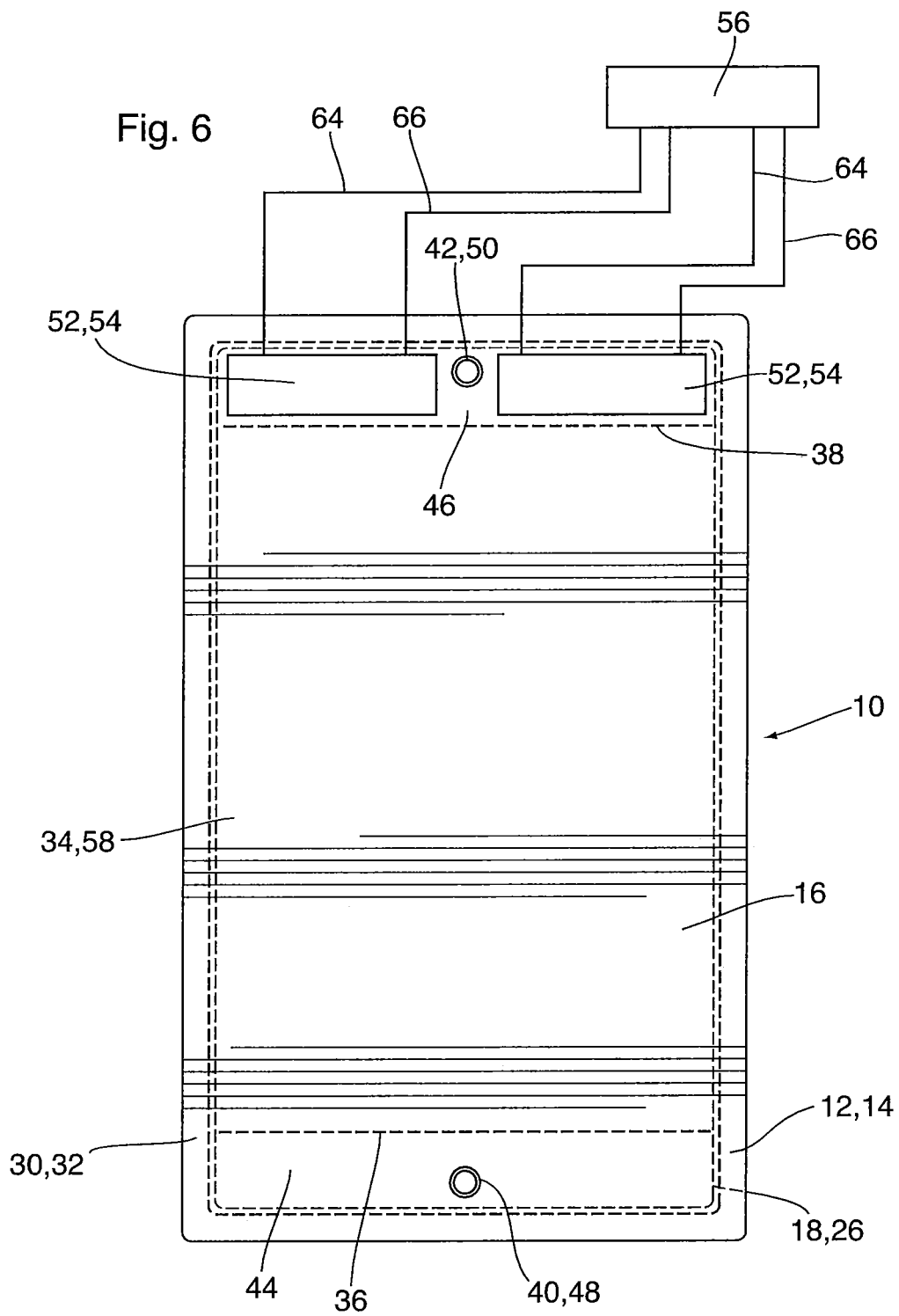
FIG. 6 is a top plan view showing a variation of the heat exchanger of FIG. 1.

In another variant of the first embodiment shown in the top plan view of FIG. 6, a pair of external heater support surfaces 54 and a pair of electric heating elements 52 are provided on the outer surface 16 of first plate 12, either in addition to or instead of the external heater support surface(s) 54 and electric heating element(s) 52 provided on the second plate 18. In particular, the external heater support surfaces 54 and electric heating elements 52 of FIG. 6 are provided on a portion of the outer surface 16 which is directly opposite to a portion of the inner surface 14 which defines the top wall of the second manifold 46, which may be the inlet or outlet manifold. In this location the electric heating element 52 will heat the fluid as it passes through the second manifold 46.

As shown in FIG. 6, the locations of the inlet and outlet ports 40, 42 and fittings 48, 50 may interfere with locating the electric heating element 52 and external heater support surface 54 on the first plate 12, opposite to the first and/or second manifold 44, 46. Accordingly, the external heater support surfaces 54 and electric heating elements 52 are provided on either side of the fitting 50 in FIG. 6. To avoid this interference, the fittings 48, 50 projecting from the first plate 12 may be replaced by "side entry" ports and fittings located along the edges of heat exchanger 10 as is known in the art.

In some embodiments, a portion of the electric heating element 52 and external heater support surface 54 may overlap the area of heat exchanger 10 occupied by fluid flow passages 34. For example, as shown in FIG. 5, the electric heating element 52 and external heater support surface 54 (in dotted lines) provided at second manifold 46 overlap the second end 38 of the fluid flow passages 34.

The electric heating element 52 may comprise a surface film heater comprising one or more layers, as described in commonly assigned International Patent Application No. PCT/CA 2019/050283 filed on Mar. 7, 2019 and entitled "Heat Exchanger With Integrated Electrical Heating Element", and incorporated herein by reference in its entirety. The electric heating element 52 will typically include at least one layer of conductive material through which an electric current is supplied to the heating element 52, and at least one layer of a resistive material to convert the electric current into heat energy. Where the heat exchanger 10 is comprised of aluminum or an aluminum alloy, the electric heating element 52 may comprise a surface film heater which is capable of bonding directly to an aluminum substrate, and which may be applied to the external heater support surface 54 by a screen printing process, as described more completely in above-mentioned US Provisional Patent Application No. PCT/CA 2019/050283 and in U.S. Pat. No. 8,653,423, which is also incorporated herein by reference in its entirety.

Heat exchanger 10 may further comprise a turbulence-enhancing insert 58 such as a corrugated fin or a turbulizer in order to provide increased turbulence and surface area for heat transfer, thereby enhancing heat transfer from the electrical heating element. 52 to the fluid in fluid flow passages 34. The turbulence-enhancing insert 58 also provides structural support for the first and second plates 12, 18, thereby enhancing rigidity of the heat exchanger 10. Also, as further described below, the turbulence-enhancing insert 58 defines the plurality of fluid flow passages 34 of heat exchanger 10.

As used herein, the terms "fin" and "turbulizer" are intended to refer to corrugated turbulence-enhancing inserts 58 having a plurality of ridges or crests 60 connected by side walls 62, with the ridges being rounded or flat. As defined herein, a "fin" has continuous ridges whereas a "turbulizer" has ridges which are interrupted along their length to provide a tortuous flow path. Turbulizers are sometimes referred to as offset or lanced strip fins, and examples of such turbulizers are described in U.S. Pat. No. Re. 35,890 (So) and U.S. Pat. No. 6,273,183 (So et al.). The patents to So and So et al. are incorporated herein by reference in their entireties.

In heat exchanger 10, the turbulence-enhancing insert 58 comprises a corrugated fin which is oriented inside the space between plates 12, 18 with its ridges 60 arranged parallel to the direction of fluid flow through the fluid flow passage 34 (i.e. the longitudinal direction), with each ridge 60 being in contact with the inner surface 14 or 20 of the first or second plate 12 or 18, such that adjacent fluid flow passages 34 are separated from one another by the side walls 62. In some embodiments, the ridges 60 of the turbulence-enhancing insert 58 are metallurgically bonded to the inner surfaces 14, 20 of first and second plates 12, 18.

In use, one or more battery cells and/or battery modules are mounted on or placed in contact with the outer surface 16 of the first plate 12 and/or the outer surface 22 of the second plate 18, in areas of outer surfaces 16 and/or 22 corresponding to the area of the plurality of fluid flow passages 34. Heat exchanger 10 comprises a "cold plate" in which the outer surface 16 of the first plate 12 provides a flat upper surface upon which one or more battery cells and/or battery modules is supported in thermal contact with the outer surface 16.

When it is desired to use heat exchanger 10 to heat the battery cells and/or modules supported thereon, an electrical power supply 56 provides electrical energy to the electric heating element 52 through conductive leads 64, 66 while heat transfer fluid is circulated through the fluid flow passages 34. When it is desired to use heat exchanger 10 to cool the battery cells and/or modules supported thereon, electrical power supply 56 is de-activated such that heat is no longer produced by the electrical heating element 52, while a heat transfer fluid of lower temperature than the battery cells and/or modules is circulated through the fluid flow passage 34 to absorb heat generated by the battery cells and/or modules. Accordingly, in cooling mode, the heat exchanger 10 functions as a conventional cold plate heat exchanger 10 for battery cooling.

Figure 7:
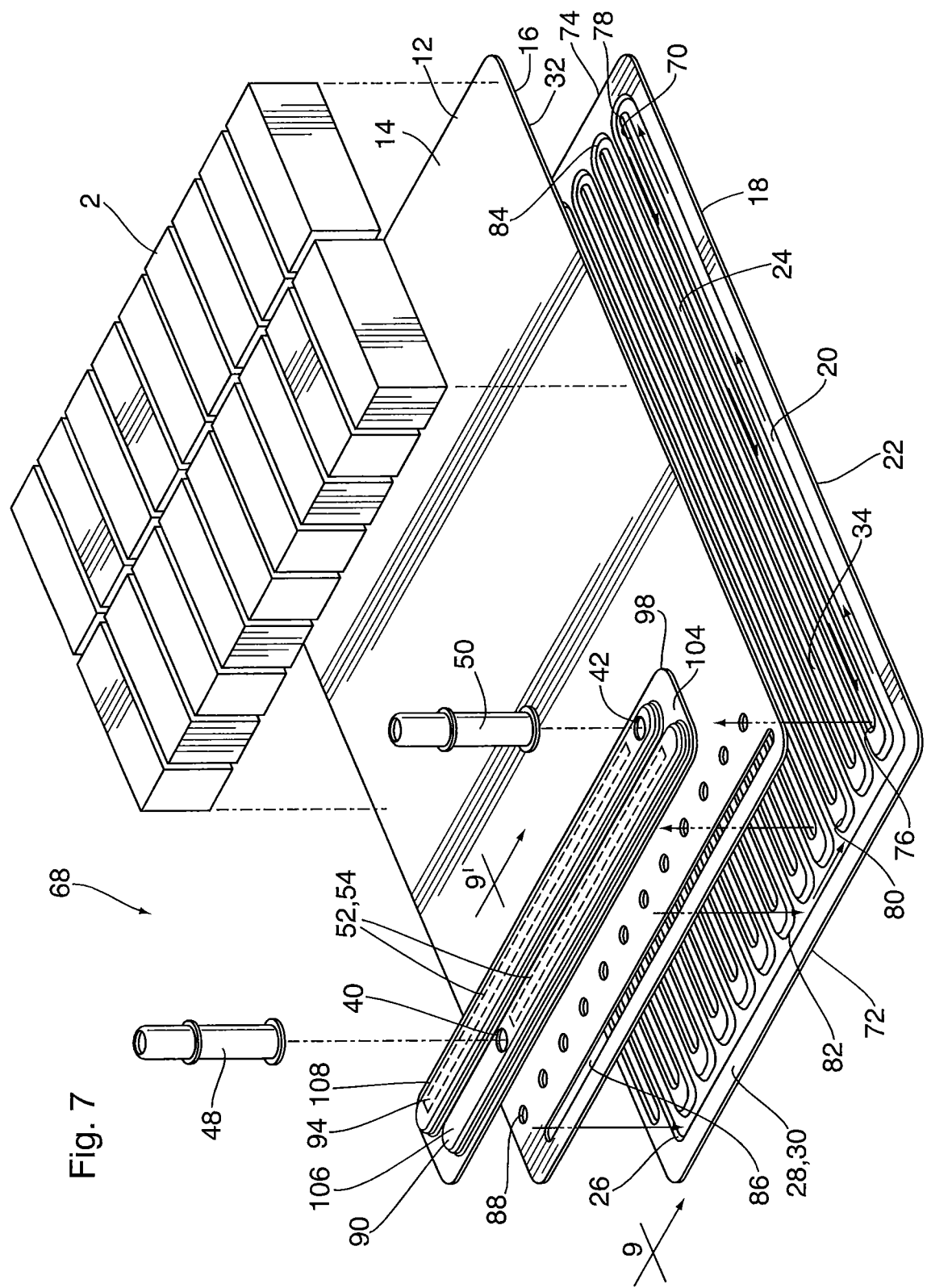
FIG. 7 is an exploded perspective view of a heat exchanger according to a second embodiment.
Figure 8:
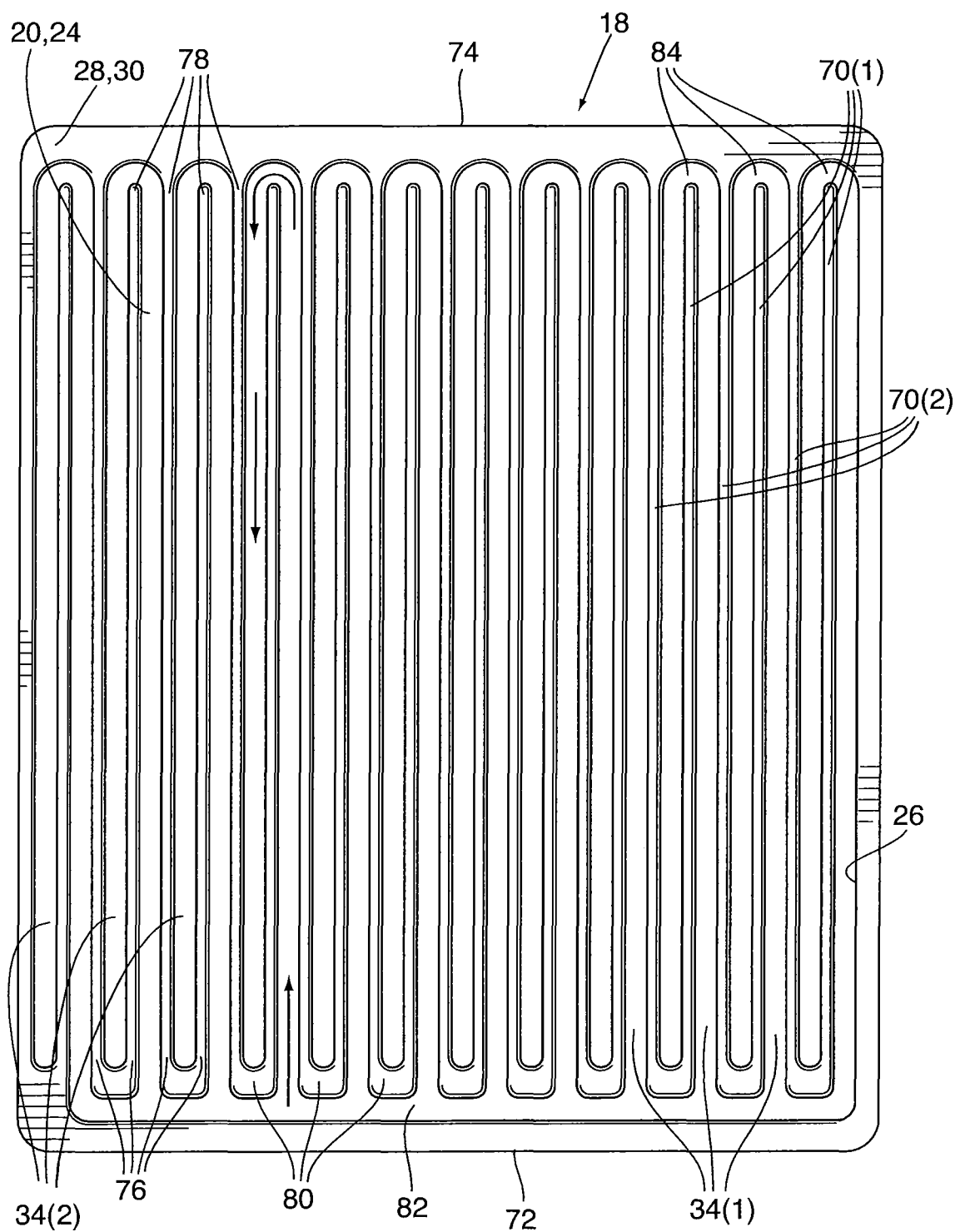
FIG. 8 is a top plan view of the second plate of the heat exchanger of FIG. 7.
Figure 9:
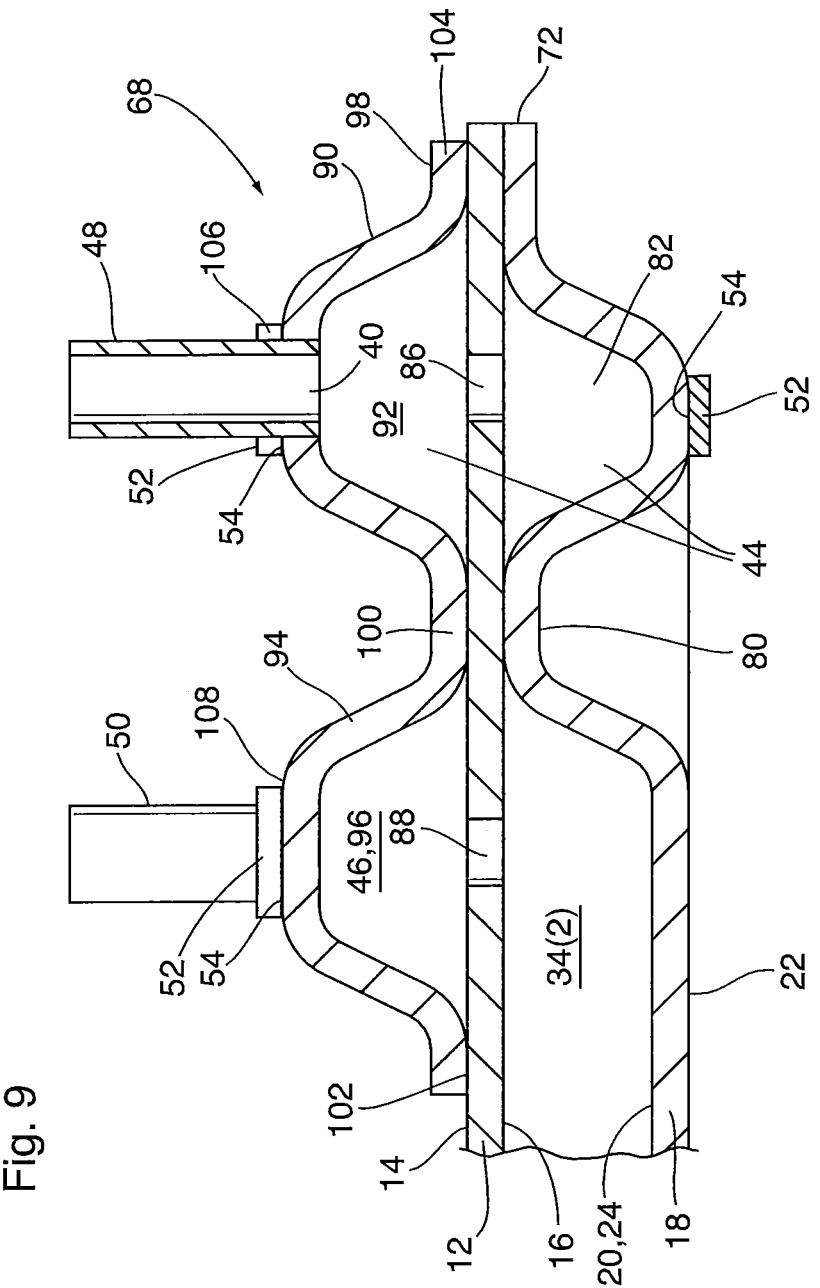
FIG. 9 is a longitudinal cross-section along line 9-9' of FIG. 7.

Referring now to FIGS. 7 to 9, there is shown a "counterflow" heat exchanger 68 according to a second embodiment. Heat exchanger 68 shares a number of elements in common with heat exchanger 10 described above, and like elements are identified by like reference numerals. In heat exchanger 68 the first port 40 and second port 42 are arranged along or adjacent to one edge of the battery heat exchanger 68.

Heat exchanger 68 is a "cold plate" heat exchanger, comprising a generally flat first plate 12 (also referred to herein as "cover plate") having inner and outer surfaces 14, 16 and a formed second plate 18 (also referred to herein as "base plate") having inner and outer surfaces 20, 22. The outer surface 16 of first plate 12 defines a generally flat surface upon which a plurality of battery cells and/or battery modules 2 are stacked, and which therefore serves as the primary heat transfer surface of the heat exchanger 10.

The second plate 18 has a central, generally planar base 24 surrounded by a raised peripheral side wall 26 extending from the base 24 to a planar flange 28 defining a planar peripheral sealing surface 30 on the inner surface 20 of second plate 18. The planar base 24 of second plate 18 is provided with a plurality of spaced apart ribs 70 which define (in combination with inner surface 14 of first plate 12) the plurality of fluid flow passages 34. The ribs 70 extend upwardly out of the plane of the planar base 24 and have a sufficient height such that the flat or rounded top surface of each rib 70 defines a sealing surface which is substantially co-planar with the sealing surface 30 of planar flange 28. During assembly of heat exchanger 68, the sealing surface 30 of planar flange 28 and the sealing surfaces of the ribs 70 are sealingly joined to the inner surface 14 of first plate 12, such that the inner surface 14 of first plate 12 defines the top walls of the fluid flow passages 34, the planar base 24 of second plate 18 defines the bottom walls of the fluid flow passages 34, and the ribs 70 and peripheral side wall 26 together define the sides of the fluid flow passages 34.

The second plate 18 has a first end 72 and a second end 74 which are longitudinally spaced apart, with the first and second ports 40, 42 being proximate to the first end 72. Each rib 70 has a first end 76 proximate to the first end 72 and an opposite second end 78 proximate to the second end 74. In the present embodiment the ribs 70 are straight, however, this is not essential and depends on the requirements of the specific application.

As shown in FIG. 8, the second plate 18 has two types of ribs 70: (a) a plurality of first ribs 70(1), each having its first end 76 spaced from the peripheral side wall 26 at the first end 72 of second plate 18, and its second end 78 spaced from the peripheral side wall 26 at the second end 74 of the second plate 18; and (b) a plurality of second ribs 70(2), each having its first end 76 spaced from the peripheral side wall 26 at first end 72 of second plate 18, and its second end 78 joined to the peripheral side wall 26 at the second end 74 of second plate 18. The first and second plurality of ribs 70(1) and 70(2) are arranged in alternating order across the width of the second plate 18, with the first end 76 of each first rib 70(1) being joined to the first end 76 of an adjacent second rib 70(2) by a transverse rib portion 80.

The second plate 18 has an internal manifold area 82 defined at the first end 72 thereof, between the peripheral side wall 26 and the first ends 76 of the ribs 70(1) and 70(2), and extending across the second plate 18. Manifold area 82 is referred to as an "internal manifold area" because it is enclosed between the plates 12, 18. A plurality of turnaround areas 84 are provided at the second end 74 of second plate 18, each of which is located between the peripheral side wall 26 and the second end 78 of one of the first ribs 70(1). Adjacent turnaround areas 84 are separated by second ribs 70(2).

With this arrangement of first and second ribs 70(1) and 70(2) as shown in FIG. 8, the second plate 18 defines a first plurality of fluid flow passages 34(1), each extending between the internal manifold area 82 and one of the turnaround areas 84; and a second plurality of fluid flow passages 34(2), each extending between one of the turnaround areas 84 and one of the transverse rib portions 80 joining the first ends 76 of an adjacent pair of ribs 70(1), 70(2). The first and second fluid flow passages 34(1), 34(2) alternate with one another across the width of the second plate 18, thus defining the counter-flow configuration.

The first plate 12 has one or more first openings 86 and a plurality of spaced second openings 88 to provide fluid input and output to and from the fluid flow passages 34. In the illustrated embodiment, the one or more first openings 86 comprises a continuous transverse slot which is located directly above the internal manifold area 82 of second plate 18, such that first opening(s) 86 is in fluid communication with the open first ends 36 of the first plurality of fluid flow passages 34(1) through internal manifold area 82. Each of the second openings 88 is located directly above and in fluid flow communication with the terminal end of one of the second fluid flow passages 34(2).

Heat exchanger 68 further comprises first and second manifold covers 90, 94 sealingly joined to the outer surface 16 of first plate 12 and respectively enclosing first and second external manifold chambers 92, 96 (FIG. 9). These chambers 92, 96 are referred to as "external manifold chambers" because they are outside the area enclosed between first plate 12 and second plate 18. The first manifold cover 90 is located directly over the first opening(s) 86 and the second manifold cover 94 is located directly over the plurality of second openings 88.

The first and second manifold covers 90, 94 are respectively provided with first and second ports 40, 42 and tubular fluid fittings 50, 52 to permit supply and discharge of heat transfer fluid to and from the heat exchanger 68. Manifold covers 90, 94 are elongate and extend transversely across the first plate 12 to provide fluid distribution or collection across the width of heat exchanger 68. Fluid ports 40, 42 can be formed at any location along the lengths of the respective first and second manifold covers 90, 94.

A first manifold 44 (FIG. 9) is defined by the combined volumes of the first external manifold chamber 90 and the internal manifold area 82, which are in direct fluid communication through first opening(s) 86. It will be appreciated, however, that first external manifold chamber 90 is optional, and that the first opening(s) 86 in first plate may simply comprise a single hole which serves as the inlet port 40, and that the tubular inlet fitting 48 may be provided directly on the first plate 12, to provide a fluid connection with inlet port 40, as in the embodiment of FIGS. 1-6.

A second manifold 46 (FIG. 9) is defined by the volume of the second external manifold chamber 96. In the present embodiment the first manifold 44 may be designated the "inlet manifold" and the second manifold 46 may be designated the "outlet manifold". The inlet manifold 44 is in fluid communication with the inlet port 40 and with the first plurality of fluid flow passages 34(1) through the first ends 36 thereof. The outlet manifold 46 is in fluid communication with the outlet port 42 and with the second plurality of fluid flow passages 34(2), through the second ends 38 thereof.

As best seen in FIG. 9, the first and second manifold covers 90, 94 are combined in an integrated manifold cover structure 98 in which the first and second external manifold chambers 92, 96 are separated by a dividing rib 100. The manifold cover structure 98 has a planar, bottom sealing surface 102 extending continuously along the bottom edges of the dividing rib 100 and the bottom peripheral edge of the manifold cover structure 98, wherein the manifold cover structure 98 is sealingly joined to the outer surface 16 of first plate 12 along the bottom sealing surface 102.

The manifold cover structure 98 may be formed by machining or casting, however, in the present embodiment, the manifold cover structure 98 is an embossed structure manufactured by stamping or deep drawing a sheet of metal, such as aluminum. Accordingly, the manifold cover structure 98 comprises a peripheral flange 104 surrounding a pair of spaced-apart embossments defining the first and second manifold covers 90, 94, with the bottom surfaces of the peripheral flange 104 and dividing rib 100 defining the planar, bottom sealing surface 102.

Heat exchanger 68 further comprises one or more electric heating elements 52, each of which is provided on an external heater support surface 54 which is defined as that portion of the external surface of heat exchanger 68 which is occupied by the electric heating element 52. In the present embodiment the external surface of heat exchanger 68 includes the outer surface 22 of second plate 18; the outer surfaces of manifold covers 90, 94 or integrated manifold cover structure 98; and the outer surface 16 of first plate 12 excepting the area covered by manifold covers 90, 94 or integrated manifold cover structure 98.

Each electric heating element 52 and the corresponding external heater support surface 54 are located directly opposite to an internal surface of the heat exchanger 68 which at least partly defines one of the first and second manifolds 44, 46.

In the present embodiment, one or both of the first and second manifold covers 90, 94 has a flat outer surface which defines an external heater support surface 54 on which an electric heating element 52 is provided. For example, in the present embodiment, the first manifold cover 90 has a flat top surface 106 and second manifold cover 94 has a flat top surface 108, wherein the flat top surfaces 106, 108 extend along the lengths of the respective manifold covers 90, 94.

FIGS. 7 and 9 show that the electric heating element(s) 52 and external heater support surface(s) 54 may be provided in various locations in heat exchanger 68. For example, one external heater support surface 54 may comprise at least a portion of the flat top surface 106 of first manifold cover 90, which is directly opposite to the first exterior manifold chamber 92, which forms a portion of the first manifold 44. With the electric heating element 52 and the external heater support surface 54 provided in this location, the electric heating element 52 will heat the fluid as it passes through the first manifold 44, which may either be the inlet or outlet manifold.

Another external heater support surface 54 may comprise at least a portion of the flat top surface 108 of second manifold cover 94, which is directly opposite to the second exterior manifold chamber 96, which defines the outlet manifold 46. With the electric heating element 52 and the external heater support surface 54 provided in this location, the electric heating element 52 will heat the fluid as it passes through the outlet manifold 46.

As shown in FIG. 9, another external heater support surface 54 may comprise a portion of the outer surface 22 of second plate 18, which is directly opposite to the internal manifold area 82, and which forms a portion of the first manifold 44. With the electric heating element 52 and the external heater support surface 54 provided in this location, the electric heating element 52 will heat the fluid as it passes through the first manifold 44.

Figure 10:
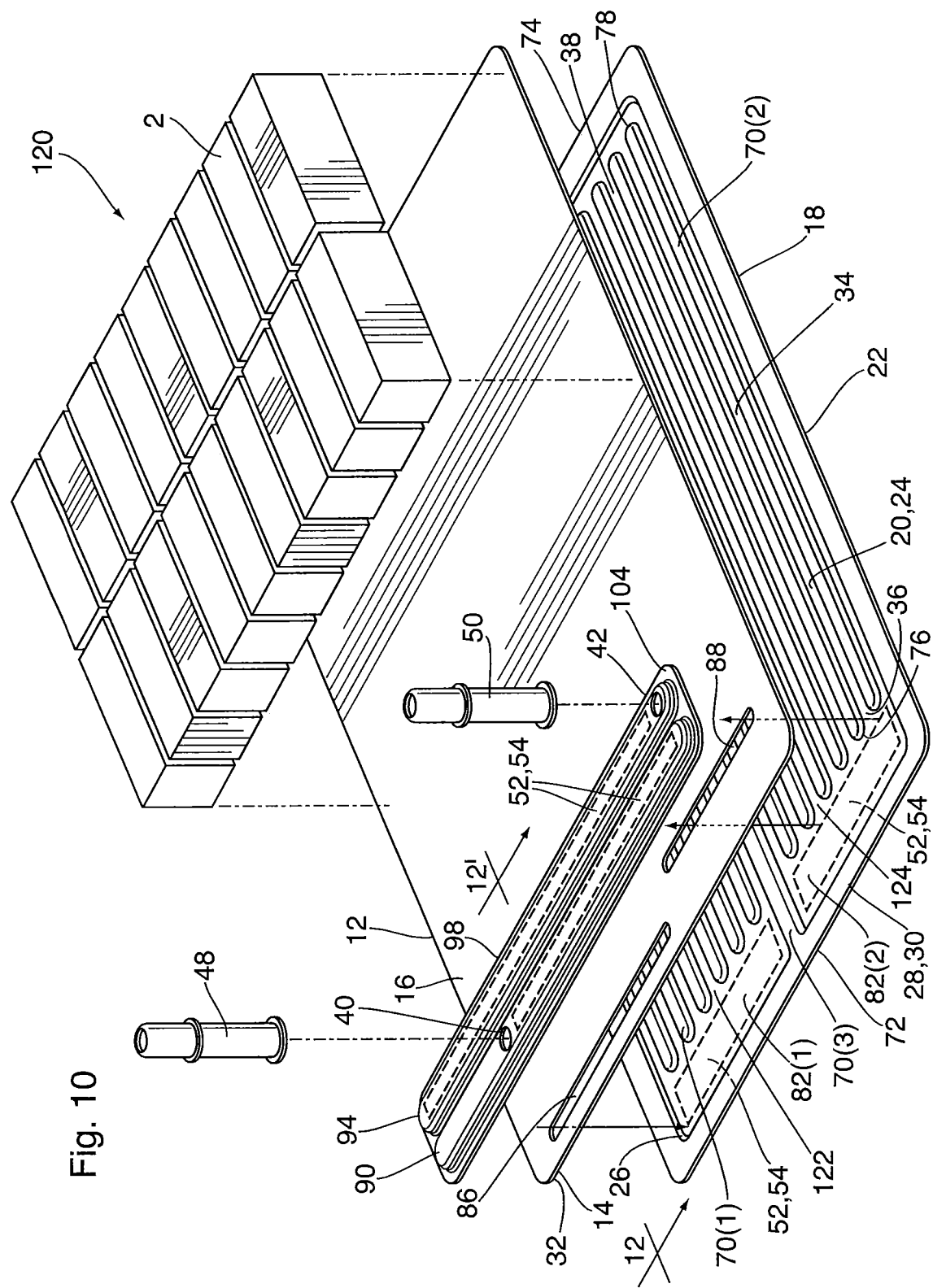
FIG. 10 is an exploded perspective view of a heat exchanger according to a third embodiment.
Figure 11:
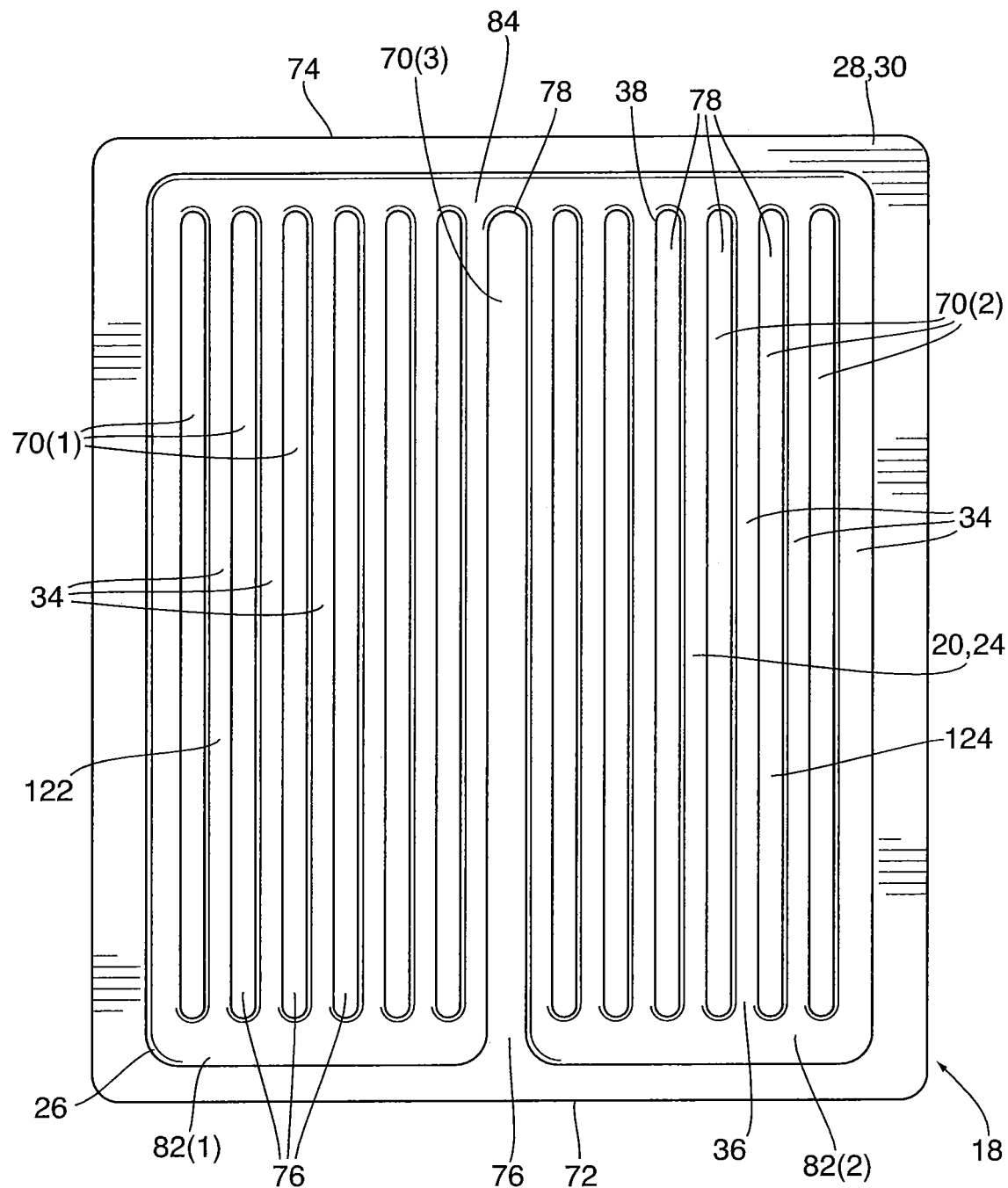
FIG. 11 is a top plan view of the second plate of the heat exchanger of FIG. 10.
Figure 12:
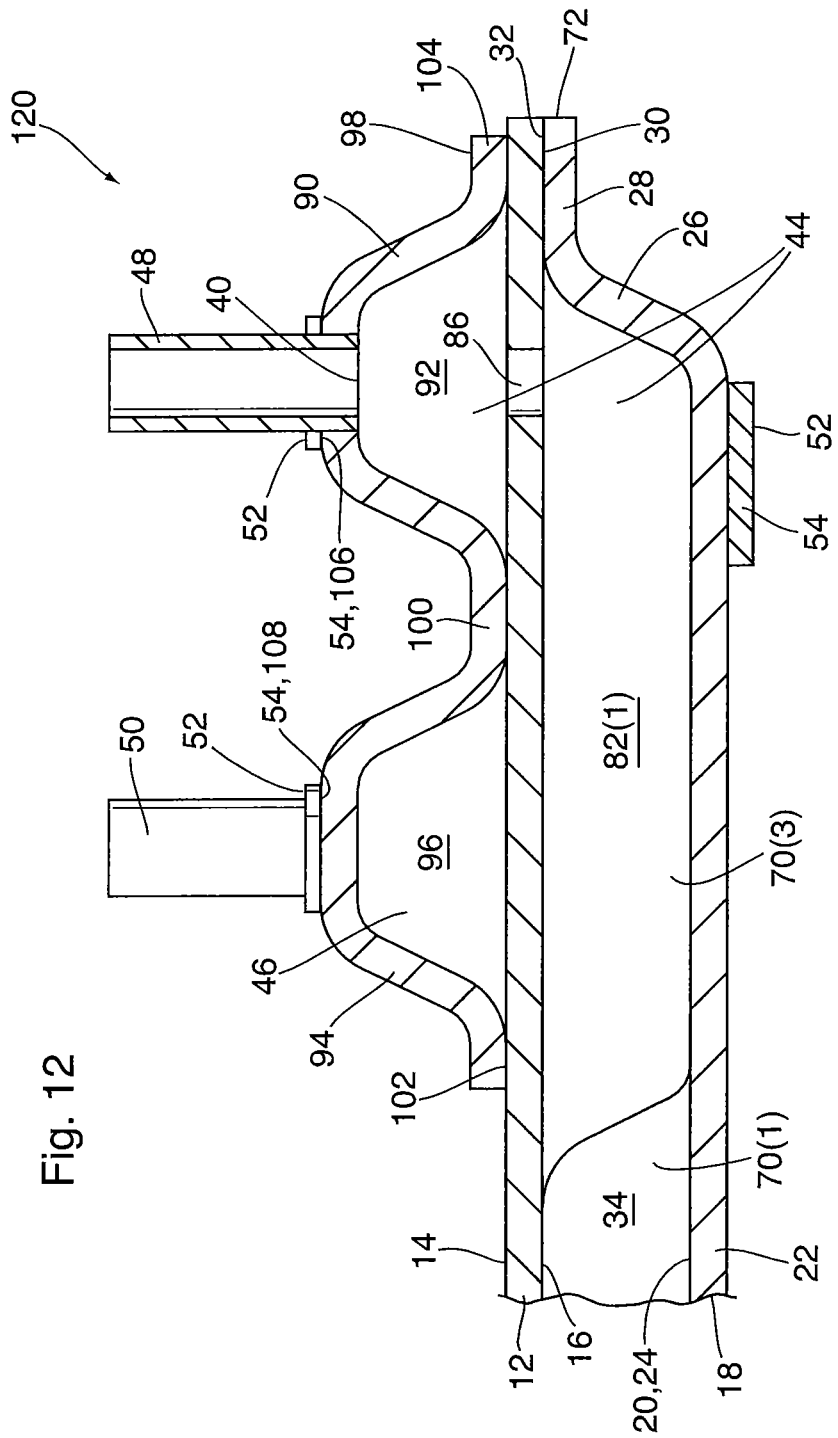
FIG. 12 is a longitudinal cross-section along line 12-12' of FIG. 10.

Referring now to FIGS. 10-12, there is shown a "U-flow" heat exchanger 120 according to a third embodiment. Heat exchanger 120 shares a number of elements in common with heat exchangers 10 and/or 68 described above, and like elements are identified by like reference numerals. In heat exchanger 120 the inlet port 40 and outlet port 42 are arranged along or adjacent to one edge of the battery heat exchanger 120.

Heat exchanger 120 is a "cold plate" heat exchanger, comprising a generally flat first plate 12 (also referred to herein as "cover plate") having inner and outer surfaces 14, 16 and a formed second plate 18 (also referred to herein as "base plate") having inner and outer surfaces 20, 22. The outer surface 16 of first plate 12 defines a generally flat surface upon which a plurality of battery cells and/or battery modules 2 are stacked, and which therefore serves as the primary heat transfer surface of the heat exchanger 10.

The second plate 18 has a central, generally planar base 24 surrounded by a raised peripheral side wall 26 extending from the base 24 to a planar flange 28 defining a planar peripheral sealing surface 30 on the inner surface 20 of second plate 18. The planar base 24 of second plate 18 is provided with a plurality of spaced apart ribs 70 which define (in combination with inner surface 14 of first plate 12) the plurality of fluid flow passages 34. The ribs 70 extend upwardly out of the plane of the planar base 24 and have a sufficient height such that the flat or rounded top surface of each rib 70 defines a sealing surface which is substantially co-planar with the sealing surface 30 of planar flange 28. During assembly of heat exchanger 120, the sealing surface 30 of planar flange 28 and the sealing surfaces of the ribs 70 are sealingly joined to the inner surface 14 of first plate 12, such that the inner surface 14 of first plate 12 defines the top walls of the fluid flow passages 34, the planar base 24 of second plate 18 defines the bottom walls of the fluid flow passages 34, and the ribs 70 and peripheral side wall 26 together define the sides of the fluid flow passages 34.

The second plate 18 has a first end 72 and a second end 74 which are longitudinally spaced apart, with the inlet and outlet ports 40, 42 being proximate to the first end 72. Each rib 70 has a first end 76 proximate to the first end 72 and an opposite second end 78 proximate to the second end 74. In the present embodiment the ribs 70 are straight, however, this is not essential and depends on the requirements of the specific application.

In this embodiment, the second plate 18 has three types of ribs 70: (a) a plurality of first ribs 70(1), each having its first end 76 spaced from the peripheral side wall 26 at the first end 72 of second plate 18, and its second end 78 spaced from the peripheral side wall 26 at the second end 74 of the second plate 18; (b) a plurality of second ribs 70(2), each also having its first end 76 spaced from the peripheral side wall 26 at the first end 72 of second plate 18, and its second end 78 spaced from the peripheral side wall 26 at the second end 74 of the second plate 18; and (c) a dividing rib 70(3) located between the pluralities of first and second ribs 70(1), 70(2), the dividing rib 70(3) having a first end 76 which is joined to the peripheral side wall 26 at the first end 72 of the second plate 18, and having a second end 78 which is spaced from the peripheral side wall 26 at the second end 74 of the second plate 18.

With this arrangement, the planar base 24 of the second plate 18 defines a generally U-shaped flow arrangement comprising an inlet portion 122 and an outlet portion 124 which are separated by the dividing rib 70(3). The inlet portion 122 includes a plurality of fluid flow passages 34 defined by the plurality of first ribs 70(1), and the outlet portion 124 includes a plurality of fluid flow passages 34 defined by the plurality of second ribs 70(2).

The second plate 18 has a first internal manifold area 82(1) defined at the first end 72 thereof, between the peripheral side wall 26 and the first ends 76 of the ribs 70(1) in the inlet portion 122, and a second internal manifold area 82(2) at the first end 72, between the peripheral side wall 26 and the first ends 76 of the ribs 70(2) in the outlet portion 124. A turnaround area 84 is provided at the second end 74 of second plate 18, being located between the peripheral side wall 26 and the second ends 78 of the ribs 70(1), 70(2) and 70(3). Fluid communication between the inlet and outlet portions 122, 124 is provided through the space between the peripheral side wall 26 and the second end 78 of the dividing rib 70(3).

The first plate 12 has one or more first openings 86 and one or more second openings 88 to provide fluid input and output to and from the fluid flow passages 34. In the illustrated embodiment, the one or more first and second openings 86, 88 each comprise a continuous transverse slot. The first opening 86 is located directly above the first internal manifold area 82(1) and is in fluid communication with the open first ends 36 of the plurality of fluid flow passages 34 of inlet portion 122. Similarly, second opening 88 is located directly above the second internal manifold area 82(2) and is in fluid communication with the open first ends 36 of the plurality of fluid flow passages 34 of outlet portion 124.

Heat exchanger 120 further comprises first and second manifold covers 90, 94 sealingly joined to the outer surface 16 of first plate 12 and respectively enclosing first and second external manifold chambers 92, 96. The first manifold cover 90 is located directly over the first opening 86 and the second manifold cover 94 is located directly over the second opening 88.

The first and second manifold covers 90, 94 are respectively provided with first and second fluid ports 40, 42 and first and second tubular fittings 48, 50 to permit supply and discharge of heat transfer fluid to and from the heat exchanger 120. Manifold covers 90, 94 are elongate and extend transversely across the first plate 12 to provide fluid distribution or collection across the width of each section 122, 124 of heat exchanger 120. Fluid ports 40, 42 can be formed at any location along the lengths of the respective first and second manifold covers 90, 94. In the present embodiment the manifold covers 90, 94 are shown as extending across substantially the entire width of heat exchanger 120. However, since the first manifold cover 90 is in fluid communication with only the first internal manifold area 82(1) in the inlet portion 122, the first manifold cover 90 does not necessarily extend across the outlet portion 124. Similarly, since the second manifold cover 94 is in fluid communication only with the second internal manifold area 82(2) in the outlet portion 124, the second manifold cover 94 does not necessarily extend across the inlet portion 122. Extending one or both manifold covers 90, 94 across substantially the entire width of the heat exchanger 120 enables one or both of the inlet and outlet ports 40, 42 to be provided at any location along the width of the heat exchanger 120.

As shown in FIG. 12, the first manifold 44 of heat exchanger 120 is defined by the combined volumes of the first external manifold chamber 92 and the first internal manifold area 82(1), which are in direct fluid communication through first opening 86. The second manifold 46 is defined by the combined volumes of the second external manifold chamber 96 and the second internal manifold area 82(2), which are in direct fluid communication through second openings 88.

In the present embodiment the first and second manifold covers 90, 94 are combined in an integrated manifold cover structure 98 in which the first and second external manifold chambers 92, 96 are separated by a dividing rib 100. The manifold cover structure 98 has a planar, bottom sealing surface 102 extending continuously along the bottom edges of the dividing rib 100 and the bottom peripheral edge of the manifold cover structure 98, wherein the manifold cover structure 98 is sealingly joined to the outer surface 16 of first plate 12 along the bottom sealing surface 102. However, it will be appreciated that the manifold cover structure 98 may have any of the alternate constructions discussed in the above description of heat exchanger 68.

Heat exchanger 120 further comprises one or more electric heating elements 52, each of which is provided on an external heater support surface 54 which is defined as that portion of the external surface of heat exchanger 120 which is occupied by the electric heating element 52. In the present embodiment the external surface of heat exchanger 120 includes the outer surface 22 of second plate 18; the outer surfaces of manifold covers 90, 94 or integrated manifold cover structure 98; and the outer surface 16 of first plate 12 excepting the area covered by manifold covers 90, 94 or integrated manifold cover structure 98.

Each electric heating element 52 and the external heater support surface 54 are located directly opposite to an internal surface of the heat exchanger 120 which partly defines one of the first and second manifolds 44, 46.

In the present embodiment, the one or both of the first and second manifold covers 90, 94 has a flat outer surface which defines an external heater support surface 54 on which an electric heating element 52 is provided. For example, in the present embodiment, the first manifold cover 90 has a flat top surface 106 and second manifold cover 94 has a flat top surface 108, wherein the flat top surfaces 106, 108 extend along the lengths of the respective manifold covers 90, 94.

FIGS. 10 and 12 show that the electric heating element(s) 52 and the external heater support surface(s) 54 may be provided in various locations in heat exchanger 120. For example, one external heater support surface 54 may comprise at least a portion of the flat top surface 106 of first manifold cover 90, which is directly opposite to the first exterior manifold chamber 92, which forms a portion of the inlet manifold 44. With the electric heating element 52 and the external heater support surface 54 provided in this location, the electric heating element 52 will heat the fluid as it passes through the inlet manifold 44.

Another external heater support surface 54 may comprise at least a portion of the flat top surface 108 of second manifold cover 94, which is directly opposite to the second exterior manifold chamber 96, which forms part of the outlet manifold 46. With the electric heating element 52 and the external heater support surface 54 provided in this location, the electric heating element 52 will heat the fluid as it passes through the outlet manifold 46.

As shown in FIG. 12, one or more external heater support surfaces 54 may comprise portions of the outer surface 22 of second plate 18, which is directly opposite to the first internal manifold area 82(1), which forms a portion of the first manifold 44. With the electric heating element 52 and the external heater support surface 54 provided in this location, the electric heating element 52 will heat the fluid as it passes through the first manifold 44.

A typical thermal management system for heating and/or cooling a rechargeable vehicle battery will comprise a plurality of battery heat exchangers, each of which is in thermal contact with one or more of the battery cells and/or modules making up the rechargeable vehicle battery. The battery heat exchangers may be fluidically joined together in parallel and/or series arrangement, and one or more of the battery heat exchangers in the array may incorporate an electric heating element 52 as described above with reference to heat exchangers 10, 68 and 120.

As further described below, reduced heat-up times and/or energy consumption under cold start conditions can be achieved by providing a secondary circulation pump which is arranged for short-circuit flow of heat transfer fluid through one or more heat exchangers which have electric heating elements, while preventing circulation of the fluid through other parts of the system. By heating the relatively small volume of heat transfer fluid being re-circulated through the heat exchangers with heating elements, a portion of the battery will rapidly be heated to its desired temperature range, and initial start-up and operation of the vehicle can be achieved using only the portions of the battery which are heated by the electric heating element(s).

Figure 13:
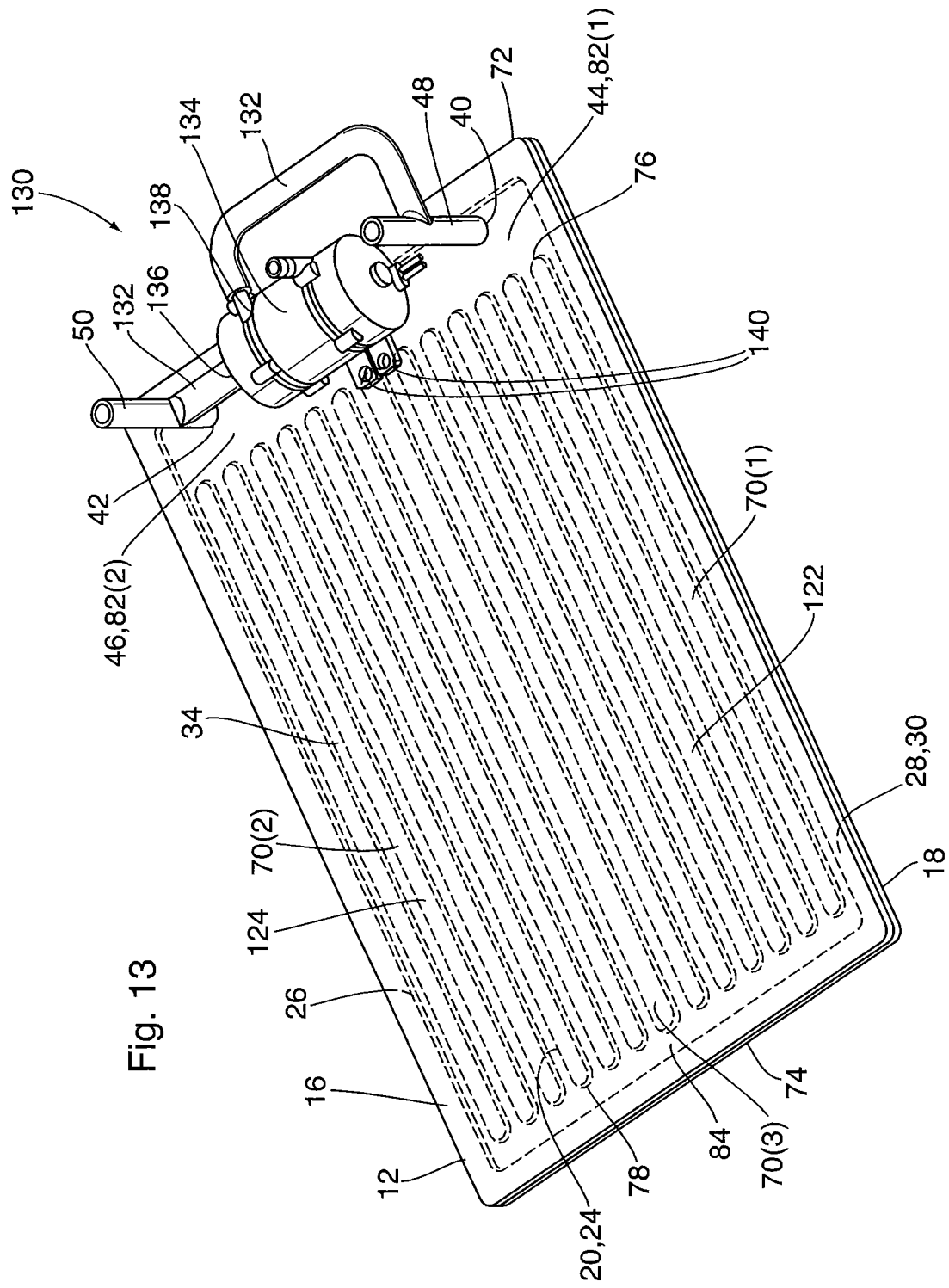
FIG. 13 is a top perspective view of a heat exchanger according to a fourth embodiment.
Figure 14:
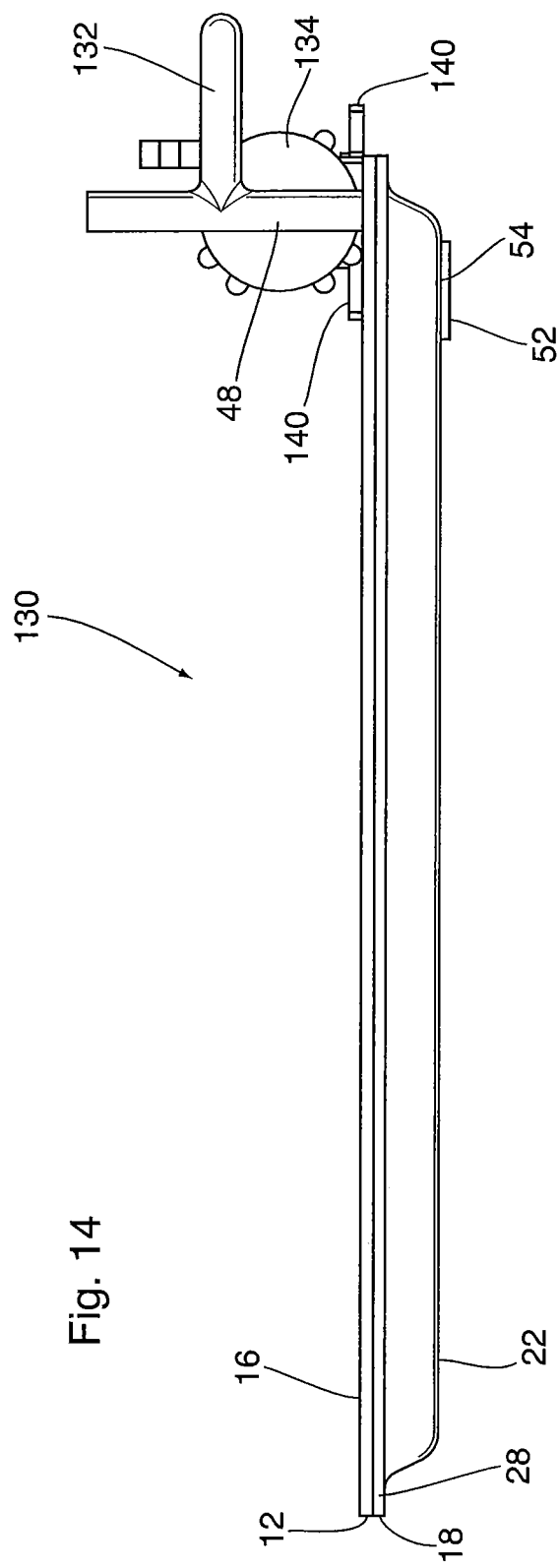
FIG. 14 is a side elevation view of the heat exchanger of FIG. 13.
Figure 15:
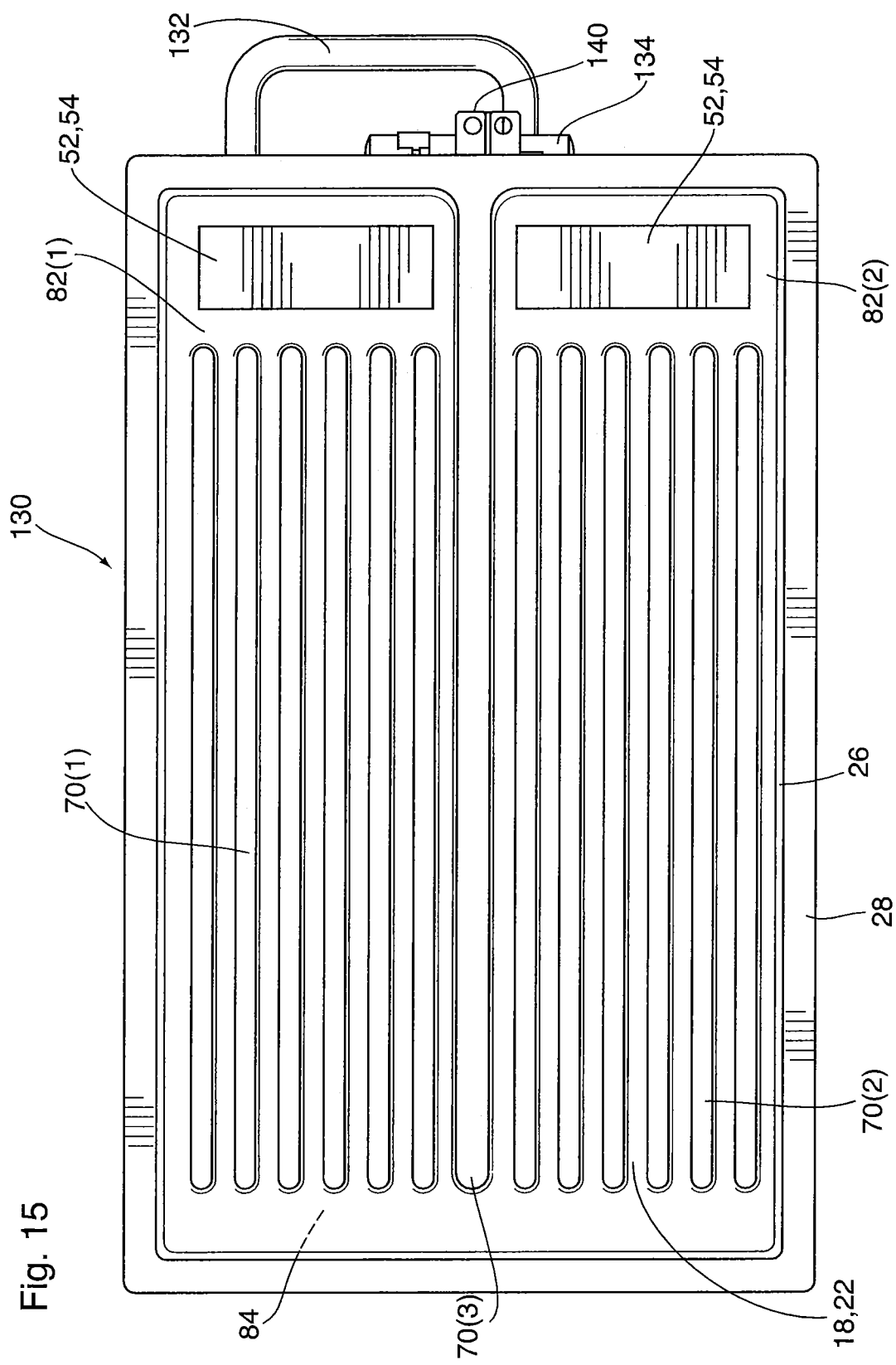
FIG. 15 is a bottom plan view of the heat exchanger of FIG. 13.

FIGS. 13 to 15 illustrate an example of a heat exchanger 130 according to a fourth embodiment which shares a number of elements in common with heat exchangers 10, 68 and/or 120 described above, and like elements are identified by like reference numerals. Heat exchanger 130 is a U-flow heat exchanger having a first port 40 and a second port 42 arranged along or adjacent to one edge of the heat exchanger 130, and having upstanding first and second tubular fittings 48, 50 extending from the outer surface 16 of first plate 12. In the present embodiment, the first port 40 is the inlet port, the second port 42 is the outlet port, the first tubular fitting 48 is the inlet fitting, and the second tubular fitting 50 is the outlet fitting.

The second plate 18 of heat exchanger 130 may be identical to that of heat exchanger 120. However, the first plate 12 of heat exchanger 130 lacks the first and second openings 86, 88 and manifold covers 90, 94 of heat exchangers 68 and 120, instead having the first port 40 directly over top of the first internal manifold area 82(1), and the second port 42 directly over top of the second internal manifold area 82(2). The first internal manifold area 82(1) is also identified herein as the first manifold 44, which is the inlet manifold of heat exchanger 130. The second internal manifold area 82(2) is also identified herein as the second manifold 46, which is the outlet manifold of heat exchanger 130.

As shown in FIGS. 14 and 15, the electric heating element 52 and external heater support surface 54 are provided on the outer surface 22 of the second plate 18, directly opposite to one or both of the first and second internal manifold areas 82(1) and 82(2), adjacent to the first end 72 of second plate 18. Although FIG. 15 shows a pair of electric heating elements 52 and a pair of external heater support surfaces 54 extending transversely across the first and second internal manifold areas 82(1) and 82(2), this is not essential.

A short-circuit flow conduit 132 is provided between the first and second ports 40, 42 of the heat exchanger 130, to allow flow of the heat transfer fluid to be recirculated directly between the first and second ports 40, 42. This permits re-circulation of a volume of heat transfer fluid through the heat exchanger 130, rather than permitting it to circulate through the remainder of the battery thermal management system. The re-circulation of heat transfer fluid inside the heat exchanger 130 allows it to be rapidly heated by the electric heating element 52.

In the present embodiment, the short-circuit flow conduit 132 comprises a tube having a first end which branches off from the first tubular fitting 48 and a second end which branches off from the second tubular fitting 50. It will be appreciated, however, that different arrangements are possible.

Between the first and second ends of the short-circuit flow conduit 132 there is provided a secondary circulation pump 134, which is adapted for pumping the relatively small volume of heat transfer fluid contained within the heat exchanger 130. Accordingly, the secondary circulation pump 134 has smaller size, smaller capacity, and lower energy consumption, compared to those of the primary circulation pump of the thermal management system. The pump 134 has an inlet 136 which is connected to the second (outlet) port 42 and second (outlet) fitting 50 through flow conduit 132, such that the pump inlet 136 is adapted to receive heat transfer fluid from second port 42. Pump 134 also has an outlet 138 connected to first (inlet) port 40 and first (inlet) fitting 48 through flow conduit 132, such that the pump outlet 138 is adapted to discharge heat transfer fluid to first port 40. Pump 134 is powered by electricity and includes electrical connectors 140 for connection to an electrical power supply (not shown) and to a controller (not shown) for controlling operation of the battery thermal management system. Pump 134 may be physically supported only through its connections to the short-circuit flow conduit 132, or it may be supported on and attached to the outer surface 16 of the first plate 12.

The size of the secondary circulation pump 134 will depend on the size of the electric heating element 52; the desired heating rate of the battery cell(s) or module(s) supported on the heat exchanger 130; and the thermal mass of the system. For example, to heat a 50 kg battery from −20 to 5° C. in 11 minutes, with a 2 kW heating element, and with 200 ml of coolant to be heated, the secondary circulation pump 134 should be sized for a flow rate of roughly 0.3 to 1 liters per minute (lpm), to prevent boiling of the coolant.

The secondary circulation pump 134 may comprise a conventional centrifugal pump, or it may comprise a positive displacement pump which prevents backflow of the heat transfer fluid under conditions when pump 134 is shut off. Where pump 134 is a centrifugal pump, a valve (not shown) may be provided in the short-circuit flow conduit 132 to prevent backflow of heat transfer fluid through conduit 132 when the pump 134 is shut off. The valve may comprise a check valve, such as a simple flapper back-flow prevention valve. However, in the interest of minimizing size, complexity, number of fluid connections, and number of components, the secondary circulation pump 134 will be assumed to be a positive displacement pump in the following description.

Figure 16:
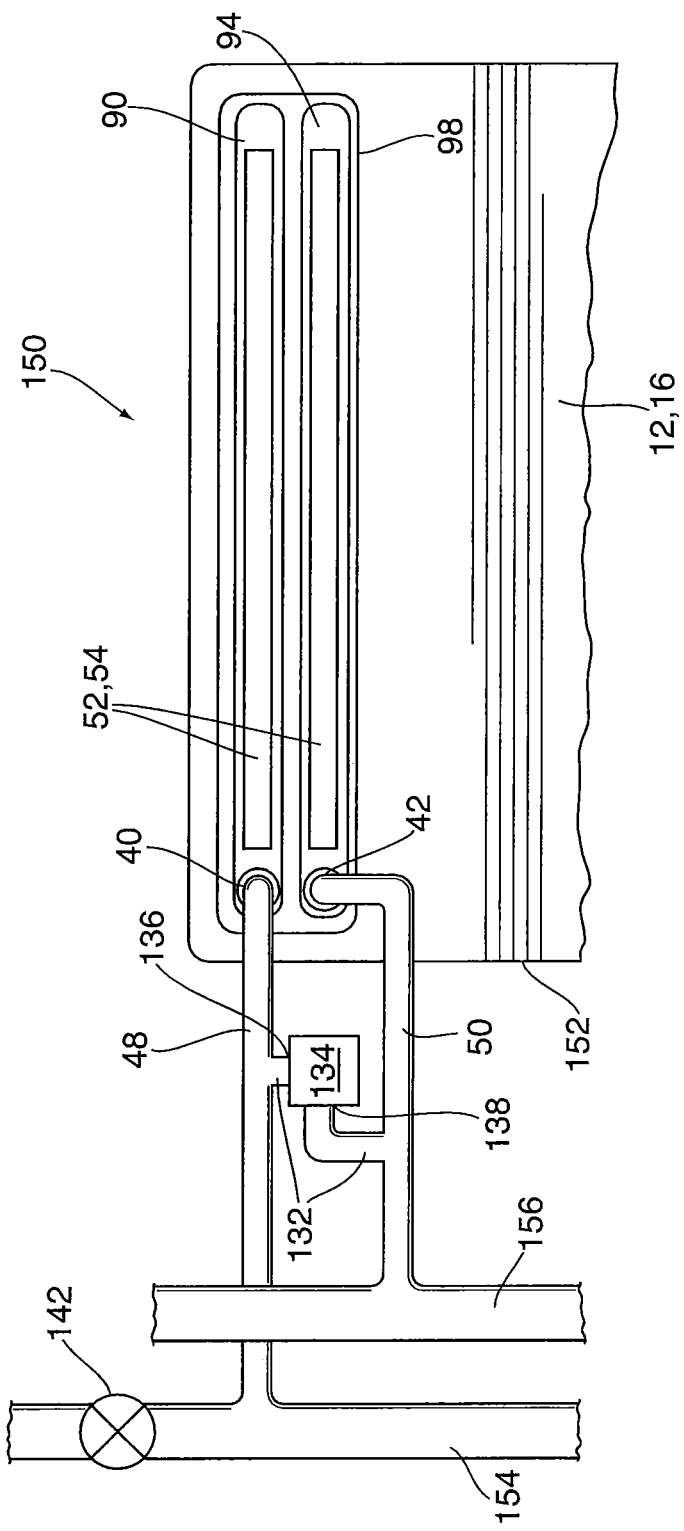
FIG. 16 is a partial top plan view of a heat exchanger according to a fifth embodiment.

Referring now to FIG. 16, there is shown a heat exchanger 150 according to a fifth embodiment. Heat exchanger 150 may either be a counter-flow heat exchanger similar to heat exchanger 68, or may be a U-flow heat exchanger similar to heat exchanger 120. Heat exchanger 150 shares a number of elements in common with heat exchangers 10, 68, 120 and 130 described above, and like elements are identified by like reference numerals. In heat exchanger 150 the first and second ports 40, 42 and the first and second fittings 58, 50 are provided in or on first and second manifold covers 90, 94 which are part of an integrated manifold cover structure 98. An electric heating element 52 and external heater support surface 54 are provided on each of the manifold covers 90, 94, although it will be appreciated that only one of the manifold covers 90, 94 may be provided with an electric heating element 52 and external heater support surface 54.

As mentioned above, ports 40, 42 and fittings 48, 50 can be provided at any location along the lengths of the manifold covers 90, 94, which is advantageous in that it simplifies integration of the secondary circulation pump 134 into the battery heat exchanger 150. In the present embodiment, the ports 40, 42 and fittings 48, 50 are located side-by-side (aligned in the longitudinal direction), close to the ends of manifold covers 90, 94 and a longitudinal edge 152 of the heat exchanger 150.

The tubular fittings 48, 50 of heat exchanger 150 have extensions which extend above and parallel to the outer surface 16 of first plate 12, the fittings 48, 50 projecting outwardly beyond the longitudinal edge 152 of heat exchanger 150 and being connected to respective conduits 154, 156 of a thermal management system, through which heat exchanger 150 is fluidically interconnected to other components of the thermal management system, which may include one or more heat-generating components, one or more heat exchangers (including one or more battery cooling heat exchangers), one or more pumps, and/or one or more valves.

Heat exchanger 150 includes a short-circuit flow conduit 132 to allow flow of the heat transfer fluid to be recirculated directly between the first and second ports 40, 42 for rapid heating, as discussed above with reference to heat exchanger 130. The short-circuit flow conduit 132 comprises a tube having a first end which branches off from the first tubular fitting 48 and a second end which branches off from the second tubular fitting 50.

Between the first and second ends of the short-circuit flow conduit 132 there is provided a secondary circulation pump 134 having an inlet 136 connected to the first (outlet) port 40 and first (outlet) fitting through flow conduit 132, and an outlet 138 connected to the second (inlet) port 42 and second (inlet) fitting 50 through flow conduit 132. In the present embodiment, pump 134 is located outwardly of the edge 152 of heat exchanger 150, and may be physically supported only by its connections to the short-circuit flow conduit 132.

As discussed above, heat exchanger 150 is connected to the remainder of the battery thermal management system through the tubular fittings 48, 50. In order to isolate the heat exchanger 130 from the remainder of the system under conditions when short-circuit flow is desired, the battery thermal management system will also include at least one short-circuit flow control valve 142. Each short-circuit flow control valve 142 is provided downstream of the short circuit flow circuit defined by heat exchanger 30 and short-circuit flow conduit 132, to prevent or allow flow between the first port 40 and/or the second port 42 and the remainder of the battery thermal management system. In the illustrated example, one valve 142 is provided in conduit 154 of the thermal management system, the valve 142 being in flow communication with the first fluid port 40 through the first tubular fitting 48.

It will be appreciated that a short-circuit flow control valve 142 may instead or also be provided in the conduit 156, and/or a short-circuit flow control valve 142 may be provided in one or both of the tubular fittings 48, 50. The valve 142 may be electrically operated, being connected to an electrical power supply (not shown) and to the controller (not shown) of the battery thermal management system. Alternatively, the valve 142 may be a simple mechanical check valve, such as a flapper backflow prevention valve.

Under conditions where it is desired to rapidly heat the heat transfer fluid circulating through heat exchanger 150, the controller actuates (closes) valve(s) 142 to isolate the heat exchanger 150 from the remainder of the thermal management system; activates the secondary circulation pump 134 to produce short-circuit recirculating flow through heat exchanger 150; and activates the electric heating element 52 to heat the recirculating fluid. The controller may also de-activate the primary circulation pump of the thermal management system during short-circuit recirculation of the fluid through heat exchanger 150. It will be appreciated that short-circuit recirculation and heating of the fluid volume of heat exchanger 150 will bring about preferential heating of the battery cell(s) and module(s) supported on the heat exchanger, without heating the remainder of the battery thermal management system.

Heat exchanger 130 described above may be incorporated into a thermal management system in the same manner as described above for heat exchanger 150.

As further discussed below, the provision of a battery heat exchanger with manifold covers 90, 94, as in heat exchangers 68, 120 and 150, provides further opportunities for integration of the short-circuit flow conduit 132 and secondary circulation pump 134 into the heat exchanger without increasing the size of the heat exchanger or decreasing the area of its heating surface.

Figure 17:
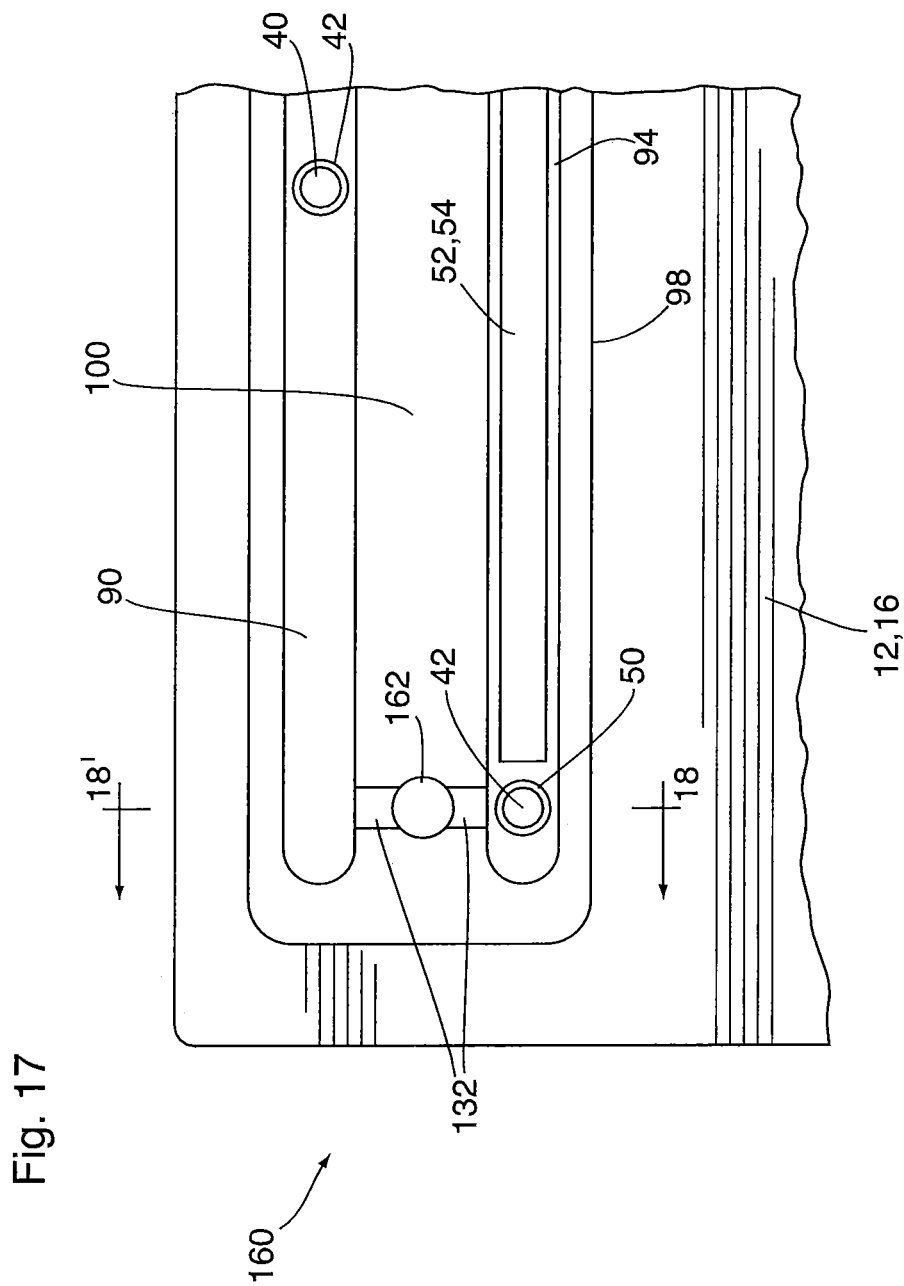
FIG. 17 is a partial top plan view of a heat exchanger according to a sixth embodiment.
Figure 18:
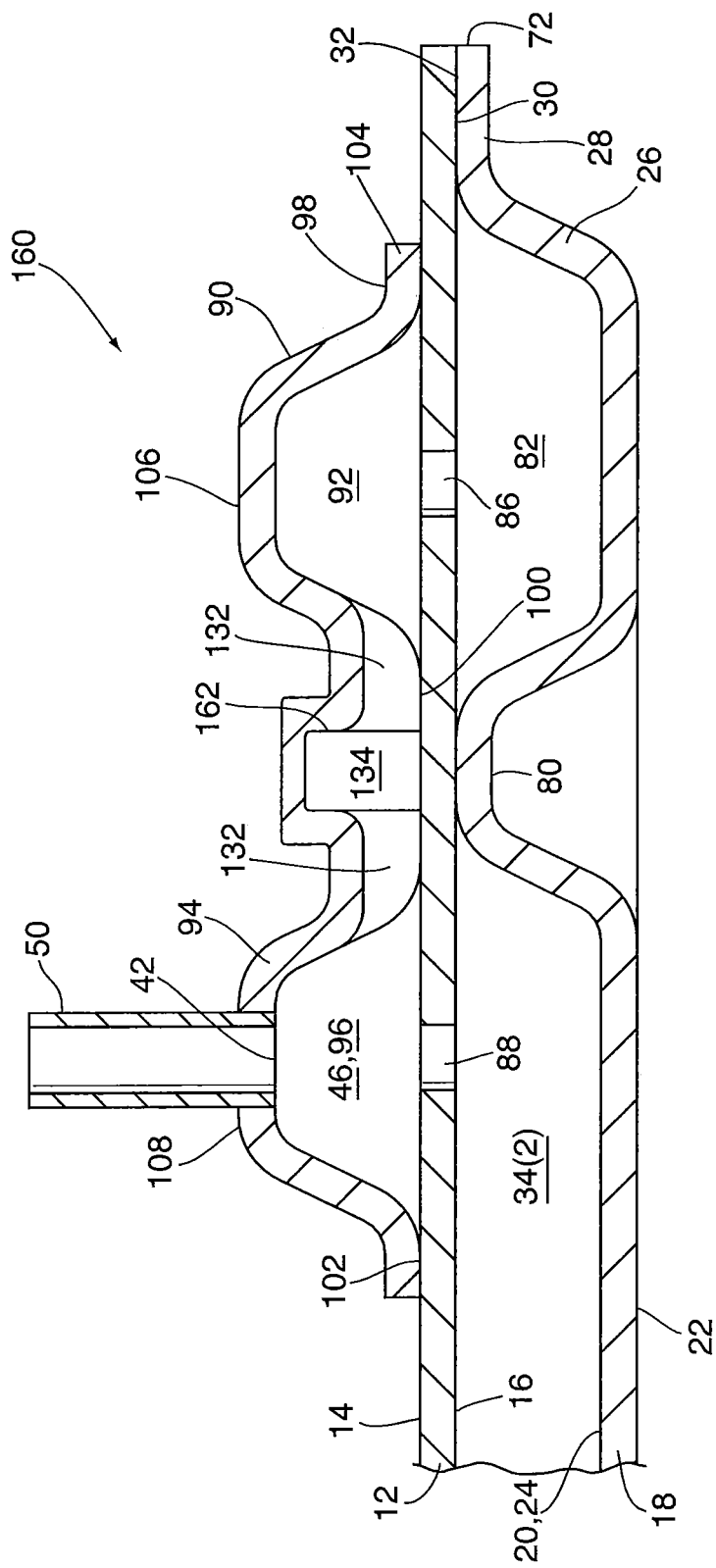
FIG. 18 is a longitudinal cross-section along line 18-18' of FIG. 17.

Referring now to FIGS. 17 and 18, there is shown a heat exchanger 160 according to a sixth embodiment. Heat exchanger 160 is shown as being a counter-flow heat exchanger similar to heat exchanger 68, but it may instead be a U-flow heat exchanger similar to heat exchanger 120. Heat exchanger 160 shares a number of elements in common with heat exchangers 10, 68, 120, 130 and 150 described above, and like elements are identified by like reference numerals. The first and second fluid ports 40, 42 and the first and second tubular fittings 48, 50 of heat exchanger 160 are provided in or on first and second manifold covers 90, 94 which are part of an integrated manifold cover structure 98.

An electric heating element 52 and external heater support surface 54 is provided on second manifold cover 94, although it will be appreciated that first manifold cover 90 may be provided with an electric heating element 52 and external heater support surface 54, either instead of or in addition to the electric heating element 52 and external heater support surface 54 provided on second manifold cover 94. As shown in FIG. 18, second manifold cover 94 encloses second external manifold chamber 96 which comprises second manifold 46, and which is the inlet manifold in the present embodiment. The first manifold cover 90 defines part of first manifold 44, which is the outlet manifold.

In the present embodiment, the short-circuit flow conduit 132 extends directly between the first and second manifold covers 90, 94 to directly connect the first manifold chamber 92 of first manifold cover 90 to the second manifold chamber 96 of the second manifold cover 94, rather than being connected to the fittings 48, 50. The short-circuit flow conduit 132 is shown as being a straight, longitudinally extending channel or rib which is formed as part of the integrated manifold cover structure 98, traversing the dividing rib 100. The secondary circulation pump 134 is provided between the ends of flow conduit 132. In the present embodiment, the flow conduit 132 includes a pump chamber 162 between its ends, in which the secondary circulation pump 134 is housed.

Operation of heat exchanger 160 to provide short-circuit recirculating fluid flow and rapid heating of the heat transfer fluid is exactly as described above with reference to heat exchangers 130 and 150. It will be seen that heat exchanger 160 provides more complete integration of the pump 134 and heat exchanger 160, minimizing size, number of components, and number of fluid connections. For example, where the first and second manifold covers 90, 94 comprise an integrated manifold cover structure formed by embossing a metal sheet, the short-circuit flow conduit 132 and pump chamber 162 can conveniently be formed as part of the embossed structure.

FIG. 18A illustrates a heat exchanger 170 according to a seventh embodiment. Heat exchanger 170 is shown as being a counter-flow heat exchanger similar to heat exchanger 68, but it may instead be a U-flow heat exchanger similar to heat exchanger 120. Heat exchanger 170 shares a number of elements in common with heat exchangers 10, 68, 120, 130, 150 and 160 described above, and like elements are identified by like reference numerals. Heat exchanger 170 includes first and second fluid ports 40, 42 and first and second tubular fittings 48, 50, which are provided in or on first and second manifold covers 90, 94 which are part of an integrated manifold cover structure 98 as described above. In addition, the flat top surface 108 of second manifold cover 94 is provided with an electrical heating element 52 and external heater support surface 54.

As with heat exchanger 130 described above, heat exchanger 170 includes a short-circuit flow conduit 132 with a secondary circulation pump 134. However, in contrast to heat exchanger 130, the short-circuit flow conduit 132 is not connected to ports 40, 42 or fittings 48, 50, but rather is connected to secondary ports 180, 182 provided in the first and second manifold covers 90, 94, and being in flow communication with manifold chambers 92, 96 enclosed therein, and with first and second manifolds 44, 46. In the present embodiment, the pump inlet 136 is connected to the outlet manifold 46 (wherein port 40 is the outlet port) through the short-circuit flow conduit 132, and pump outlet 138 is connected to the inlet manifold 44 (wherein port 42 is the inlet port) through the short-circuit flow conduit 132. This difference in structure does not materially affect the function of the heat exchanger 170, but provides more flexibility in the locations of the fittings 48, 50, 180, 182 and short-circuit flow conduit 132.

A thermal management system may include multiple heat exchangers as described herein, wherein the heat exchangers are arranged in an array. The embodiments now described with reference to FIGS. 19 and 20 relate specifically to thermal management systems including arrays of battery heat exchangers, in which one or more of the heat exchangers includes a secondary circulation pump 134, as described above with reference to heat exchangers 130, 150, 160 and 170.

Figure 19:
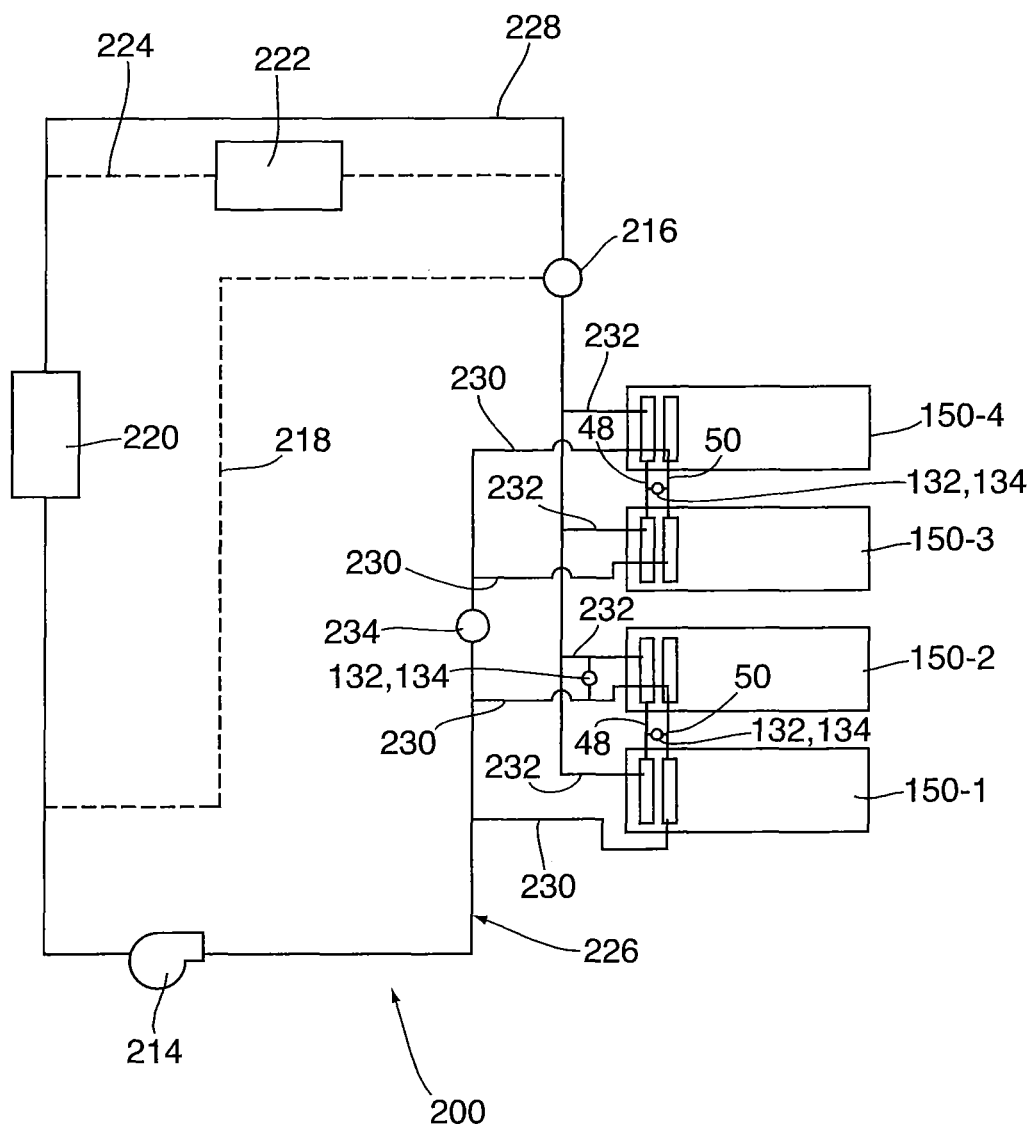
FIG. 19 is a schematic illustration of a thermal management system according to a first embodiment.

FIG. 19 schematically illustrates a thermal management system 200 according to a first embodiment, including a plurality of battery heat exchangers 150 as described above, wherein the heat exchangers 150 are arranged in parallel. The system 200 further comprises a primary circulation pump 214 for pumping a liquid heat transfer fluid through system 200, a bypass valve 216, a first bypass flow passage 218, first and second heat exchangers 220, 222, the latter heat exchanger 222 being located in a second bypass flow passage 224.

System 200 further comprises a pair of main fluid conduits and a plurality of branch conduits. A first main conduit 226 and a second main conduit 228 respectively act as the supply and discharge headers or manifolds for the plurality of battery heat exchangers 150. The branch conduits include a plurality of first branch conduits 230 extending between the first main conduit 226 and each of the battery heat exchangers 150, each of which acts as a supply conduit to supply the heat transfer fluid to an inlet (port 42 in manifold cover 94) of one battery heat exchanger 150; and a plurality of second branch conduits 232, each of which acts as a discharge conduit for discharging the heat transfer fluid from the outlet (port 40 in manifold cover 90) of one battery heat exchanger 150.

To distinguish the four battery heat exchangers 150 in FIG. 19, they are identified by numbers 150-1, 150-2, 150-3 and 150-4. Heat exchangers 150-1 and 150-2 are paired (referred to herein as "first pair") and fluidically connected together by extended first and second fittings 48, 50, between which are provided a short-circuit flow conduit 132 and a secondary circulation pump 134. This is similar to the arrangement shown in FIG. 16, however, instead of being connected to conduits 154, 156, the first and second fittings 48, 50 of the heat exchanger 150 in FIG. 19 are joined to the first and second fittings 48, 50 of an adjacent heat exchanger 150. The heat exchangers 150-3 and 150-4 are similarly paired and referred to herein as the "second pair".

An additional short-circuit flow conduit 132 and secondary circulation pump 134 is provided between the branch conduits 230, 232 of battery heat exchanger 150-2. In addition, a secondary valve 234 is provided in the first main conduit 226, between the two pairs of battery heat exchangers 150.

In operation, the first pair of heat exchangers (150-1 and 150-2) and the second pair of heat exchangers (150-3 and 150-4) can be fluidically isolated from one another and from the remainder of system 200 by closing bypass valve 216 to block flow through second main conduit 228, and by also closing secondary valve 234 to fluidically isolate the first and second pairs of battery heat exchangers from each other. The primary circulation pump 214 may also be turned off. In this operating state, activating the secondary circulation pump 134 between the fittings 48, 50 in each pair of battery heat exchangers 150 results in circulation of the heat transfer fluid through each pair of battery heat exchangers. These secondary circulation pumps 134 may be operated independently of one another, such that there may be circulation through one or both pairs of heat exchangers 150. Also, it will be appreciated that one or both of the heat exchangers 150 of each pair will be provided with one or more electrical heating elements 52 (not shown in FIG. 19) so as to rapidly heat the fluid flowing through the pair of heat exchangers.

In another mode of operation, the four battery heat exchangers 150 can be operated together in isolation from the remainder of the system 200. In this operating state, the second valve 234 is opened, while valve 216 remains closed. In this case, the secondary circulation pumps 134 between adjacent heat exchangers 150 are de-activated, and the secondary circulation pump 134 between the branch conduits 230, 232 of battery heat exchanger 150-2 is activated to cause the fluid to circulate through the four heat exchangers 150, without being circulated through the remainder of the system. Using the electric heating element(s) 52 of heat exchangers 150, the heat transfer fluid flowing through the heat exchangers 150 can be rapidly heated.

Once the heat exchangers 150 and/or the battery modules supported thereon reach a predetermined temperature, primary circulation pump 214 is activated and the bypass valve 216 is opened to permit the heat transfer fluid to circulate through the entire system 200.

The system 200 also includes a bypass operating state wherein the bypass valve 216 is closed as described above, and the primary circulation pump 214 is activated, permitting the heat transfer fluid to circulate through heat exchangers 150 and bypass heat exchangers 220 and 222.

Figure 20:
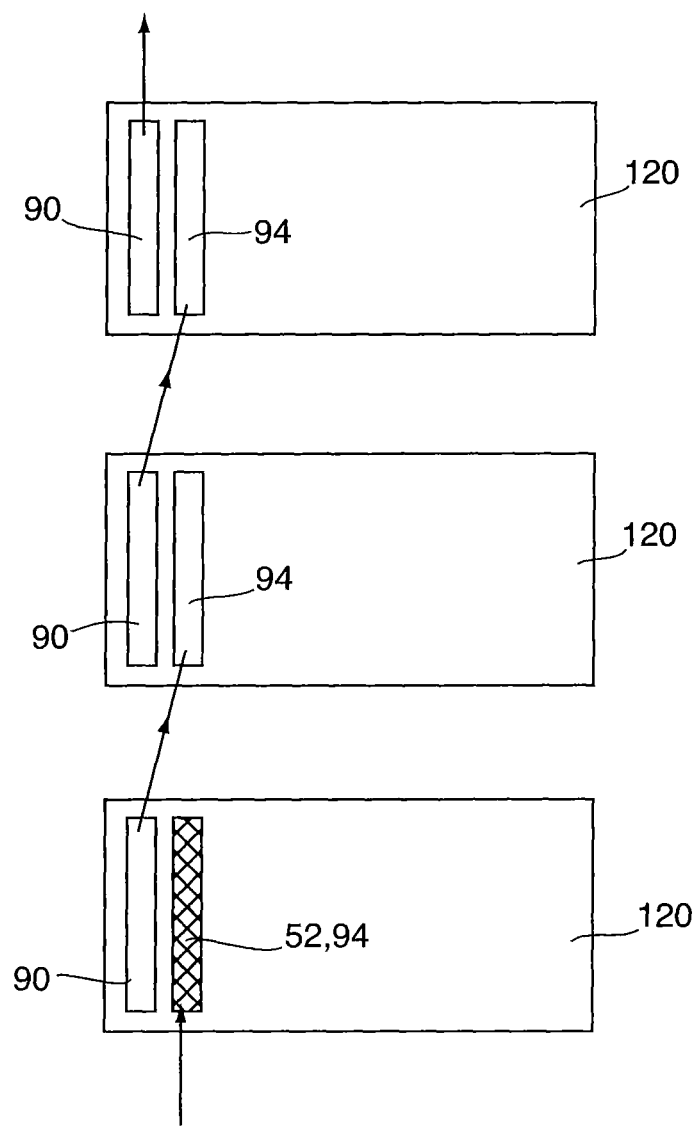
FIG. 20 is a schematic illustration of a portion of another thermal management system.

FIG. 20 illustrates a portion of a thermal management system 170 in which a plurality of battery heat exchangers 68 or 120 are joined together in series, with the inlet opening 42 of one heat exchanger 120 being joined to the outlet opening 40 of an adjacent heat exchanger 120. In this embodiment one of the heat exchangers 120 may be provided with an electrical heating element 52 on manifold cover 94, although more than one heating element 52 may be provided on the same or different heat exchangers 68, 120.

The heat exchangers described in the above embodiments are "cold plates". As now described with reference to FIGS. 21 to 25, electric heating elements 52 may also be incorporated into battery thermal management systems which utilize "ICE" ("inter-cell elements") plate heat exchangers. ICE plate heat exchangers are arranged or "sandwiched" between the adjacent pouch cells or prismatic cells of a vehicle battery, the individual ICE plate heat exchangers being fluidically connected together by common inlet and outlet manifolds which are provided in structural members for supporting the ICE plate heat exchangers and the battery cells of a battery module.

Figure 21:
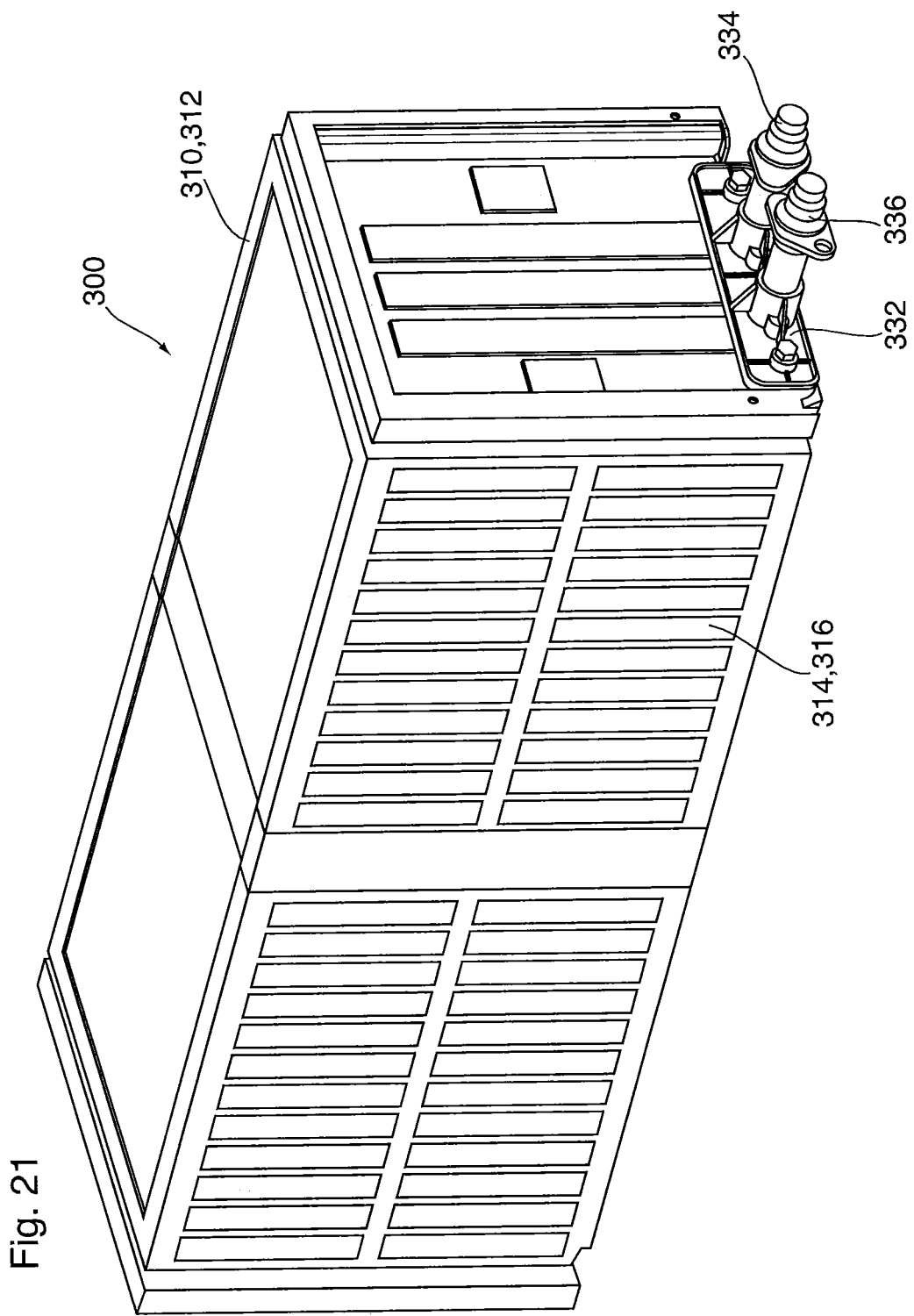
FIG. 21 is a perspective view of a battery module incorporating ICE plate heat exchangers.

FIG. 21 illustrates a battery module 300 including a plurality of ICE plate heat exchangers 310 and a plurality of battery cells 312 in the form of pouch cells, with one or more ICE plate heat exchangers 310 being received between adjacent battery cells 312. The battery module 300 includes a support structure 314 for supporting the ICE plate heat exchangers 310 and battery cells 312, wherein the support structure 314 also includes flow passages for supplying heat transfer fluid to the ICE plate heat exchangers 310, wherein the flow passages are located under the ICE plate heat exchangers 310 and battery cells 312 in the base of the support structure 314. The support structure includes a plurality of support frames 316.

Figure 23:
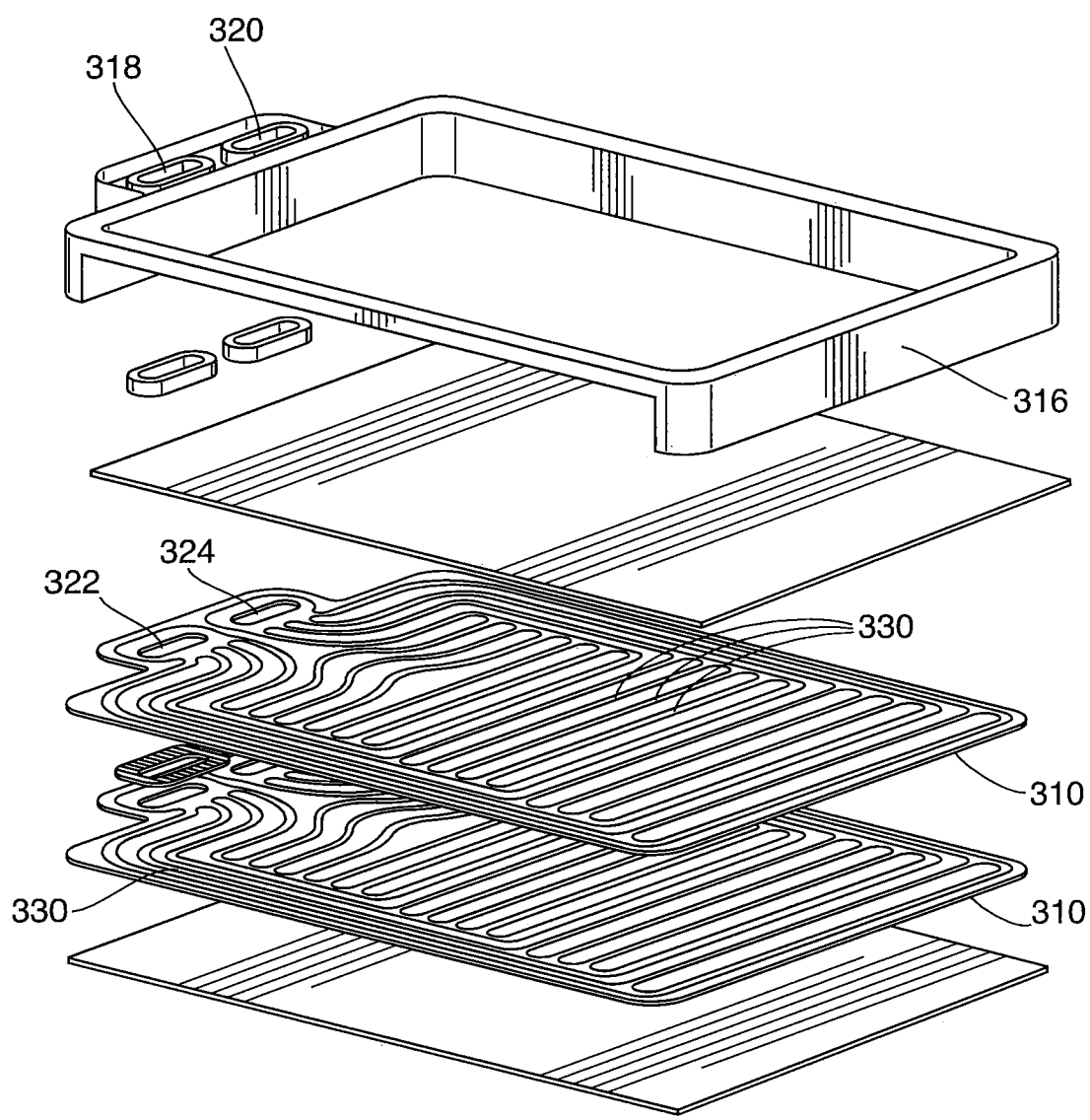
FIG. 23 is an exploded view of a portion of the battery module of FIG. 21.

As shown in FIG. 23 each support frame 316 has an upper portion comprising a frame with a rectangular perimeter for receiving and supporting the ICE plate heat exchangers 310 and battery cells 312, and a base portion having first and second fluid openings 318, 320. In the assembled battery module 300 the support frames 316 form face seals with fluid openings 322, 324 of the ICE plate heat exchangers 310, with the assistance of spacers and/or gaskets, such that the base portion of the battery module 300 has two continuous fluid flow passages 326, 328 extending along its length, these fluid flow passages 326, 328 being in flow communication with internal fluid flow passages 330 of the ICE plate heat exchangers 310. The fluid flow passages 326, 328 are essentially inlet and outlet manifolds for the fluid flow passages 330 of the ICE plate heat exchangers 310.

Figure 22:
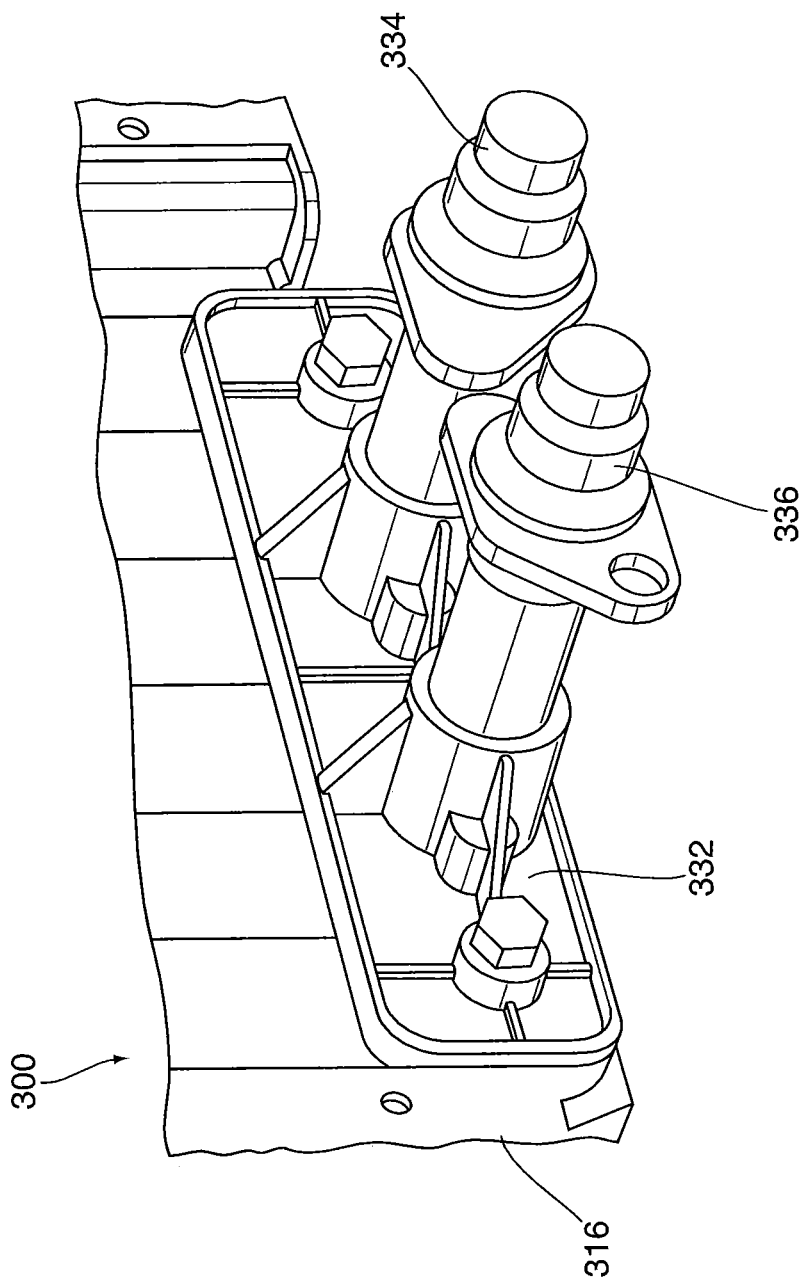
FIG. 22 is a close-up of a portion of the battery module of FIG. 21.

As shown in the close-up of FIG. 22, the support structure 316 may further include a front end plate 332 having fluid fittings 334, 336 through which the heat transfer fluid is supplied to and discharged from the fluid flow passages 326, 328.

Figure 24:
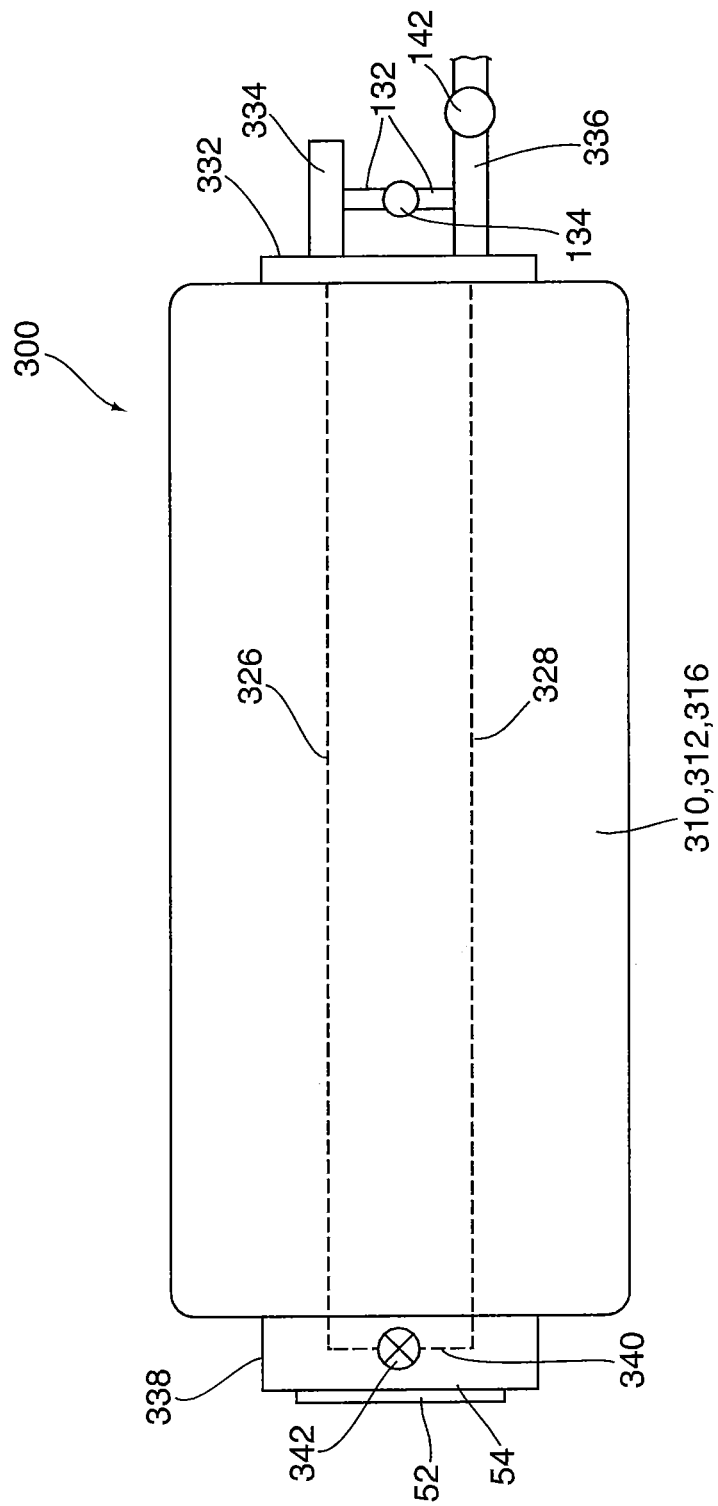
FIG. 24 is a schematic top plan view of the battery module of FIG. 21.

As shown in the schematic top view of FIG. 24, the support structure 316 also includes a rear end plate 338 having an internal fluid flow passage 340 providing flow communication between the ends of fluid flow passages 326, 328. A valve 342 is located in the internal fluid flow passage 340 to alternately block and permit flow through the internal fluid flow passage 340.

Provided on an outer surface of rear end plate 338 is an electric heating element 52 and external heater support surface 54, as described in the embodiments above. Where the rear end plate 338 is comprised of a metal such as aluminum, the electric heating element 52 may be attached directly to the rear end plate 338.

In normal operation the valve 342 is closed, such that there is no direct flow communication between fluid flow passages 326, 328. The passages 326, 328 therefore act as inlet and outlet manifolds under normal operation, i.e. where heating of the battery cells 312 is not required, and all the fluid will be forced to flow through the internal fluid flow passages 330 of ICE plates 310, thereby cooling the battery cells 312.

When the valve 342 is opened and the electric heating element 52 is activated, the fluid will be heated as it circulates between fluid flow passages 326, 328. Once the fluid is heated the valve 342 will be closed and normal circulation will resume. Thus, this modification of the rear end plate 338 allows for heating of the fluid circulating through the battery module 300. It will be appreciated that a plurality of battery modules 300 may be connected in series, with one or more of the battery modules 300 having electric heating elements 52 and providing heating for the fluid circulating through all the connected battery modules 300.

Figure 25:
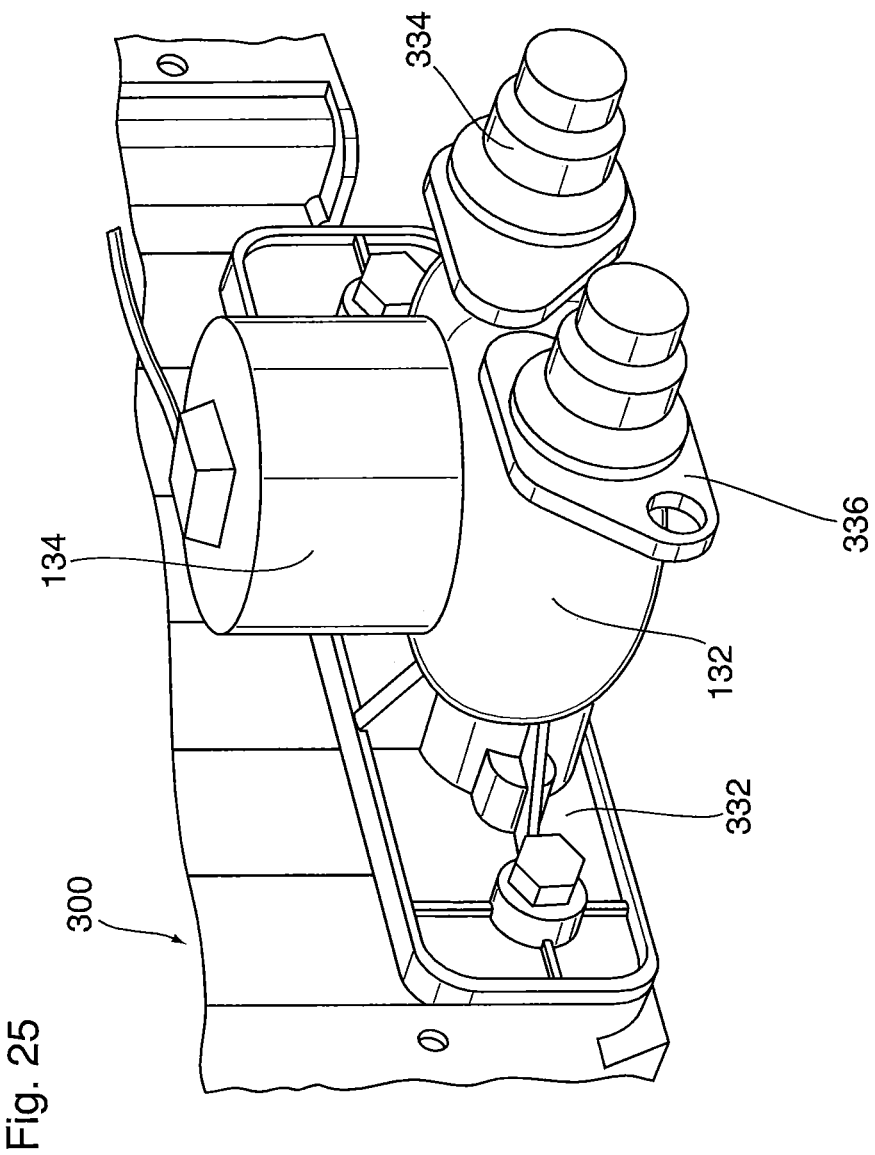
FIG. 25 is a close-up of a modified front end plate of the battery module of FIG. 21.
Figure 26:
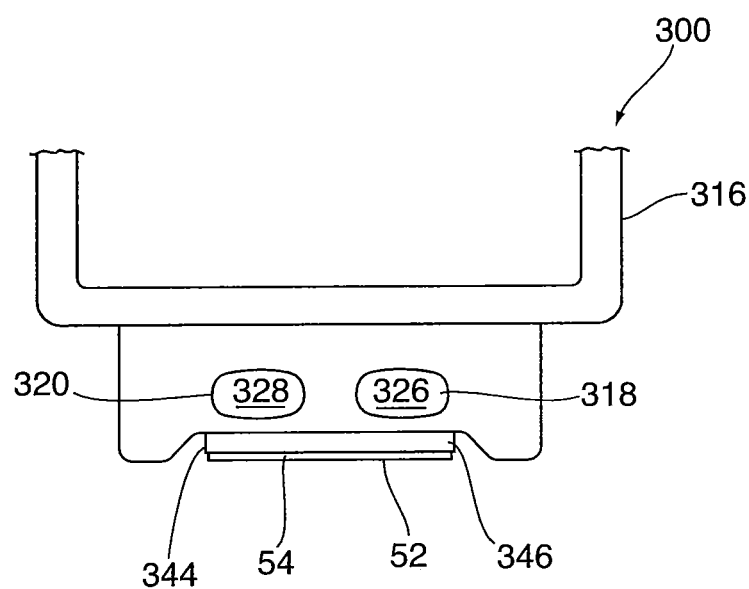
FIG. 26 is a schematic front view of a portion of a modified battery module having a saddle heater.

In addition to providing the battery module 300 with an electric heating element 52 as described above, the battery module may also be provided with a short-circuit flow conduit 132 and secondary circulation pump 134 as described above with reference to heat exchanger 130. For example, as shown in FIG. 25, and as schematically shown in FIG. 24, the short-circuit flow conduit 132 and secondary circulation pump 134 may be incorporated into the front end plate 332 and/or fittings 334, 336. In cooperation with a short-circuit flow control 142 as described above, which isolates battery module 300 from the remainder of the thermal management system, the short-circuit flow conduit 132 and secondary circulation pump 134 provide for recirculation of the volume of heat transfer fluid in battery module 300, thereby permitting rapid heating of the heat transfer fluid with electric heating element 52.

Instead of providing the electric heating element 52 and external heater support surface 54 on the rear end plate 338, the battery module 300 may instead be provided with a saddle heater 344 which is provided on the underside of the base portion of the support structure 314, in close proximity to the fluid flow passages 326, 328.

The saddle heater comprises a metal plate 346 which may be comprised of aluminum, and which is secured to the undersides of the support frames 316. For example, the upper surface of plate 346 may be secured to the undersides of support frames 316. The opposite lower surface of the metal plate provides the external heater support surface 54 on which one or more electric heating elements 52 is/are provided. The metal plate 346 and/or electric heating element(s) 52 may extend along part or all of the length of the battery module 300.

Figure 27:
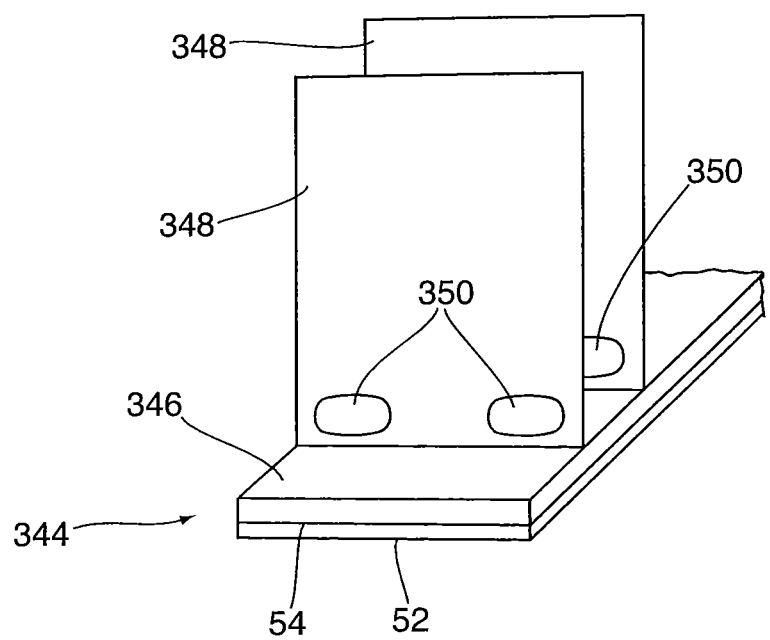
FIG. 27 is a partial view of the saddle heater of FIG. 26.

FIG. 27 shows a portion of a saddle heater 344 which includes heat conducting fins 348 projecting upwardly from the upper surface of metal plate 346. These fins 348 may have various shapes, however, in the present embodiment the fins 348 are rectangular and include openings 350 so as not to block fluid flow passages 326, 328. The heat conducting fins 348 are adapted to extend between battery cells 312 and/or ICE plate heat exchangers 310.

The following description focuses on modifications to battery cooling/heating subsystems which can reduce heat-up time and/or energy consumption under cold start conditions, and which will also provide cooling of the rechargeable battery once it reaches its operating temperature range. Each of the following embodiments relates to a battery cooling/heating subsystem comprising a plurality of battery heat exchangers which are fluidically connected together in parallel and/or series arrangement, wherein each battery heat exchanger comprises a fluid-carrying plate structure for cooling one or more individual battery cells and/or one or more of the battery modules comprising the rechargeable battery.

Unless otherwise indicated, the battery heat exchangers in the following embodiments may either comprise "cold plate" heat exchangers or "ICE" ("inter-cell elements") plate heat exchangers. A cold plate heat exchanger is a heat exchanger having a flat upper surface upon which one or more battery cells is arranged, wherein the number of battery cells associated with each cold plate is variable and may, depending on the area of the cold plate, comprise one or more battery modules. Typically, the battery cells arranged on the cold plate will be prismatic cells or cylindrical cells, which are housed in rigid containers. For example, prismatic cells may be housed in box-like containers which are arranged in face-to-face contact with each other.

In the following description and in the claims, battery cells and battery modules may be generically referred to as "battery units".

Figure 28:
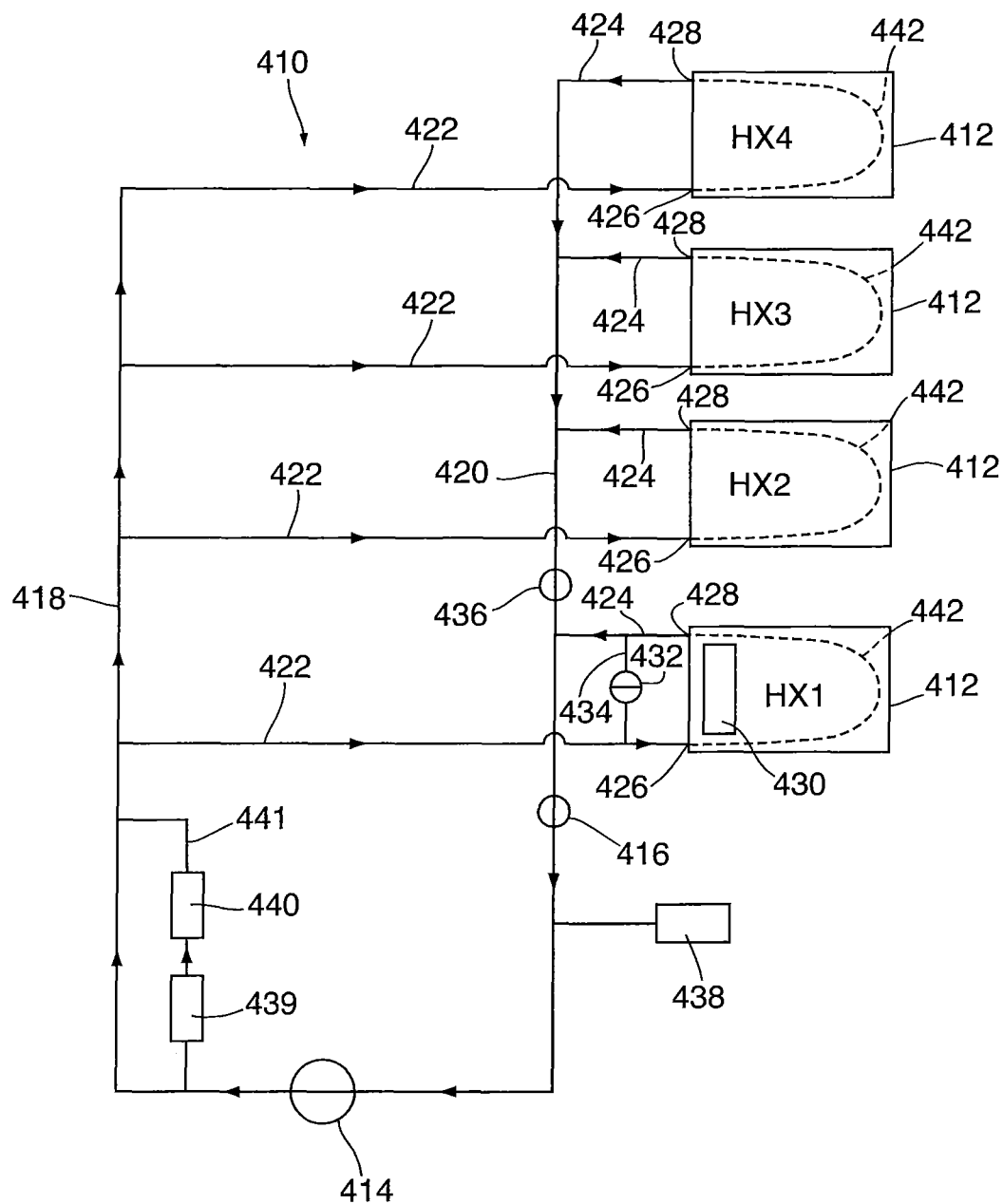
FIG. 28 illustrates a thermal management system according to a second embodiment, in a first mode of operation.
Figure 29:
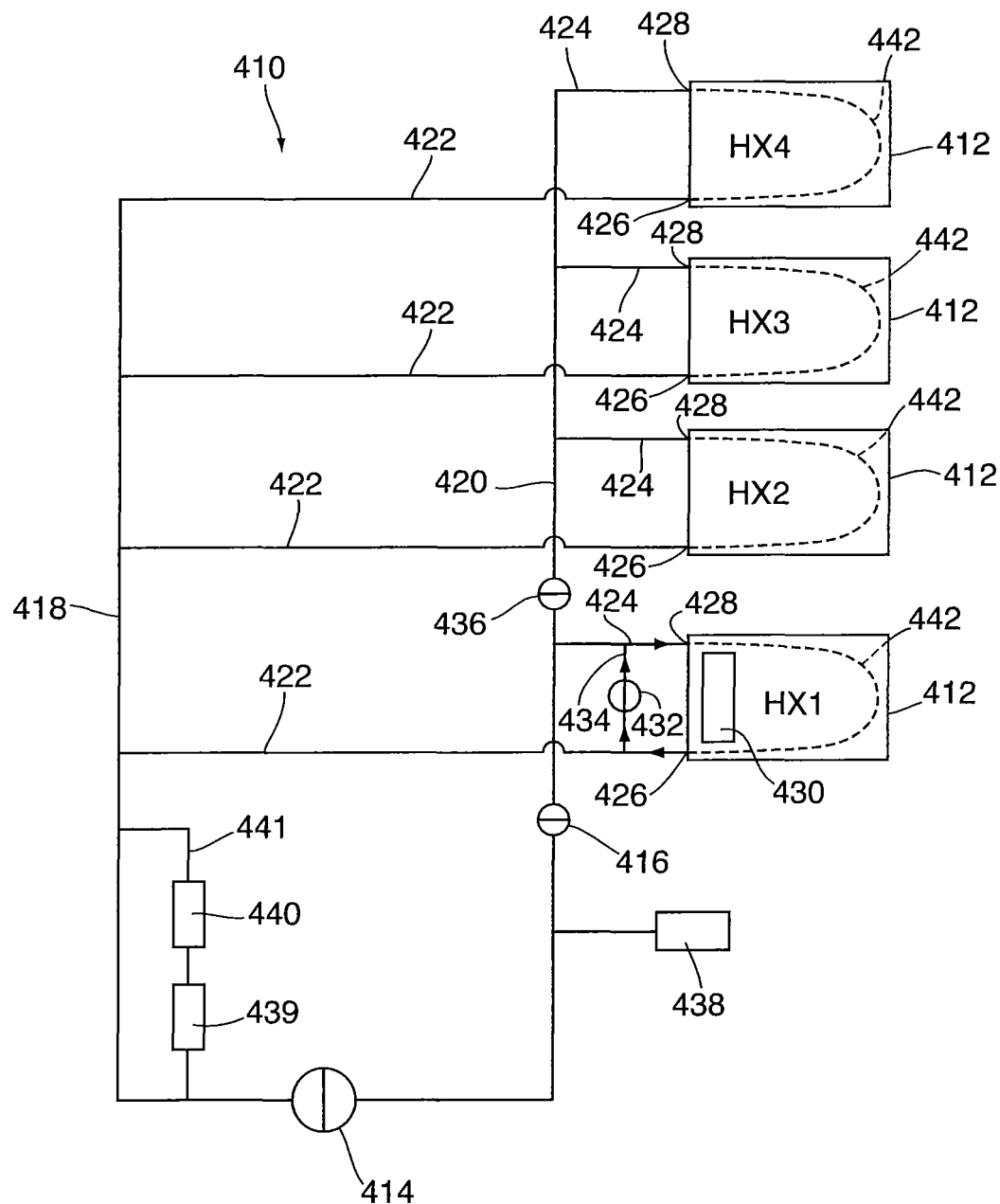
FIG. 29 illustrates the thermal management system of FIG. 28, in a second mode of operation.
Figure 30:
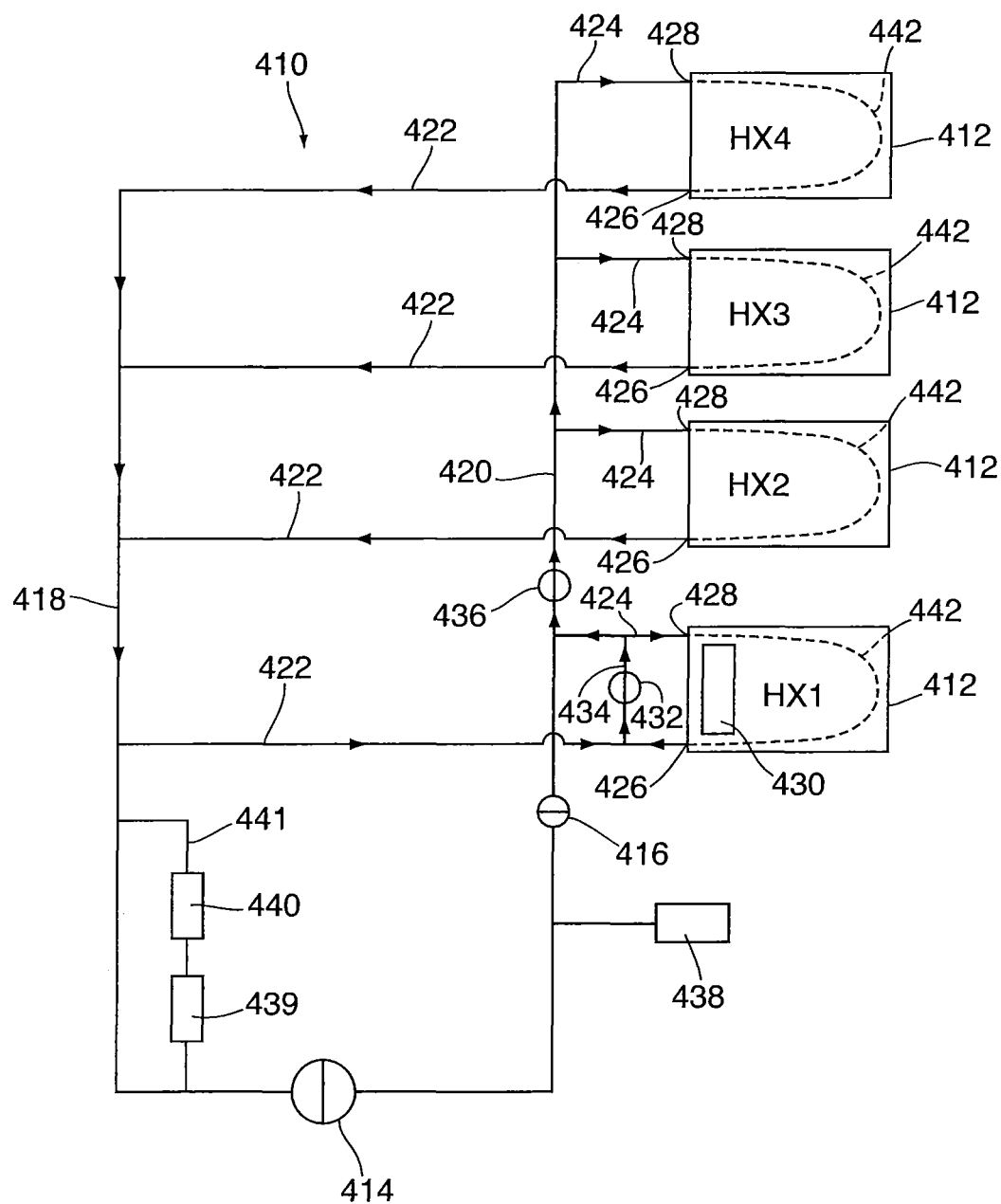
FIG. 30 illustrates the thermal management system of FIG. 28, in a third mode of operation.

FIGS. 28 to 30 illustrate a battery cooling/heating subsystem 410 according to a second embodiment, in different modes of operation. The subsystem 410 includes a plurality of battery heat exchangers 412 which are arranged in parallel. A total of four battery heat exchangers 412 are illustrated in FIGS. 28 to 30, and are additionally identified as HX1 to HX4 for the purpose of distinguishing them from one another. The battery heat exchangers 412 can be any of the cold plates or ICE plates described herein, and each battery heat exchanger 412 is in thermal contact with one or more battery cells and/or battery modules. It will also be appreciated that the subsystem 410 may include fewer battery heat exchangers 412 than shown (e.g. two or three), or that subsystem 410 may include more than four battery heat exchangers 412.

The subsystem 410 further comprises a primary circulation pump 414 for pumping a liquid heat transfer fluid (also referred to herein as "coolant") through the subsystem 410, and a primary valve 416 for alternately permitting and blocking flow of the heat transfer fluid to and/or from the primary circulation pump 414. In the present embodiment the primary valve 416 is located immediately upstream of the primary circulation pump 414, however, the primary valve 416 may instead be located downstream of pump 414. The primary circulation pump 414 may comprise a conventional centrifugal pump. Alternatively, the primary circulation pump 414 may comprise a positive displacement pump which prevents backflow of the heat transfer fluid when it is off, thereby eliminating the need for a separate primary valve 416. Unless otherwise indicated in the following descriptions, all embodiments described herein which include a pump 414 and valve 416 may instead be provided with a positive displacement pump.

The subsystem 410 further comprises a pair of main fluid conduits and a plurality of branch conduits extending between the main fluid conduits and the heat exchangers for parallel supply and discharge of the heat transfer fluid to/from each of the battery heat exchangers 412. In the illustrated embodiment the main fluid conduits include a first main conduit 418 and a second main conduit 420 which respectively act as the supply and discharge headers or manifolds for the plurality of battery heat exchangers 412 arranged in parallel. The branch conduits include a plurality of first branch conduits 422 extending between the first main conduit 418 and each of the battery heat exchangers 412, each of which acts as a supply conduit to supply the heat transfer fluid to an inlet of one of the battery heat exchangers 412 in FIG. 28; and a plurality of second branch conduits 424, each of which acts as a discharge conduit for discharging the heat transfer fluid from the outlet of one of the battery heat exchangers 412 in FIG. 28. The first main conduit 418 is a supply conduit which extends from the outlet of primary circulation pump 414 to the first branch conduits 422, while the second main conduit 420 is a return conduit extending from the second branch conduits 424 to the inlet of the primary circulation pump 414. It will be appreciated that the distinction between first and second main conduits 418, 420 is somewhat arbitrary, and is intended to lend clarity to the present description.

The main conduits 418, 420 and/or the branch conduits 422, 424 may be provided with means for balancing the fluid flow to the plurality of battery heat exchangers 412. For example, the cross-sectional areas of the branch conduits 422, 424 may be graduated such that there is greater flow restriction in one or both of the branch conduits 422, 424 connected to HX1, which is closest to pump 414, and lesser flow restriction in one or both of the branch conduits 422, 424 connected to HX4, which is farthest from pump 414, such that the flow to the battery heat exchangers 412 will be balanced. The graduation in the areas of conduits 422 and/or 424 can be accomplished in a number of ways, including the use of graduated orifices, graduated conduit diameters, and/or differing degrees of local constriction or deformation of the conduits 422 and/or 424.

Each of the battery heat exchangers 412 is illustrated as having first and second fluid openings 426, 428 located along or adjacent to one of the edges of the battery heat exchanger 412, wherein each first fluid opening 426 is in fluid communication with one of the first branch conduits 422, and each second fluid opening 428 is in fluid communication with one of the second branch conduits 424. Each of the fluid openings 426, 428 may function as an inlet or outlet for the internal fluid flow passage 442 of each battery heat exchanger 412, depending on the direction of fluid flow through the battery heat exchanger 412. For example, in the operating mode illustrated in FIG. 28, each first fluid opening 426 is an inlet, and each second fluid opening 428 is an outlet. However, it will be appreciated that the direction of fluid flow through heat exchangers 412 may change in different modes of operation of subsystem 410, and therefore the openings are generally referred to herein as fluid openings rather than inlet or outlet openings. Also, the fluid flow passages 442 are shown in dotted lines in FIG. 28 to generally indicate the U-shaped, counterflow or "two-pass" flow path followed by the heat transfer fluid therein. It will be appreciated that the fluid flow passage 442 may occupy substantially the entire area of each heat exchanger 412.

One of the battery heat exchangers 412 includes an integral electric heating element 430 which is positioned on an outer surface of the battery heat exchanger 412 for heating the heat transfer fluid flowing through the internal fluid flow passage 442 of the battery heat exchanger 412. In the present embodiment the electric heating element 430 is integrated with the first battery heat exchanger 412 (also referred to as HX1), which is closest (i.e. "proximal") to primary pump 414, although it may instead be integrated with any one of the other battery heat exchangers HX2 to HX4.

The battery cooling/heating subsystem 410 further comprises a secondary circulation pump 432 which is provided in a short circuit fluid flow conduit 434 connecting the first and second fluid openings 426, 428 (i.e. the inlet and outlet) of the battery heat exchanger 412 having the electric heating element 430, i.e. the first heat exchanger HX1 in FIGS. 28 to 30. The secondary circulation pump 432 and short circuit fluid flow conduit 434 are shown in FIGS. 28 to 30 as being fluidically connected between the first and second branch conduits 422, 424 connected to first heat exchanger HX1, however, as further discussed below, the secondary circulation pump 432 and short circuit fluid flow conduit 434 may either be separate from or integrated with the first battery heat exchanger HX1.

The secondary circulation pump 432 may be a positive displacement pump which provides fluid flow communication between the first and second branch conduits 422, 424 when pump 432 is activated, but which prevents backflow between conduits 422, 424 when pump 432 is de-activated. Although a positive displacement pump may be advantageous where a compact construction is desired, it will be appreciated that the secondary circulation pump 432 is not necessarily a positive displacement pump, but may be replaced by a combination of a centrifugal pump with a backflow prevention valve, similar to the combination of primary circulation pump 414 and primary valve 416 described above. Unless otherwise indicated in the following description, all embodiments described herein which include a positive displacement pump 432 may instead be provided with a centrifugal pump and a backflow prevention valve.

Also shown in FIGS. 28 to 30 is an optional secondary valve 436 which is provided in one of the main conduits 418, 420 between the first battery heat exchanger HX1 and the other battery heat exchangers HX2 to HX4, for reasons which will be discussed in detail below. In the present embodiment, the secondary valve 436 is provided in the second main conduit 420 between the second branch conduits 424 connected to the respective first and second battery heat exchangers HX1 and HX2. However, it will be appreciated that the optional secondary valve 436 may instead be provided in the first main conduit 418 between the first branch conduits 422 connected to the respective first and second battery heat exchangers HX1 and HX2.

The subsystem 410 may includes a reservoir or "bottle" 438 for the heat transfer fluid, which may be located between the primary pump 414 and primary valve 416. The subsystem 410 also includes at least one heat exchanger for removing excess heat from the subsystem 410. For example, subsystem 410 is shown as including a secondary radiator 439 for rejecting excess heat to the ambient, and a chiller 440 immediately downstream of secondary radiator 439 to further cool the heat transfer fluid. The two heat exchangers 439, 440 are located downstream of the primary pump 414 and upstream of the branch conduits 422 and/or 424. As shown in FIGS. 28 to 30, the heat exchangers 439, 440 may be provided in a branch conduit 441 which branches off from main conduit 418 downstream of the primary pump 414 and which re-joins main conduit 418 upstream of the branch conduits 422. A three-port valve (not shown) may be provided, for example at one of the junctions between conduits 418 and 441, to control whether the heat transfer fluid flows through the branch conduit 441 or whether it flows through the main conduit 418 and bypasses branch conduit 441 and the heat exchangers 439, 440. It will be appreciated that subsystem 410 may optionally include only one heat exchanger 439 or 440.

With the pumps 414, 432 and valves 416, 436 configured as in FIG. 28, and with the electric heating element 430 de-activated (i.e. off), the subsystem 410 is in the "cooling mode", with the entire battery ideally being within its optimal temperature range for charging and/or discharging. In the cooling mode, the battery cells operate exothermically and generate heat, and the battery heat exchangers 412 remove heat from the battery cells and/or battery modules and transfer it to the circulating heat transfer fluid for eventual removal by heat exchangers 439 and/or 440. Therefore, as shown in FIG. 28, at least a portion of the heat transfer fluid of subsystem 410 may be routed through branch conduit 441 and heat exchangers 439, 440 with subsystem 410 in the cooling mode.

In the cooling mode of FIG. 28, the primary circulation pump 414 is activated (i.e. on), the primary valve 416 is open, and the secondary valve 436 (where one is provided) is open. Also, the secondary circulation pump 432 is off, meaning that there is no short-circuit flow of heat transfer fluid through the short circuit flow conduit 434.

The direction of fluid flow in subsystem 410, when in cooling mode, is shown by arrows in FIG. 28. It can be seen that the first main conduit 418 serves as an inlet header or manifold; second main conduit 420 serves as an outlet header or manifold; the first branch conduits 422 serve as the inlet conduits for the battery heat exchangers 412; the second branch conduits 424 serve as the outlet conduits for the battery heat exchangers 412; and the first and second fluid openings 426, 428 of each battery heat exchanger 412 respectively serve as the inlet and outlet.

While the configuration of subsystem 410 in FIG. 28 is typically used in cooling mode, it is possible to use the configuration of FIG. 28 in "heating mode", which is exactly the same as the FIG. 28 cooling mode described above, except that the electric heating element 430 is activated to heat the heat transfer fluid circulating through the subsystem 410, and the heat transfer fluid may partly or completely bypass branch conduit 441 and heat exchangers 439, 440. The FIG. 28 heating mode may be used, for example, under moderately cold conditions where a relatively small amount of heat is required to bring the entire battery to its optimum temperature for charging and/or discharging.

While the FIG. 28 heating mode may be used to start the HEV/BEV under cold conditions, this is not optimal since the entire volume of heat transfer fluid circulating through subsystem 410 (also referred to herein as the "first volume") must be heated to warm the entire battery to its desired operating temperature. Thus, cold starting of the HEV/BEV in the FIG. 28 heating mode may require too much time and/or energy.

FIG. 29 illustrates how subsystem 410 may be configured for faster heating and/or lower energy consumption during cold start conditions. In the heating mode configuration of FIG. 29, the electric heating element 430 is activated, the primary circulation pump 414 is off, the primary valve 416 is closed, the secondary valve 436 is closed, and the secondary circulation pump 432 is on, meaning that only short-circuit flow of heat transfer fluid through the short circuit flow conduit 434 and first heat exchanger HX1 is permitted, and there is no flow of heat transfer fluid through HX2 to HX4 or the branch conduits 422, 424 to which they are connected, and no flow of heat transfer fluid through the main conduits 418, 420 or branch conduit 441.

As indicated by arrows in FIG. 29, essentially only the volume of heat transfer fluid in first heat exchanger HX1 will be heated by the electric heating element 430, meaning that the battery cell(s) and/or battery module(s) which are in thermal contact with HX1 can be brought to their desired temperature range within a relatively short period of time and with relatively low initial energy consumption. During this time where only HX1 and its associated battery cell(s) and/or battery module(s) are being heated, the HEV/BEV can be started under cold conditions. However, to avoid damaging the battery modules associated with HX2 to HX4, the control system of the HEV/BEV may avoid discharging the battery cells associated with HX2 to HX4, which remain cold, and instead rely primarily or exclusively on the battery cell(s) and/or module(s) associated with HX1, which have been heated to their desired temperature range for charging and/or discharging. For example, in some embodiments of the invention, the battery cell(s) and/or module(s) associated with HX1 may be configured to have the same voltage as the system voltage of the vehicle, thereby allowing the vehicle to be powered only by the battery cell(s) and/or module(s) associated with HX1 during and after initial start-up.

Once the heat transfer fluid circulating in the sub-loop of FIG. 29 reaches a sufficiently high threshold temperature, and/or the battery cell(s) and/or battery modules in thermal contact with HX1 reach a sufficiently high threshold temperature (e.g. about 5° C.), the configuration of subsystem 410 may be altered so that the heat transfer fluid which has been heated by electric heating element 30 circulates to the other heat exchangers HX2 to HX4. This can be done by adopting the FIG. 28 heating mode, i.e. by closing the secondary circulation pump 432, activating the primary circulation pump 414, opening the primary and secondary valves 416, 436, and keeping the electric heating element 430 on. This will allow circulation of the already-heated fluid from HX1 to circulate throughout the subsystem 410, while the electric heating element 430 continues to heat the entire volume of heat transfer fluid in subsystem 410. This heating of the entire fluid volume by the electric heating element 430 may continue after the vehicle is started and during its operation, such that the electric heating element 430 of heat exchanger HX1 is also used to heat the heat transfer fluid which is circulated through the other heat exchangers HX2 to HX4, thereby heating the battery cell(s) and/or module(s) which are in thermal contact with HX1.

FIG. 30 illustrates an alternate way in which subsystem 410 may be operated in heating mode to provide faster heating and/or lower energy consumption under cold start conditions. In the heating mode configuration of FIG. 30, the electric heating element 430 is activated, the primary circulation pump 414 is off, the primary valve 416 is closed, the secondary valve 436 is open or is not present, and the secondary circulation pump 432 is on, meaning that the flow of heat transfer fluid is restricted to the four heat exchangers 412, the branch conduits 422, 424 to which they are connected, and to the portions of main conduits 418, 420 which act as headers or manifolds for the heat exchangers 412.

The direction of fluid flow in subsystem 410, when in the heating mode of FIG. 30, is shown by arrows in FIG. 30. It can be seen from FIG. 30 that the heat transfer fluid is heated by electric heating element 430 as it is circulated through first heat exchanger HX1, and the heated fluid is then circulated through the other heat exchangers HX2 to HX4, to simultaneously heat all the battery cells and/or battery modules which are in thermal contact with heat exchangers 412, although not necessarily at the same rate, i.e. since HX1 has the heating element 430, it will have a greater heating rate than HX2 to HX4. Furthermore, since the heating mode of FIG. 30 does not heat all the heat transfer fluid in subsystem 410, it can provide faster heating of the fluid, using less energy, than the heating mode of FIG. 28.

Once the heat transfer fluid circulating in the sub-loop of FIG. 30 reaches a sufficiently high temperature, and/or the battery cells and/or battery modules in thermal contact with HX1 to HX4 reach a sufficiently high temperature, the configuration of subsystem 410 will be altered by activating the primary circulation pump 414 and opening the primary valve 416, while keeping the electric heating element 430 on to adopt the FIG. 28 heating mode. This will allow circulation of the heated fluid throughout the subsystem 410, while the electric heating element 430 continues to heat the entire volume of heat transfer fluid in subsystem 410 until the system and the battery reach their desired temperature, at which time the electric heating element 430 will be turned off and the subsystem will adopt the FIG. 28 cooling mode.

It will be appreciated that the embodiment of FIGS. 28 to 30 can be modified in a number of ways. For example, as described above, the secondary valve 436 is optional and can be eliminated, in which case the subsystem 410 can adopt the FIG. 30 heating mode, the FIG. 28 heating mode, and the FIG. 28 cooling mode.

Further, it is possible to provide electric heating elements 430 on two or more of the heat exchangers 412 for faster heating of the heat transfer fluid in one or more of the heating modes described above. For example, where both HX1 and HX2 are provided with electric heating elements 430, the secondary valve 436 (where one is provided) can be relocated to a point on either the first main conduit 418 or second main conduit 420 between HX2 and HX3. Similarly, where HX1, HX2 and HX3 all have electric heating elements 30, the secondary valve 436 can be relocated to between HX3 and HX4. In effect, such an embodiment would initially heat a larger proportion of the battery cells and/or modules making up the battery upon initial start-up. The decision as to how many heat exchangers 412 to provide with electric heating elements 430 will depend on several factors, such as the power density and cost of the electric heating elements 430, as well as the desired heating time and the target temperature.

Alternatively, it is also possible to provide one or more of HX2, HX3 and HX4 with electric heating elements 430, while maintaining the location of secondary valve 436 as shown in FIGS. 28 to 30 (i.e. between HX1 and HX2). With such an arrangement, the electrical heating element(s) 430 of HX2, HX3 and/or HX4 would be activated only after initial warm-up of HX1, i.e. with the subsystem 410 in the FIG. 30 heating mode, where the fluid is circulating through all four heat exchangers 412. Such a system would provide faster heating of the battery cells and/or modules associated with HX2 to HX4, after the vehicle is initially started using the battery cell(s) and/or module(s) associated with HX1. It will be appreciated that the electrical heating elements 430 may be independently operable by the vehicle's control system, and that the control system can select between various modes of operation so as to maximize efficiency under various operating conditions.

It will also be appreciated that the FIG. 30 heating mode, which simultaneously heats the fluid flowing through all heat exchangers 412, may serve as an intermediate heating mode, i.e. between the FIG. 29 heating mode and the FIG. 28 heating mode. Switching from the FIG. 29 heating mode to the FIG. 30 heating mode merely involves the opening of secondary valve 436; and switching from the FIG. 30 heating mode to the FIG. 28 heating mode involves the opening of primary valve 416, the activation of primary pump 414 and de-activation of secondary pump 432. Therefore, the subsystem of FIGS. 28 to 30 provides gradual or progressive heating of the battery cell(s) and/or module(s) which are in thermal contact with heat exchangers 412 by providing one or two different heating modes in which the volume of heat transfer fluid which is heated by electric heating element 430 is less than the total volume (i.e. the "first volume") of the subsystem 410. The volume of heat transfer fluid heated in the heating modes of FIGS. 29 and 30 is sometimes referred to herein as the "second volume", and is smaller than the "first volume".

Figure 31:
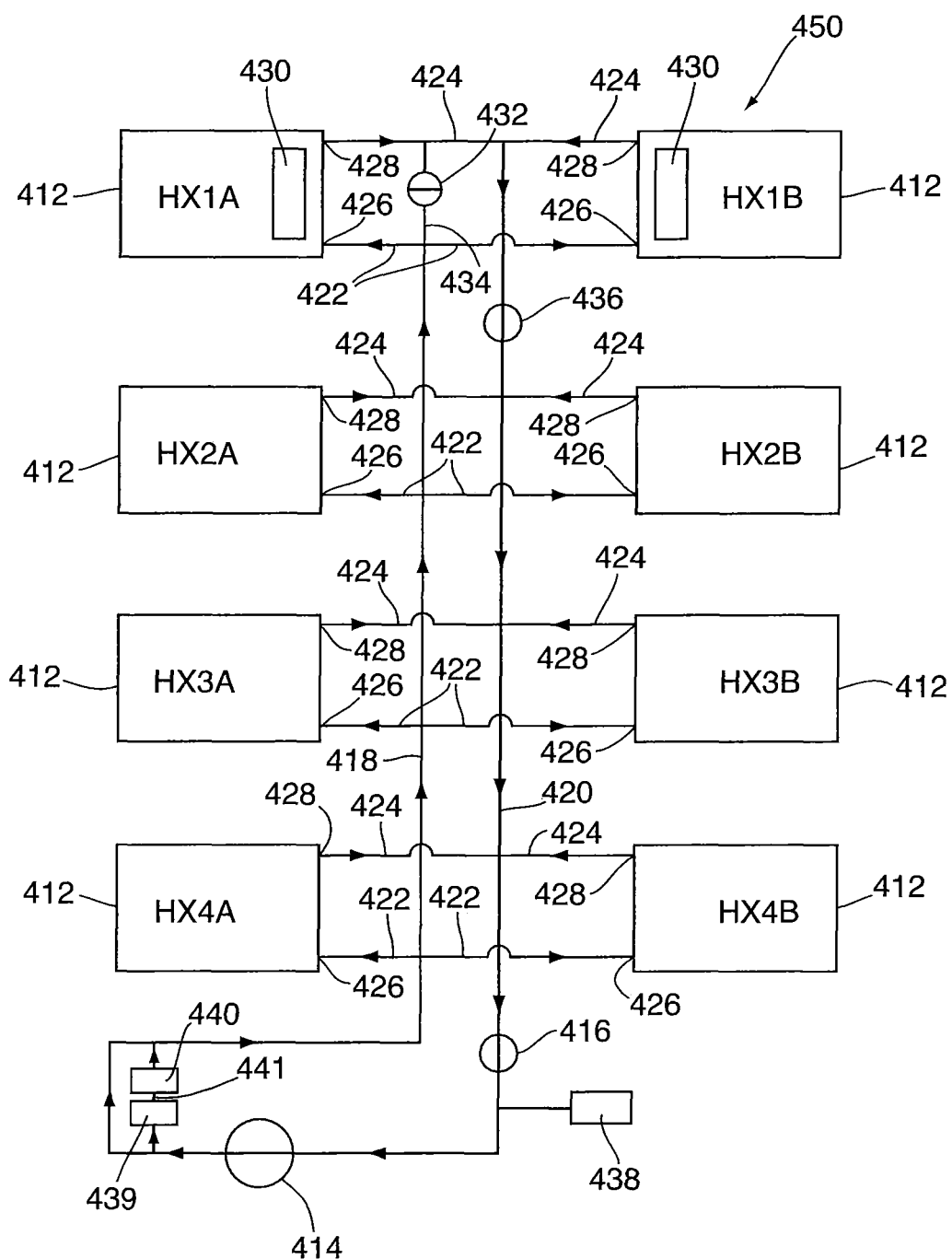
FIG. 31 illustrates a thermal management system according to a third embodiment, in a first mode of operation.
Figure 32:
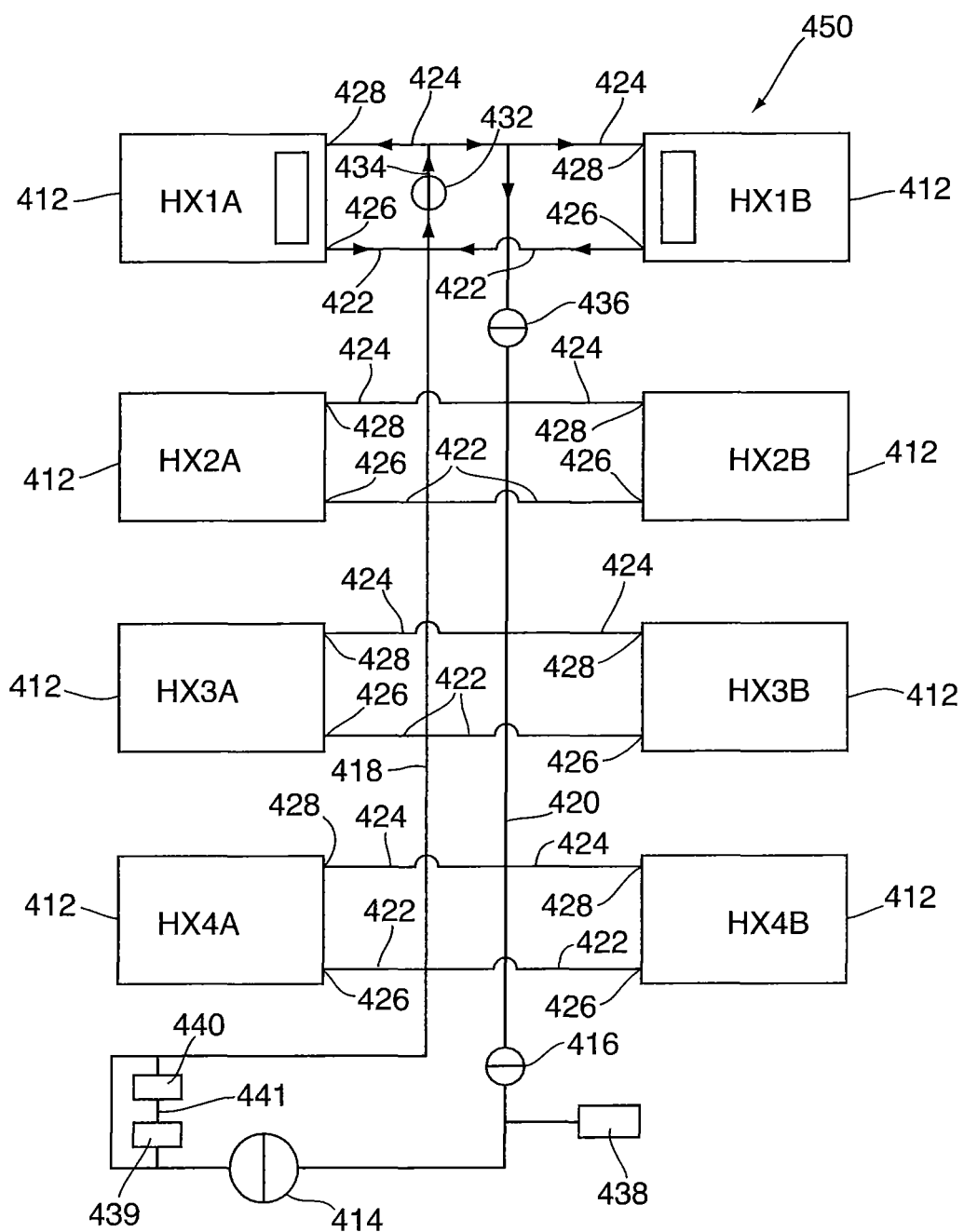
FIG. 32 illustrates the thermal management system of FIG. 31, in a second mode of operation.
Figure 33:
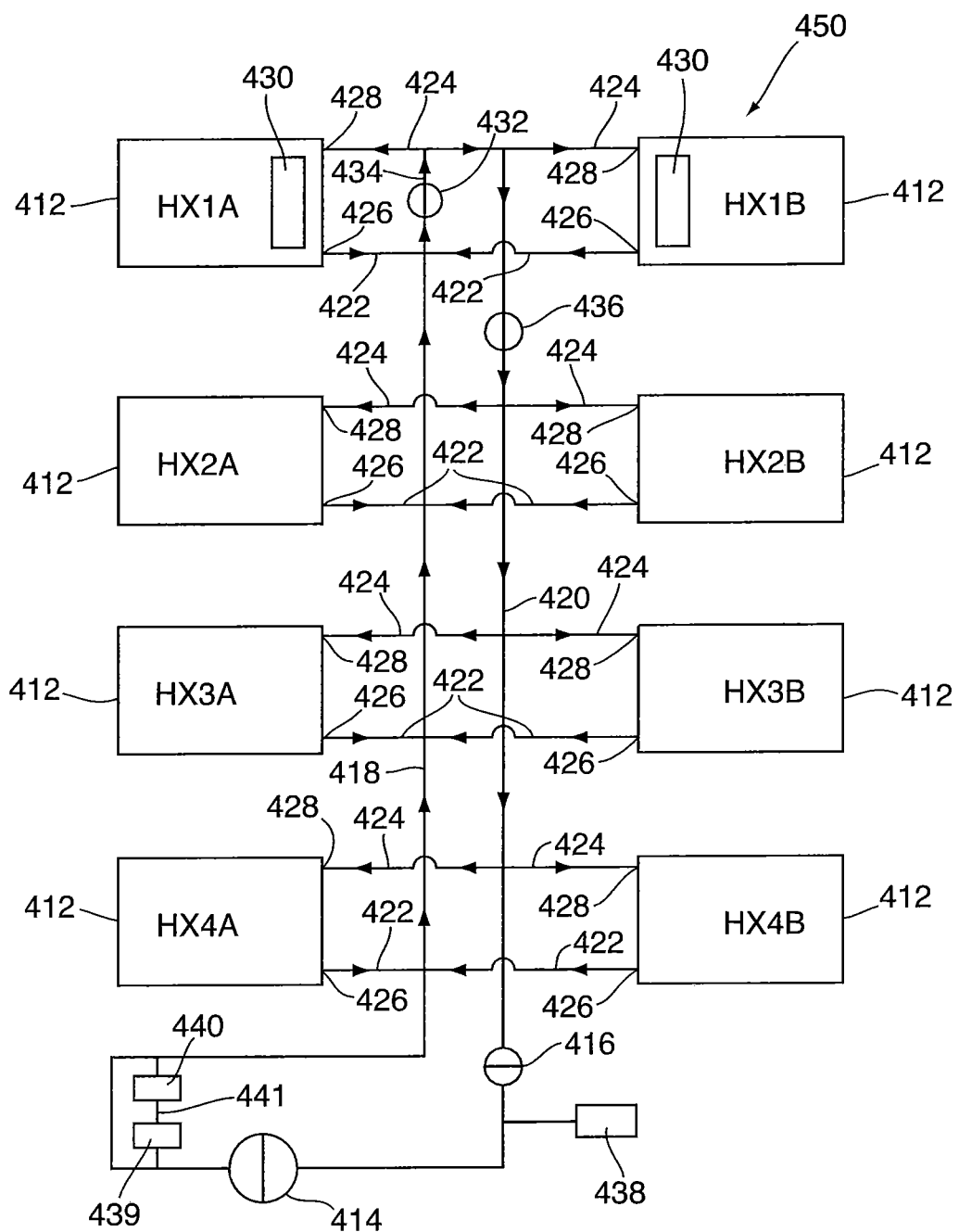
FIG. 33 illustrates the thermal management system of FIG. 31, in a third mode of operation.

FIGS. 31 to 33 illustrate a battery cooling/heating subsystem 450 according to a third embodiment, in different modes of operation. The subsystem 450 includes a plurality of pairs of battery heat exchangers 412 which are arranged in parallel. The subsystem 450 according to the third embodiment shares a number of common elements with the subsystem 410 of FIGS. 28 to 30, and like elements are identified with like reference numerals. The above descriptions of the elements of subsystem 410 apply equally to like elements of subsystem 450, unless indicated otherwise.

Subsystem 450 includes four pairs of battery heat exchangers 412 which are additionally identified as HX1A, HX1B, HX2A, HX2B, HX3A, HX3B, HX4A and HX4B for the purpose of distinguishing them from one another. The battery heat exchangers 412 can be cold plates or ICE plates and each battery heat exchanger 412 is in thermal contact with one or more battery cells and/or battery modules. Also, subsystem 450 may include more or fewer pairs of battery heat exchangers 412 than shown.

The subsystem 450 further comprises a primary circulation pump 414, a primary valve 416 located upstream or downstream of pump 414, a first main conduit 418, a second main conduit 420, a plurality of first branch conduits 422 extending between the first main conduit 418 and each of the battery heat exchangers 412, and a plurality of second branch conduits 424 extending between the second main conduit 420 and each of the battery heat exchangers 412. The main conduits 418, 420 and/or the branch conduits 422, 424 may be provided with means for balancing the fluid flow to the plurality of battery heat exchangers 412, as described in detail above.

Each of the battery heat exchangers 412 has first and second fluid openings 426, 428 in fluid communication with respective first and second branch conduits 422, 424. One or more of the battery heat exchangers 412 includes an integral electric heating element 430. In the present embodiment, the heat exchangers 412 making up the heat exchanger pair which is most remote from primary circulation pump 414 (i.e. distal pair HX1A and HX1B) are each provided with integral electric heating elements 430, and are sometimes referred to herein as the "first heat exchangers" or the "first pair" of heat exchangers. As further explained below, distal pair HX1A and HX1B will have the lowest pressure drop, as compared to the other heat exchanger pairs, when operated with secondary circulation pump 432.

The secondary circulation pump 432 is provided in a short circuit fluid flow conduit 434 connecting the first and second fluid openings 426, 428 of the battery heat exchanger HX1A, is connected to an end of the first main conduit 418, and comprises a positive displacement pump. The subsystem 450 also includes an optional secondary valve 436 which is provided in one of the main conduits 418, 420 between the first pair of battery heat exchangers (HX1A and HX1B) and the other battery heat exchangers 412. In the present embodiment, the secondary valve 436 is provided in the second main conduit 420 between the second branch conduits 424 connected to the respective first pair (HX1A, HX1B) and second pair (HX2A, HX2B) of battery heat exchangers 412.

With the pumps 414, 432 and valves 416, 436 configured as in FIG. 31, and with both of the electric heating elements 430 off, subsystem 450 will be in the "cooling mode", with the batteries ideally being within their optimal temperature range for charging and/or discharging. In the FIG. 31 cooling mode, the battery heat exchangers 412 remove heat from the battery cells and/or modules associated with each of the heat exchangers 412 and transfer it to the circulating heat transfer fluid. In the cooling mode, the primary circulation pump 414 is on, the primary valve 416 is open, the secondary valve 436 is open (or not present), and the secondary circulation pump 432 is off. Also, at least a portion of the heat transfer fluid may pass through the branch conduit 441 containing heat exchangers 439, 440.

As shown by the arrows in FIG. 31, the first main conduit 418 serves as an inlet header or manifold; second main conduit 420 serves as an outlet header or manifold; the first branch conduits 422 serve as the inlet conduits for the battery heat exchangers 412; the second branch conduits 424 serve as the outlet conduits for the battery heat exchangers 412; and the first and second fluid openings 426, 428 of each battery heat exchanger 412 respectively serve as the inlet and outlet.

The system configuration of FIG. 31 can also be used in "heating mode", which is exactly the same as the FIG. 31 cooling mode described above, except with one or both of the electric heating elements 430 activated to heat the entire volume ("first volume") of heat transfer fluid circulating through subsystem 450. The FIG. 31 heating mode may be used, for example, under moderately cold conditions where a relatively small amount of heat is required to bring the battery to its optimum temperature for charging and/or discharging. However, as explained above, the FIG. 31 heating mode will require too much time and/or may consume excessive amounts of energy during cold starting as it requires heating of the entire volume of heat transfer fluid in subsystem 450.

FIGS. 32 and 33 illustrate more optimal heating modes of subsystem 450 in which a smaller volume ("second volume") of heat transfer fluid is heated. In this regard, FIG. 32 shows a heating mode configuration which is analogous to that of FIG. 29. In the FIG. 32 heating mode, one or both electric heating elements 430 are activated, the primary circulation pump 414 is off, the primary valve 416 is closed, the secondary valve 436 is closed, and the secondary circulation pump 432 is on, meaning that short-circuit flow of heat transfer fluid through the short circuit flow conduit 434 is enabled. In this configuration, the flow of heat transfer fluid is restricted to the first pair of battery heat exchangers HX1A, HX1B, the short circuit flow conduit 434, and the branch conduits 422, 424 to which they are connected. In this case, the short circuit flow conduit 434 is connected across the supply and discharge sides of both first heat exchangers HX1A, HX1B. FIG. 32 also shows that there is no flow of heat transfer fluid through HX2A, HX2B, HX3A, HX3B, HX4A and HX4B, no flow through the branch conduits 422, 424 to which they are connected, and no flow through the main conduits 418, 420. Therefore, in the FIG. 32 heating mode, essentially only the volume of heat transfer fluid in first heat exchangers HX1A, HX1B will be heated by one or both of the electric heating elements 430, meaning that the battery cell(s) and/or module(s) which are in thermal contact with HX1A and HX1B can be brought to their desired temperature range within a relatively short period of time and with relatively low energy consumption. During this time where only HX1A and HX1B and their associated battery cell(s) and/or module(s) are being heated, the HEV/BEV can be started under cold conditions, for example where the battery cell(s) and/or module(s) associated with HX1A and HX1B are configured to have the same voltage as the system voltage of the vehicle, which may be 300V, for example. The control system of the HEV/BEV may avoid discharging the battery cells and/or modules associated with the other battery heat exchangers 412 during this time so as to avoid damaging them.

Once the heat transfer fluid circulating in the sub-loop of FIG. 32 reaches a sufficiently high threshold temperature, and/or the battery cell(s) and/or module(s) in thermal contact with HX1A and HX1B reach a sufficiently high threshold temperature (e.g. about 5° C.), the configuration of subsystem 450 will be altered so that the heat transfer fluid which is heated by one or both electric heating elements 430 circulates to the other battery heat exchangers 412. This can be done by adopting the FIG. 31 heating mode, i.e. by closing the secondary circulation pump 432, activating the primary circulation pump 414, opening the primary and secondary valves 416, 436, and keeping one or both of the electric heating elements 430 on. This will allow circulation of the already-heated fluid from HX1A and HX1B to circulate throughout the subsystem 450, while one or both of the electric heating elements 430 continues to heat the entire volume ("first volume") of heat transfer fluid in subsystem 450.

FIG. 33 illustrates an alternate heating mode which is analogous to that shown in FIG. 30. In the FIG. 33 heating mode, one or both electric heating elements 430 are activated, the primary circulation pump 414 is off, the primary valve 416 is closed, the secondary valve 436 is open or is not present, and the secondary circulation pump 432 is on, meaning that the flow of heat transfer fluid is restricted to the four pairs of heat exchangers 412, the branch conduits 422, 424 to which they are connected, and to the portions of main conduits 418, 420 which act as headers or manifolds for the heat exchangers 412. In the FIG. 33 heating mode, heated fluid is circulated through all the battery heat exchangers 412 to simultaneously heat all the battery cells and/or battery modules which are in thermal contact with heat exchangers 412. Furthermore, since only a portion of the heat transfer fluid is heated, the FIG. 33 heating mode can provide faster heating of the fluid, using less energy, than the FIG. 31 heating mode.

Once the heat transfer fluid circulating in the sub-loop of FIG. 33 reaches a sufficiently high temperature, and/or the battery cells or battery modules in thermal contact with the battery heat exchangers 412 reach a sufficiently high temperature, the configuration of subsystem 450 will be altered by activating the primary circulation pump 414 and opening the primary valve 416, while keeping one or both electric heating elements 430 on to adopt the FIG. 31 heating mode. It will be appreciated that progressive heating of the vehicle battery is possible with subsystem 450, with the FIG. 33 heating mode providing an intermediate heating stage between the FIG. 32 heating mode and the FIG. 31 heating mode. As described above, the change from the FIG. 32 heating mode to the FIG. 33 heating mode involves opening of secondary valve 436. It will be appreciated that secondary valve 436 may be opened gradually and/or partially in order to provide progressive warm-up, optimal fluid distribution, and/or to prevent backflow of heat transfer fluid between HX1A and HX1B and the other battery heat exchangers 412 of subsystem 450. In addition, the two heating elements 430 in subsystem 450 can be switched on individually or together, providing additional opportunities for progressive warm-up in any of the heating modes of FIGS. 31-33.

It will be appreciated that subsystem 450 can be modified in a number of ways, for example, the optional secondary valve 436 can be eliminated so that subsystem 50 is able to adopt the FIG. 33 heating mode and the FIG. 31 heating and cooling modes. Even without secondary valve 436, it will be appreciated that there will still be some preferential circulation of heat transfer fluid in HX1A and HX1B during the warm-up period, i.e. because the heat exchangers 412 farthest from primary circulation pump 414 will have the lowest pressure drop flow restriction orifices, and because the fluid heated by the electric heating elements of HX1A and/or HX1B will have lower viscosity than the fluid elsewhere in subsystem 450. It is also possible to provide electric heating elements 430 on one or more additional heat exchangers 412 of subsystem 450 for faster heating of the heat transfer fluid in one or more of the heating modes, with such additional electrical heating elements 430 optionally being independently controlled for optimized progressive warm-up.

Figure 34:
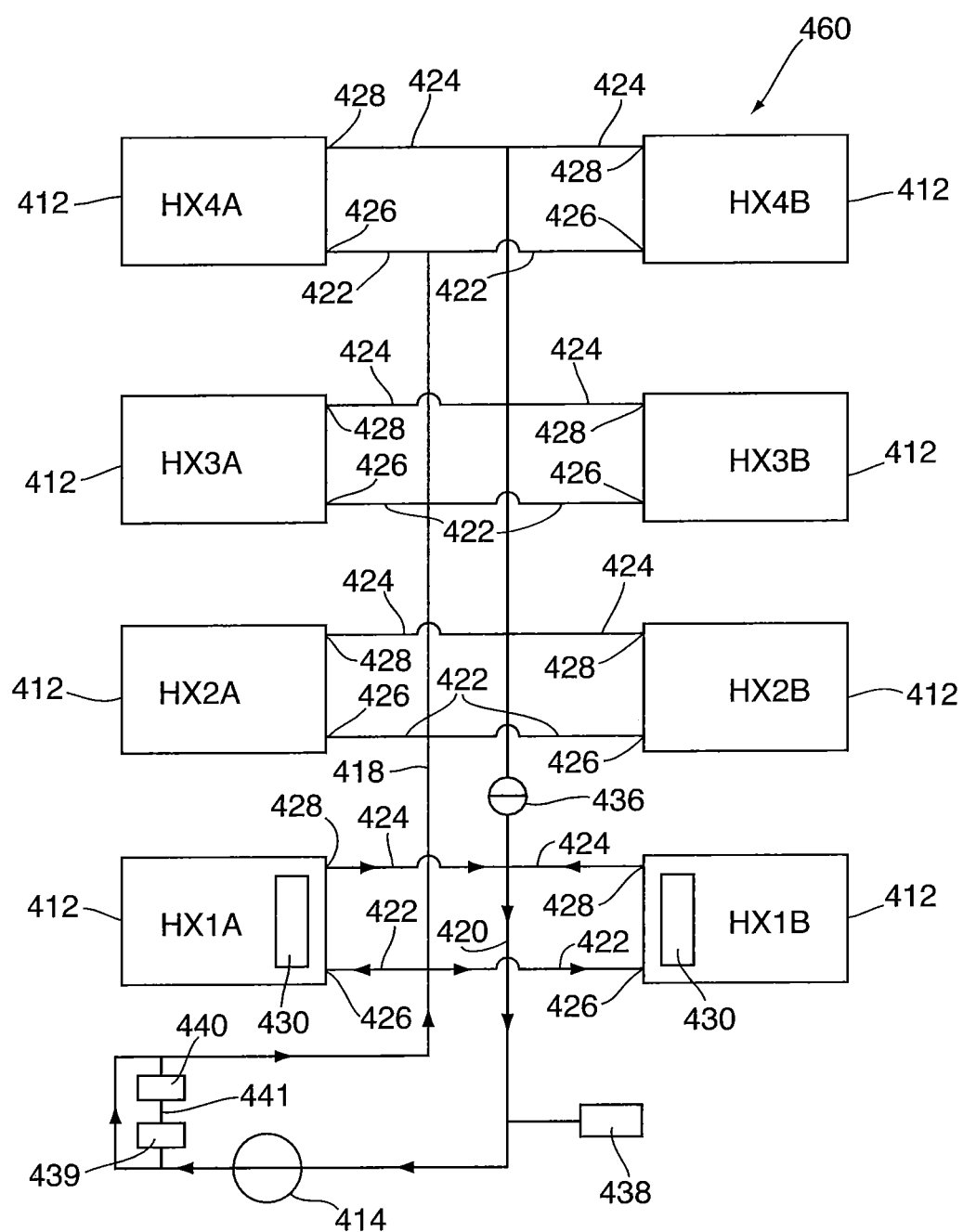
FIG. 34 illustrates a thermal management system according to a fourth embodiment, in a first mode of operation.
Figure 35:
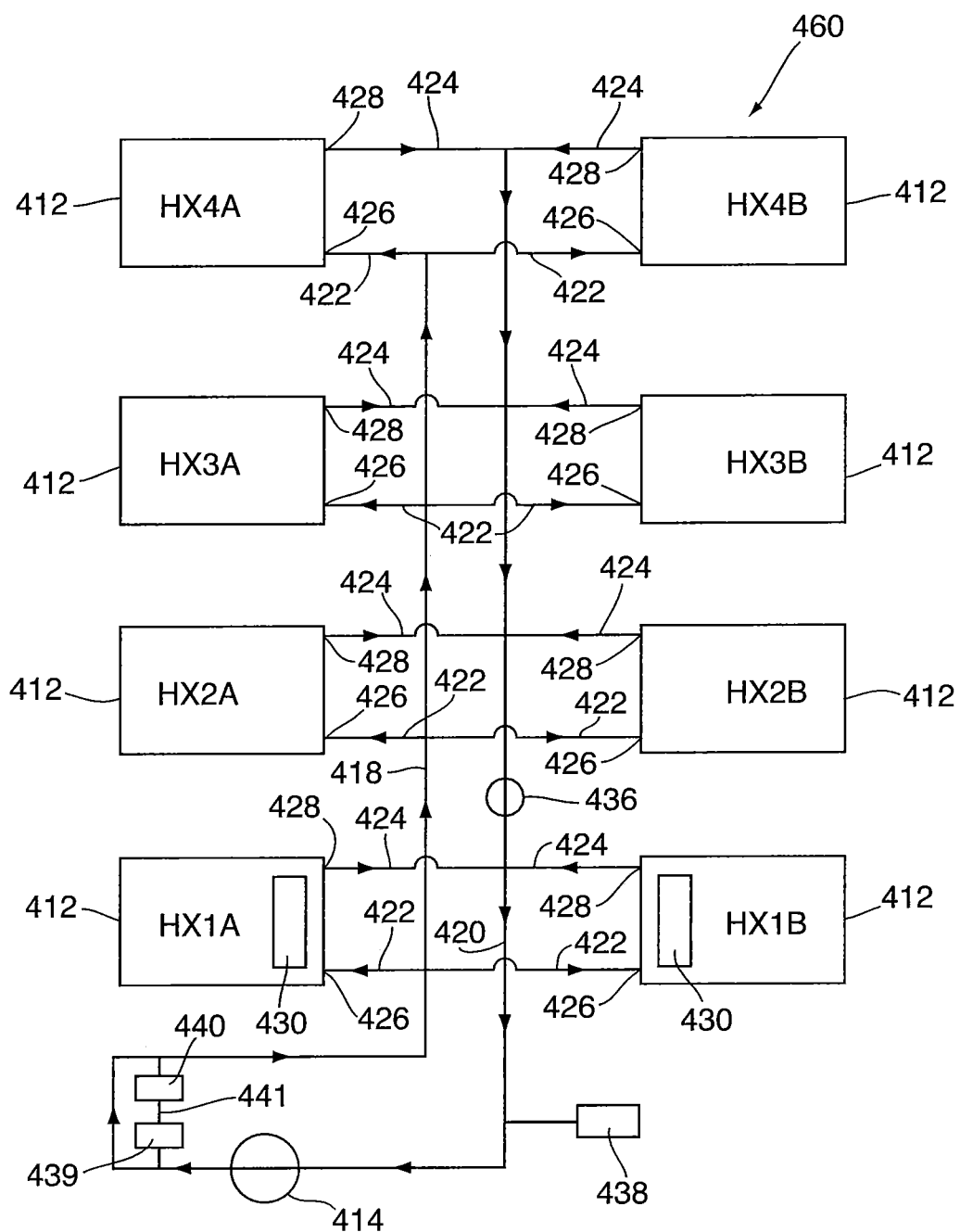
FIG. 35 illustrates the thermal management system of FIG. 34, in a second mode of operation.

FIGS. 34 and 35 illustrate a battery cooling/heating subsystem 460 according to a fourth embodiment, in different modes of operation. Subsystem 460 is a variant of subsystem 450 and includes the same arrangement of battery heat exchangers 412. Unless otherwise indicated below, the description of the elements of subsystems 410 and 450 applies to like elements of subsystem 460.

Subsystem 460 differs from subsystem 450 in that the heat exchangers 412 making up the heat exchanger pair which is closest to primary circulation pump 414 are the "first heat exchangers" and are labelled as "HX1A" and "HX1B" because one or both of these heat exchangers is provided with an integral electric heating element 430. The arrangement of subsystem 460 eliminates the requirement for a secondary circulation pump 432 and a primary valve 416 located between primary pump 414 and the parallel array of heat exchanger pairs 412. Instead, the primary circulation pump 414 is on in all modes of operation, and subsystem 460 includes one or more secondary valves 436 located between adjacent pairs of heat exchangers 412. In particular, subsystem 460 includes a secondary valve 436 located between the first pair of battery heat exchangers HX1A, HX1B and the second pair of battery heat exchangers HX2A, HX2B.

FIG. 34 illustrates a first heating mode in which one or both electric heating elements 430 are activated, the circulation pump 414 is on, and the valve 436 is closed. As can be seen from the arrows in FIG. 34, this arrangement results in circulation of the heat transfer fluid through only the first pair of heat exchangers HX1A and HX1B, where it is heated by one or both electric heating elements 430, wherein the fluid is circulated through the pump 414. Therefore, the FIG. 34 heating mode provides heating of only a portion of the heat transfer fluid (the "second volume") flowing through subsystem 460.

FIG. 35 illustrates a second heating mode in which one or both electric heating elements 430 are activated, the circulation pump 414 is on, and the valve 436 is partly or completely open. As can be seen from the arrows in FIG. 35, this arrangement results in circulation of the heat transfer fluid through all four pairs of heat exchangers 412, so as to heat all the fluid flowing through the subsystem (the "first volume").

Progressive heating of the heat transfer fluid is provided by switching from the FIG. 34 heating mode to the FIG. 35 heating mode once the fluid circulating through the first pair of heat exchangers HX1A, HX1B reaches a threshold temperature. Switching from the FIG. 34 heating mode to the FIG. 35 heating mode involves partial or complete opening of valve 436.

FIG. 35 also illustrates a "cooling mode" which is adopted once the batteries are heated to within their optimal temperature range for charging and/or discharging. In the cooling mode, circulation pump 414 is on, valve 436 is open such that the heat transfer fluid is circulated throughout the entire subsystem 460, the electric heating elements 430 are off, and at least some of the heat transfer fluid is circulated through branch conduit 441 and heat exchangers 439, 440.

Figure 36:
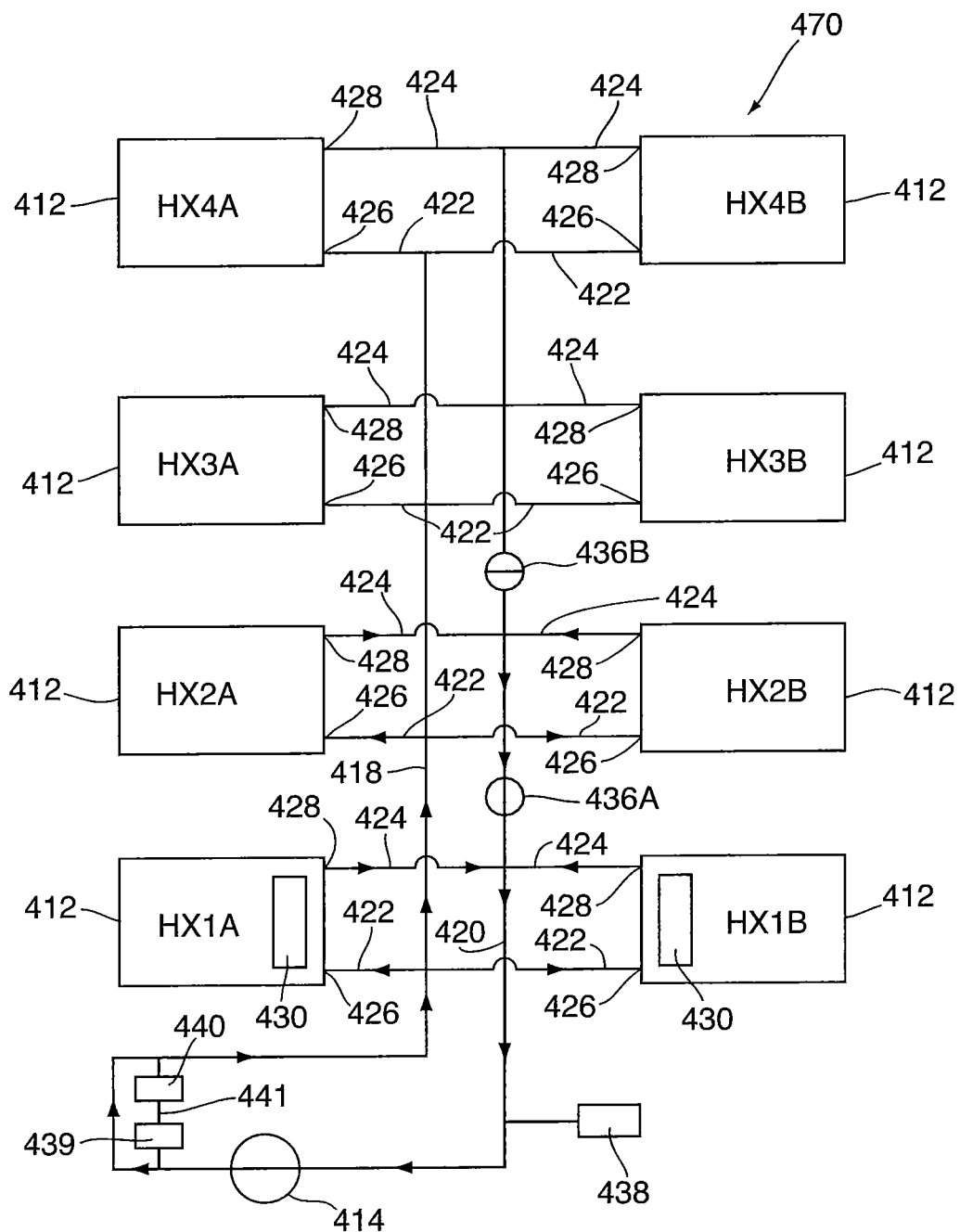
FIG. 36 illustrates a thermal management system according to a fifth embodiment.

FIG. 36 illustrates a subsystem 470 according to a fifth embodiment, wherein subsystem 470 is a variant of subsystem 460 described above. Subsystem 470 includes a plurality of secondary valves 436, each located in the first or second main conduit 418, 420 between adjacent pairs of heat exchangers 412, so as to provide intermediate heating modes between those shown in FIGS. 34 and 35.

Subsystem 470 includes a first valve 436A between the first pair of heat exchangers HX1A, HX1B and the second pair of heat exchangers HX2A, HX2B, and a second valve 436B between the second pair of heat exchangers HX2A, HX2B and the third pair of heat exchangers HX3A, HX3B. With the first valve 436A closed, the subsystem 470 will be in a first heating mode which is essentially the same as the FIG. 34 heating mode, which is independent of the presence or configuration of second valve 436B. In the first heating mode, the pump 414 will circulate heat transfer fluid only through the first pair of heat exchangers HX1A and HX1B.

FIG. 36 illustrates a second, intermediate heating mode in which the first valve 436A open and the second valve 436B closed, such that the pump 414 will circulate the heat transfer fluid through both the first pair of heat exchangers HX1A, HX1B and the second pair of heat exchangers HX2A, HX2B. Partial or complete opening of the second valve 436B (i.e. with first valve 436A remaining open) will result in a third heating mode similar to the FIG. 35 heating mode, in which the pump 414 circulates the heat transfer fluid through all four pairs of heat exchangers 412.

Figure 37:
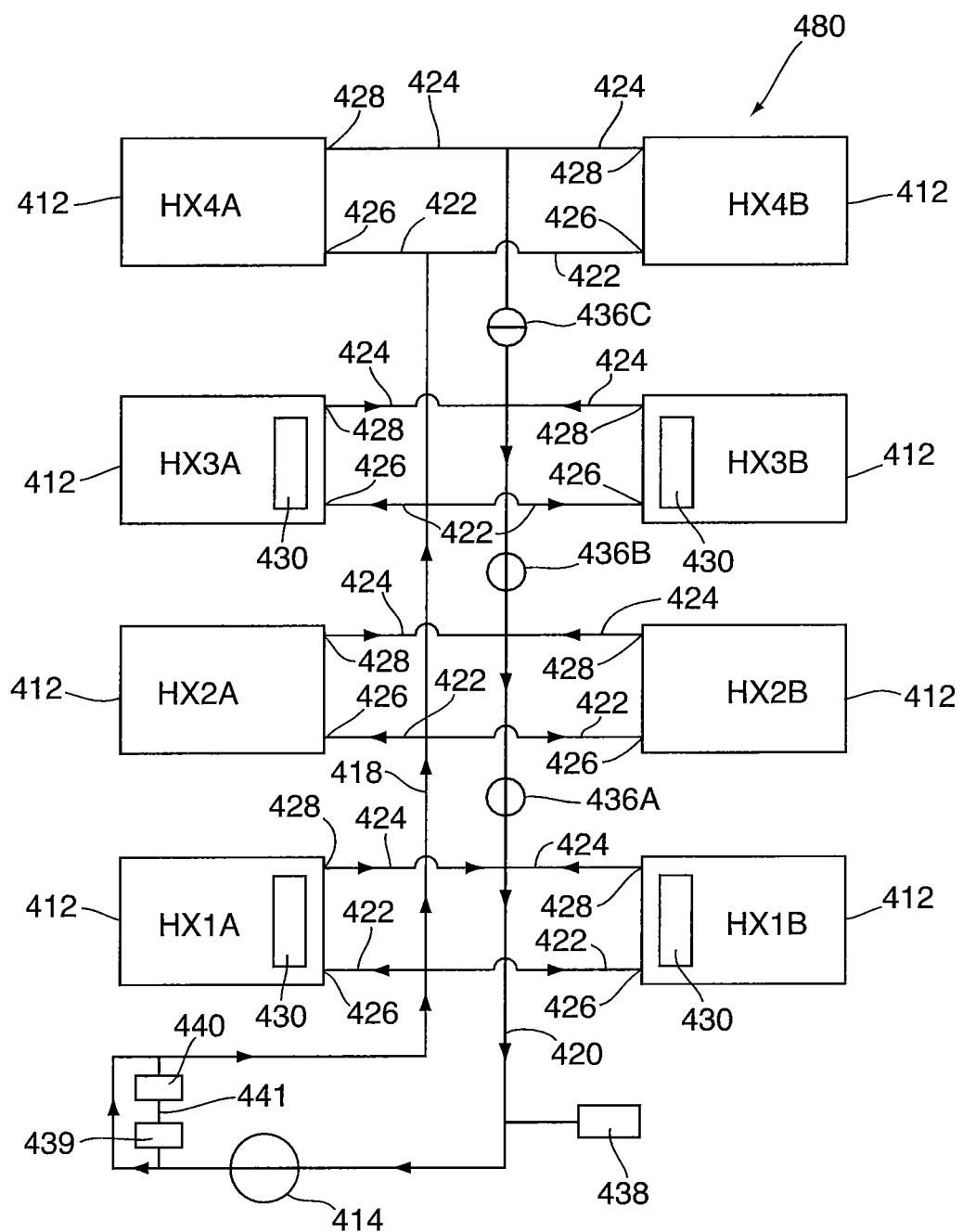
FIG. 37 illustrates a thermal management system according to a sixth embodiment.

FIG. 37 illustrates a subsystem 480 according to a sixth embodiment, wherein subsystem 480 is a variant of subsystems 460 and 470 described above. Subsystem 480 includes first, second and third valves 436A, 436B and 436C, each located in the first or second main conduit 418, 420 between adjacent pairs of heat exchangers 412. In addition, the subsystem 480 includes an additional pair of electric heating elements 430, which are integrated with the third pair of heat exchangers HX3A, HX3B. It can be seen from FIG. 37 that the subsystem 480 provides an additional intermediate heating mode between the second and third heating modes of subsystem 470, i.e. with the first and second valves 436A, 436B open, and the third valve 436C closed. According to the intermediate heating mode of FIG. 37, the pump 414 will circulate the heat transfer fluid through the first pair of heat exchangers HX1A, HX1B, the second pair of heat exchangers HX2A, HX2B and the third pair of heat exchangers HX3A, HX3B. Partial or complete opening of the third valve 436C (i.e. with first and second valves 436A, 436B remaining open) will result in a heating mode similar to the FIG. 35 heating mode, in which the pump 414 circulates the heat transfer fluid through all four pairs of heat exchangers 412.

In addition, with the subsystem 480 in the heating mode of FIG. 37, the subsystem can be selectively controlled to activate one or both of the electric heating elements 430 integrated with the third pair of heat exchangers HX3A, HX3B, with one or both of the electric heating elements 430 integrated with the first pair of heat exchangers HX1A, HX1B either being off or on. Therefore, it can be seen that the embodiment shown in FIGS. 34 to 37 provides additional progressive heating possibilities, while eliminating the need for a secondary circulation pump 432 and, at least in subsystem 460, reducing the overall number of valves.

Figure 38:
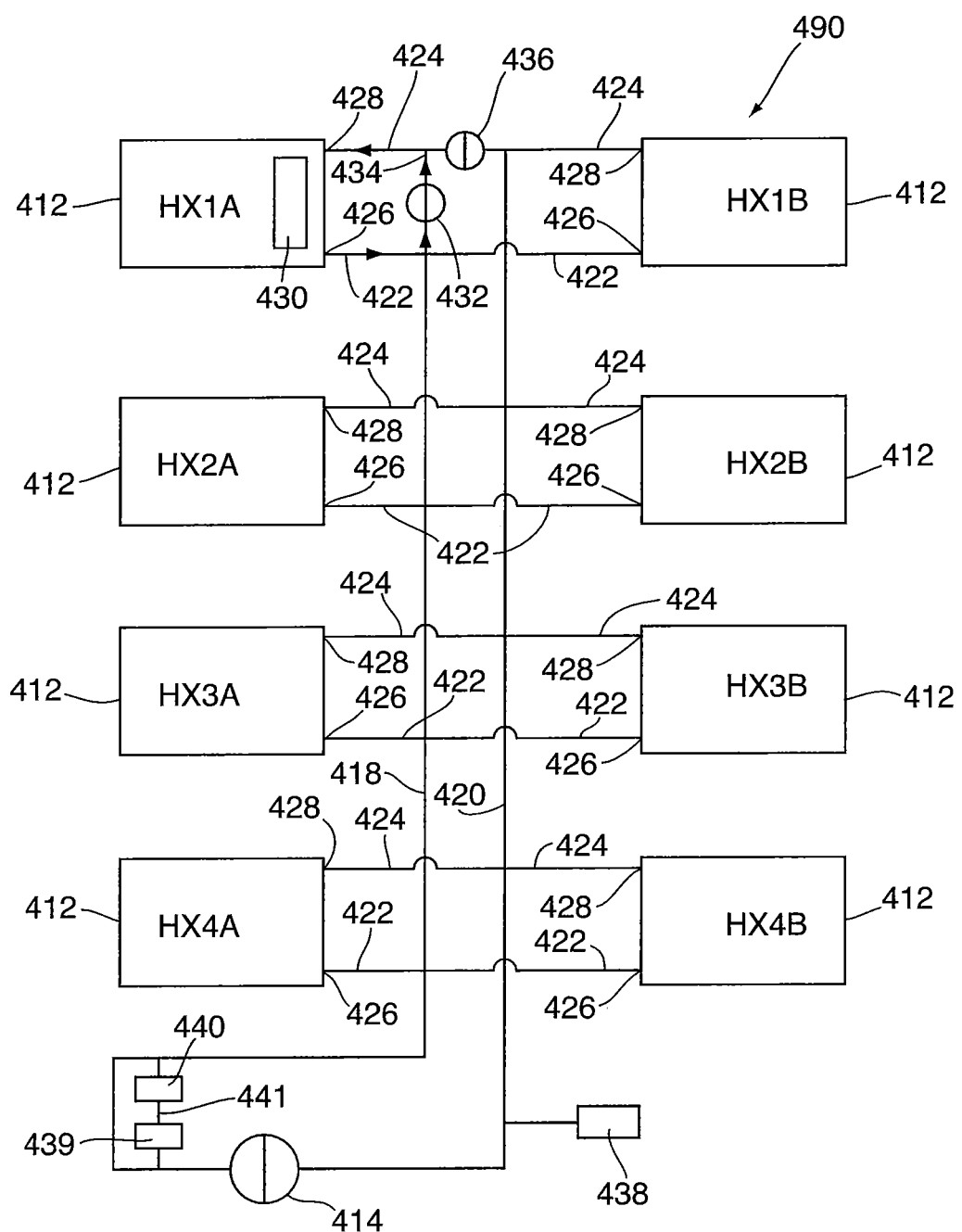
FIG. 38 illustrates a thermal management system according to a seventh embodiment, in a first mode of operation.
Figure 39:
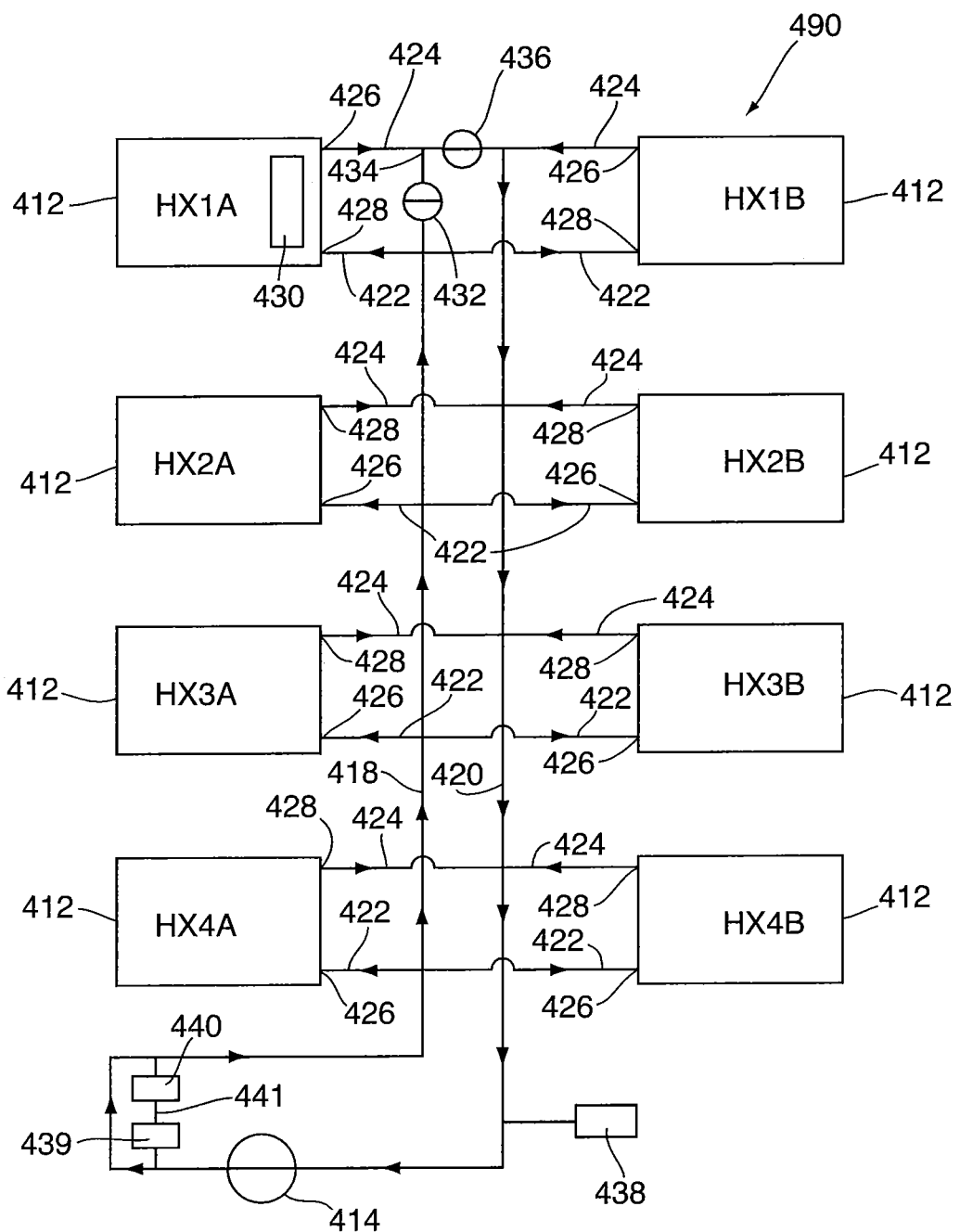
FIG. 39 illustrates the thermal management system of FIG. 38, in a second mode of operation.

FIGS. 38 and 39 illustrate a battery cooling/heating subsystem 490 according to a seventh embodiment, in different modes of operation. Subsystem 490 is a variant of subsystem 450 and includes the same arrangement of battery heat exchangers 412. Unless otherwise indicated below, the description of the elements of subsystems 410 and 450 applies to like elements of subsystem 490.

Subsystem 490 differs from subsystem 450 in that only one of the heat exchangers HX1A making up the distal heat exchanger pair HX1A, HX1B is provided with an integral electric heating element 430. In addition, subsystem 490 lacks a primary valve 416 located between primary pump 414 and the parallel array of heat exchanger pairs 412, and the secondary valve 436 of subsystem 490 is located in the one of the branch conduits 422, 424 of heat exchanger HX1A, so as to enable the heat exchanger HX1A to be fluidically isolated from HX1B and from all the other heat exchangers 412 of subsystem 490.

FIG. 38 illustrates a first heating mode in which the electric heating element 430 is activated, the primary circulation pump 414 is off, the secondary circulation pump 432 is on, and the valve 436 is closed. As can be seen from the arrows in FIG. 38, this arrangement results in circulation of the heat transfer fluid only through distal heat exchanger HX1A, with the fluid being recirculated between the fluid openings 426, 428 through the short circuit flow conduit 434. Thus, the first heating mode of FIG. 38 provides fast warm-up of the fluid in the distal heat exchanger HX1A.

Once the fluid circulating through the distal heat exchanger HX1A reaches a threshold temperature, the secondary circulation pump 432 is shut off to prevent short circuit flow through conduit 434, the primary circulation pump 414 is turned on, and the valve 436 is partly or completely opened, with the electric heating element 430 remaining on. This second heating mode is shown in FIG. 13, wherein the fluid heated in the first heating mode of FIG. 38 is distributed throughout the entire subsystem 490 in order to heat the battery cells and/or modules associated with the other heat exchangers 412, and the electric heating element 430 continues to heat the fluid circulating throughout subsystem 490 until the entire fluid volume reaches a threshold temperature, at which time the electric heating element 430 is turned off, which results in subsystem 490 adopting the cooling mode.

Because the distal heat exchanger pair HX1A, HX1B has the lowest pressure drop, and due to the lower viscosity of the fluid circulating through the distal heat exchanger pair HX1A, HX1B, recirculation flow through the distal heat exchanger pair HX1A, HX1B will be somewhat preferred, even after valve 436 is partly or completely opened and the remaining portions of subsystem 490 are warming at lower fluid flow rates.

Figure 40:
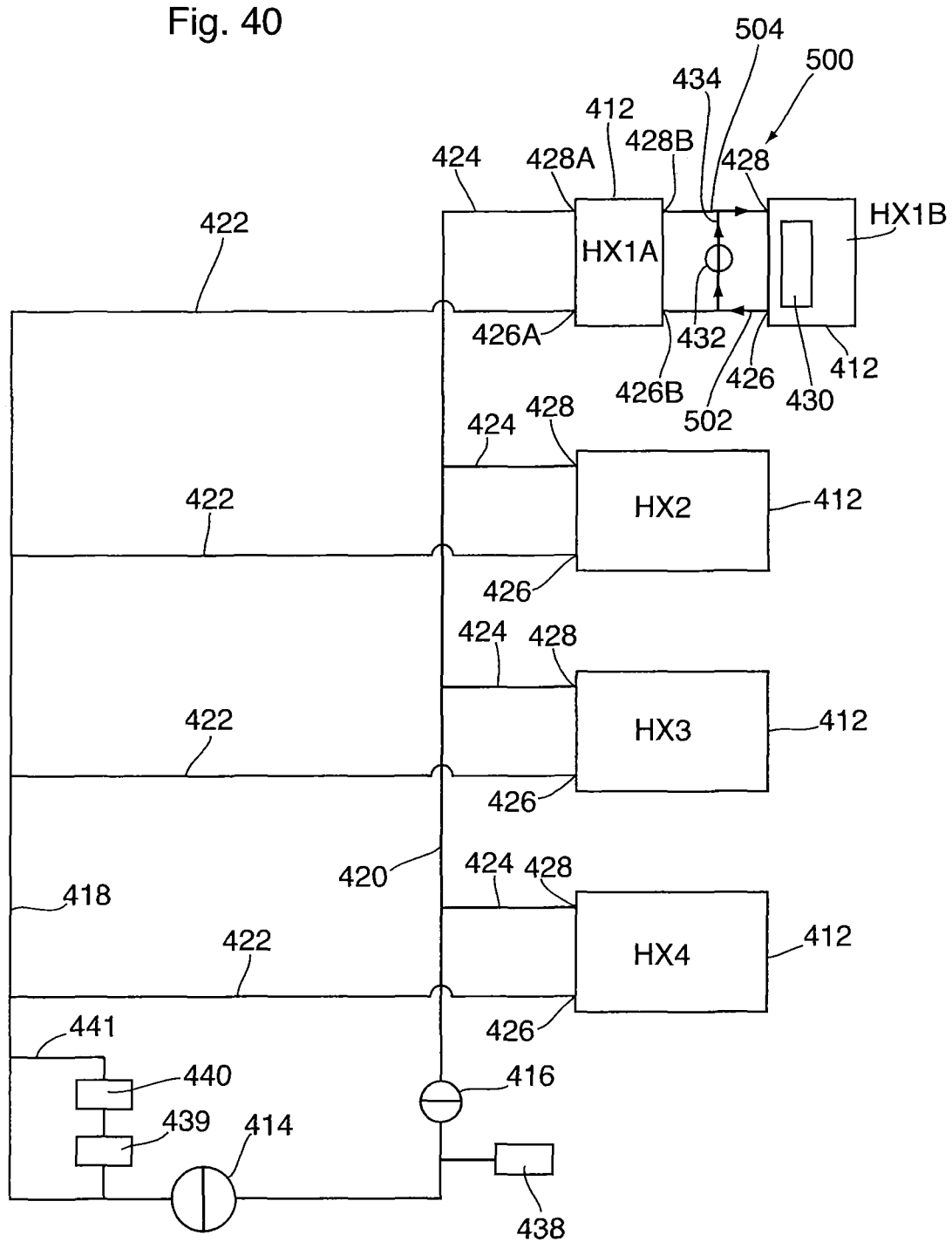
FIG. 40 illustrates a thermal management system according to an eighth embodiment, in a first mode of operation.
Figure 41:
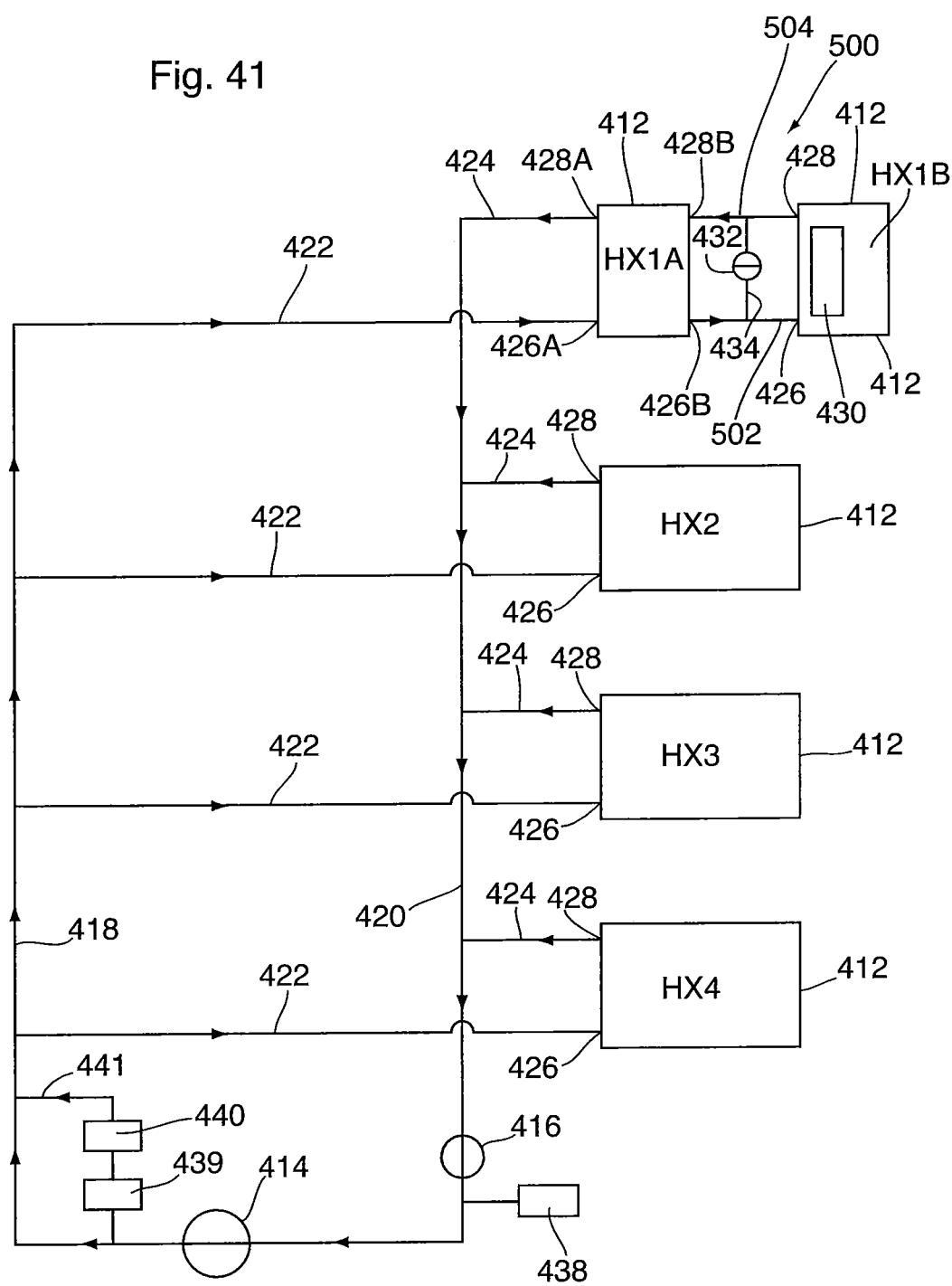
FIG. 41 illustrates the thermal management system of FIG. 40, in a second mode of operation.

FIGS. 40 and 41 illustrate a battery cooling/heating subsystem 500 according to an eighth embodiment, in different modes of operation. Subsystem 500 is a variant of subsystem 410 shown in FIGS. 28 to 30 in that it includes the same parallel arrangement of battery heat exchangers 412. Unless otherwise indicated below, the description of the elements of subsystem 410 applies to like elements of subsystem 500.

Subsystem 500 differs from subsystem 410 in that the distal heat exchanger HX1 comprises a pair of distal heat exchanger portions HX1A, HX1B connected in series to a pair of branch conduits 422, 424. In this regard, first distal heat exchanger portion HX1A has a first pair of fluid openings 426A, 428A which receive heat transfer fluid from, and discharge heat transfer fluid to, the main conduits 418, 420. The first distal heat exchanger portion HX1A also includes a second pair of fluid openings 426B, 428B which receive heat transfer fluid from, and discharge heat transfer fluid to, the fluid openings 426, 428 of the second distal heat exchanger portion HX1B through connecting conduits 502, 504. Connecting conduit 502 extends from fluid opening 426B of portion HX1A to fluid opening 426 of portion HX1B, and connecting conduit 504 extends from fluid opening 428B of portion HX1A to fluid opening 428 of portion HX1B. Therefore, while the pair of distal heat exchanger portions HX1A, HX1B are connected in parallel to the main conduits 418, 420, along with the other battery heat exchangers HX2, HX3 and HX4, the second distal heat exchanger portion HX1B is fluidically connected to the remainder of subsystem 500 only through the first distal heat exchanger portion HX1A.

It will be appreciated that the pair of distal heat exchanger portions HX1A, HX1B may either comprise two separate heat exchangers connected by external connecting conduits 502, 504 or two areas or portions of the same heat exchanger in which connecting conduits 502, 504 comprise internal fluid flow passages.

The subsystem 500 further comprises a secondary circulation pump 432 which is provided in a short circuit fluid flow conduit 434 connected between the first and second connecting conduits 502, 504 so as to provide short circuit flow path between the fluid openings 426, 428 of the second distal heat exchanger portion HX1B.

Instead of having an electric heating element 430 in the first or proximal heat exchanger HX4, the subsystem 500 has an electric heating element 430 integrated with the second distal heat exchanger portion HX1B.

FIG. 40 illustrates a first mode of operation which corresponds to an initial heating mode adopted under cold start-up conditions. In the FIG. 40 heating mode, the primary circulation pump 414 is shut off and the primary valve 416 is closed so that no heat transfer fluid will be circulated through subsystem 500. In addition, the secondary circulation pump 432 and the electric heating element 430 are turned on. At cold start-up, the heat transfer fluid in subsystem 500 is initially at a low temperature, and is relatively viscous. As the heat transfer fluid in the second distal heat exchanger portion HX1B is heated by electric heating element 430, its temperature increases and its viscosity decreases. The decreased viscosity of the heated fluid will cause it to be preferentially recirculated through the second distal heat exchanger portion HX1B by secondary circulation pump 432.

Because subsystem 500 lacks a secondary valve 436 to fluidically isolate the two distal heat exchanger portions HX1A and HX1B from one another, the secondary circulation pump 432 will also circulate a portion of the heated fluid to the first distal heat exchanger portion HX1A, resulting in progressive and preferential heating of the fluid flowing through both distal heat exchanger portions HX1A and HX1B. The preferential recirculation through heat exchanger portions HX1A and HX1B will be assisted by the larger cross-sectional areas of the branch conduits 422, 424 of the first distal heat exchanger portion HX1A, in the same manner as described above with reference to HX4 of subsystem 410.

The secondary circulation pump 432 will also circulate a portion of the heat transfer fluid to the other heat exchangers HX2 to HX4, and the proportion of fluid circulated to these heat exchangers initially being small, and increasing as heating of the fluid continues. At some point the secondary circulation pump 432 is turned off, primary circulation pump 414 is turned on, primary valve 416 is opened, and heating of the fluid by electric heating element 430 is continued, such that the subsystem 500 adopts the heating mode configuration shown in FIG. 41. Once the heat transfer fluid circulating in subsystem 500 reaches a desired temperature, the subsystem 500 is switched to cooling mode by turning off the electric heating element 430, while the other elements of remain in the configuration shown in FIG. 41.

Figure 42:
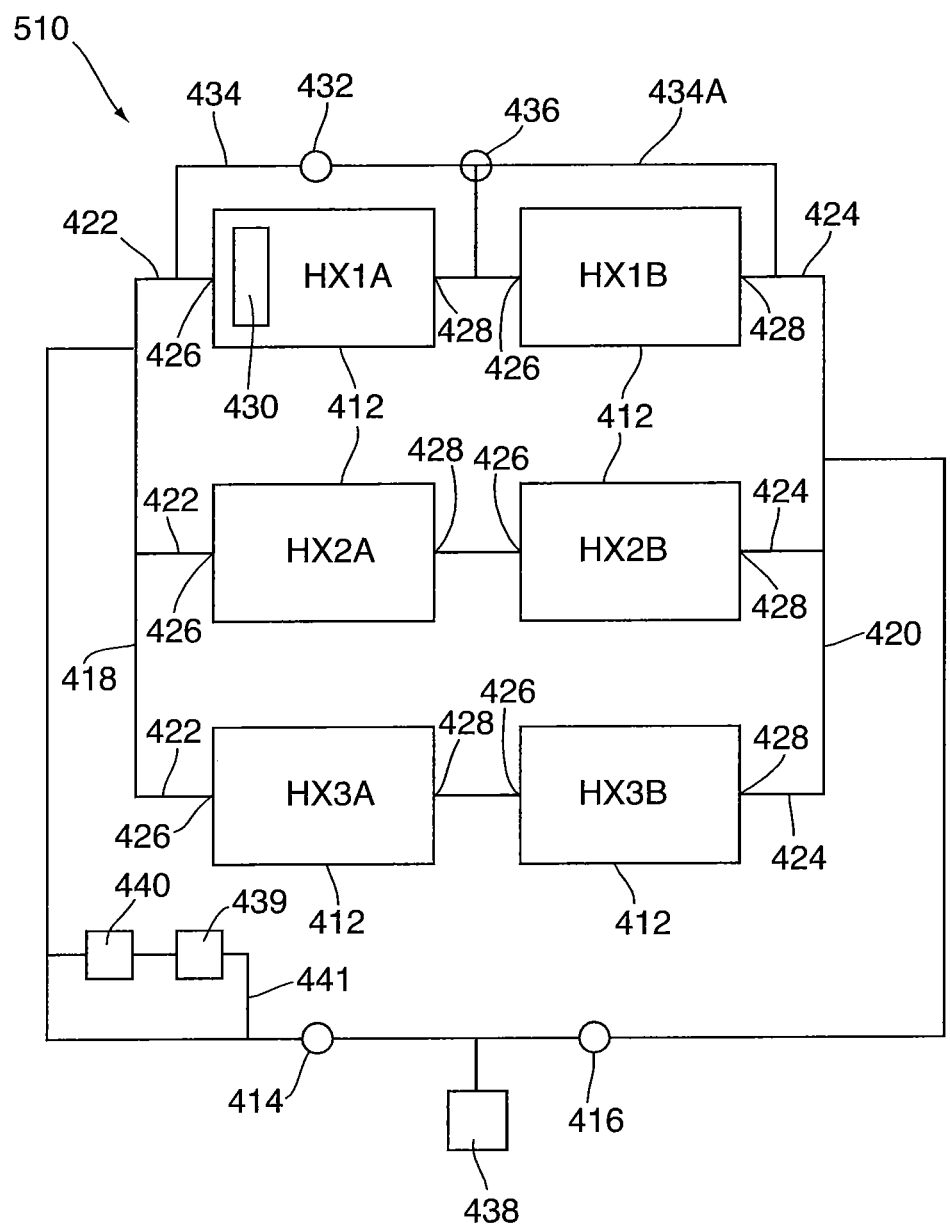
FIG. 42 illustrates a thermal management system according to a ninth embodiment.

FIG. 42 illustrates a battery cooling/heating subsystem 510 according to a ninth embodiment. Subsystem 510 includes a plurality of battery heat exchangers 412 arranged in pairs, labelled HX1A, HX1B, HX2A, HX2B, HX3A and HX3B. However, subsystem 510 is a hybrid system in that the three pairs of heat exchangers 412 are arranged in parallel, and the heat exchangers 412 of each pair are arranged in series. Subsystem 510 differs from the other subsystems described above in that the heat exchangers 412 are shown as having fluid openings 426, 428 at their opposite ends, however, it will be appreciated that any of the subsystems described above could be adapted for use of such heat exchangers 412. Conversely, battery heat exchangers 412 as shown in FIG. 42 could be used in any of the embodiments described above.

Subsystem 510 further comprises a primary circulation pump 414, a primary valve 416 located upstream or downstream of pump 414, a first main conduit 418, a second main conduit 420, a plurality of first branch conduits 422 extending between the first main conduit 418 and each of the battery heat exchangers 412, and a plurality of second branch conduits 424 extending between the second main conduit 420 and each of the battery heat exchangers 412. The main conduits 418, 420 and/or the branch conduits 422, 424 may be provided with means for balancing the fluid flow to the plurality of battery heat exchangers 412, as described in detail above. In the present embodiment the main conduits 418, 420 have a slightly different appearance than in subsystems 410 and 450 described above, with the conduits leading to/from pump 414 and valve 416 being connected to main conduits 418, 420 at points which are located between the ends of main conduits 418, 420 rather than at the ends of main conduits 418, 420 as in subsystems 410 and 450. However, this difference is not significant for the purposes of the present disclosure.

Subsystem 510 further comprises a secondary circulation pump 432 which is provided in a short circuit fluid flow conduit 434 connecting the first and second fluid openings 426, 428 of the battery heat exchanger HX1A, and which may optionally comprise a positive displacement pump. The subsystem 510 is optionally provided with a secondary valve 436 to fluidically isolate heat exchanger HX1A from the remainder of subsystem 510 during cold start-up of the subsystem 510. As shown, the short circuit fluid flow conduit 434 may include an extension portion 434A which extends across heat exchanger HX1B to the second branch conduit 424 which extends from the fluid opening 428 of heat exchanger HX1B to the second main conduit 420. In this embodiment, secondary valve 436 may comprise a three-port valve to control whether or not the heat transfer fluid circulating through short circuit flow conduit 434 will be permitted to enter the extension portion 434A to be returned through HX1B or whether it will be returned directly to HX1A.

During initial start-up under cold conditions, the primary circulation pump 414 is turned off, the primary valve 416 is closed, the electric heating element 430 is turned on, and the secondary circulation pump 432 is turned on. Where subsystem 510 lacks a secondary valve 436, the subsystem 510 relies on preferential recirculation of the heat transfer fluid through heat exchanger HX1A caused by differences in viscosity between the heated fluid circulating through heat exchanger HX1A and the relatively cool fluid circulating through the other heat exchangers 412, as discussed above with reference to subsystem 500.

Where the secondary valve 436 is a three-port valve located at the junction between short circuit fluid flow conduit 434 and extension portion 434A, the ability of secondary valve 436 to block or allow flow through the extension portion 434A increases the number of progressive heating modes which may be provided by subsystem 510.

For example, subsystem 510 can be configured with secondary valve 436 in a first position, whereby fluid recirculation through flow conduit 434 and heat exchanger HX1A is permitted, while fluid recirculation through extension portion 434A and heat exchanger HX1B is blocked, thereby providing a first heating mode which preferentially recirculates the heat transfer fluid through only heat exchanger HX1A. The secondary valve 436 can then be operated to adopt a second position whereby fluid recirculation through flow conduits 434 and 434A, and through both heat exchangers HX1A and HX1B is permitted, thereby providing a second heating mode which preferentially recirculates the heat transfer fluid through both heat exchangers HX1A and HX1B.

While the above heating modes provide preferential flow of the heat transfer fluid through heat exchanger HX1A and optionally through HX1B, it will be appreciated that heat exchangers HX1A, HX1B are not fluidically isolated from the other heat exchangers 412 in cases where no secondary valve is provided between heat exchangers HX1A, HX1B and the remaining heat exchangers 412. Therefore, there will be some amount of fluid flow ("leakage") through main conduits 418, 420 and heat exchangers HX2A, HX2B, HX3A and HX3B with primary circulation pump 414 off and primary valve 416 closed. The proportion of leakage flow will initially be low due to the viscosity difference between the heated fluid flowing through HX1A and optionally HX1B, and the cold fluid in the other heat exchangers 412. However, the electrical heating element 430 will gradually increase the temperature of the fluid flowing through the unheated heat exchangers 412, decreasing the viscosity difference and increasing the proportion of leakage flow.

Once the temperature of the fluid circulating through one or more of heat exchangers 412 reaches a predetermined level, the secondary valve 436 is operated to block flow through conduits 434 and 434A to block recirculating flow through heat exchangers HX1A, HX1B. Also, the secondary pump 432 is shut off, the primary pump 414 is turned on, and the primary valve 416 is opened, while electric heating element 430 remains on, to continue heating the fluid circulating in subsystem 510. The system 510 can then be switched to cooling mode by turning off the electric heating element 430 and by passing at least some of the heat transfer fluid through the branch conduit 441 and heat exchangers 439, 440.

It will be appreciated that the heat exchangers in subsystem 510, other than HX1A and HX1B, are not necessarily series-arranged pairs HX2A, HX2B and HX3A, HX3B etc. as shown in FIG. 42. Rather, they can be single heat exchangers HX2, HX3, etc., which are flow balanced with HX1A and HX1B. Also, as with series-arranged heat exchanger portions HX1A and HX1B of subsystem 500, HX1A and HX1B of subsystem 510 can be series-arranged portions of a single heat exchanger. For example, subsystem 510 may include a two-pass heat exchanger HX1, such as a U-flow heat exchanger, having an outlet at the end of the first pass. Regardless of these details, subsystem 510 is expected to provide increased volume fraction flow through heat exchanger HX1A during initial start-up under cold conditions, due to the extra pressure drop provided by series-arranged heat exchanger HX1B.

Figure 43:
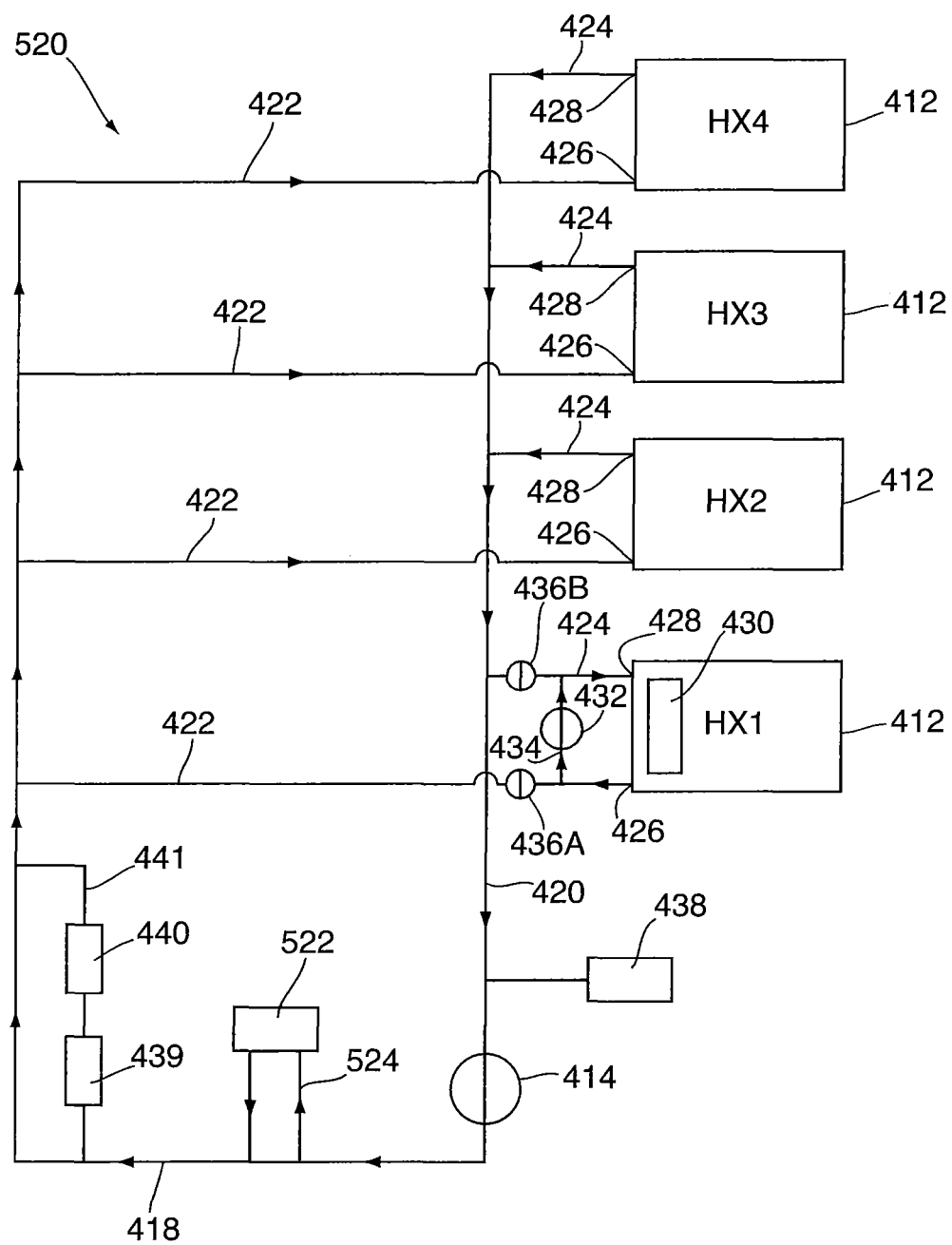
FIG. 43 illustrates a thermal management system according to a tenth embodiment, in a first mode of operation.
Figure 44:
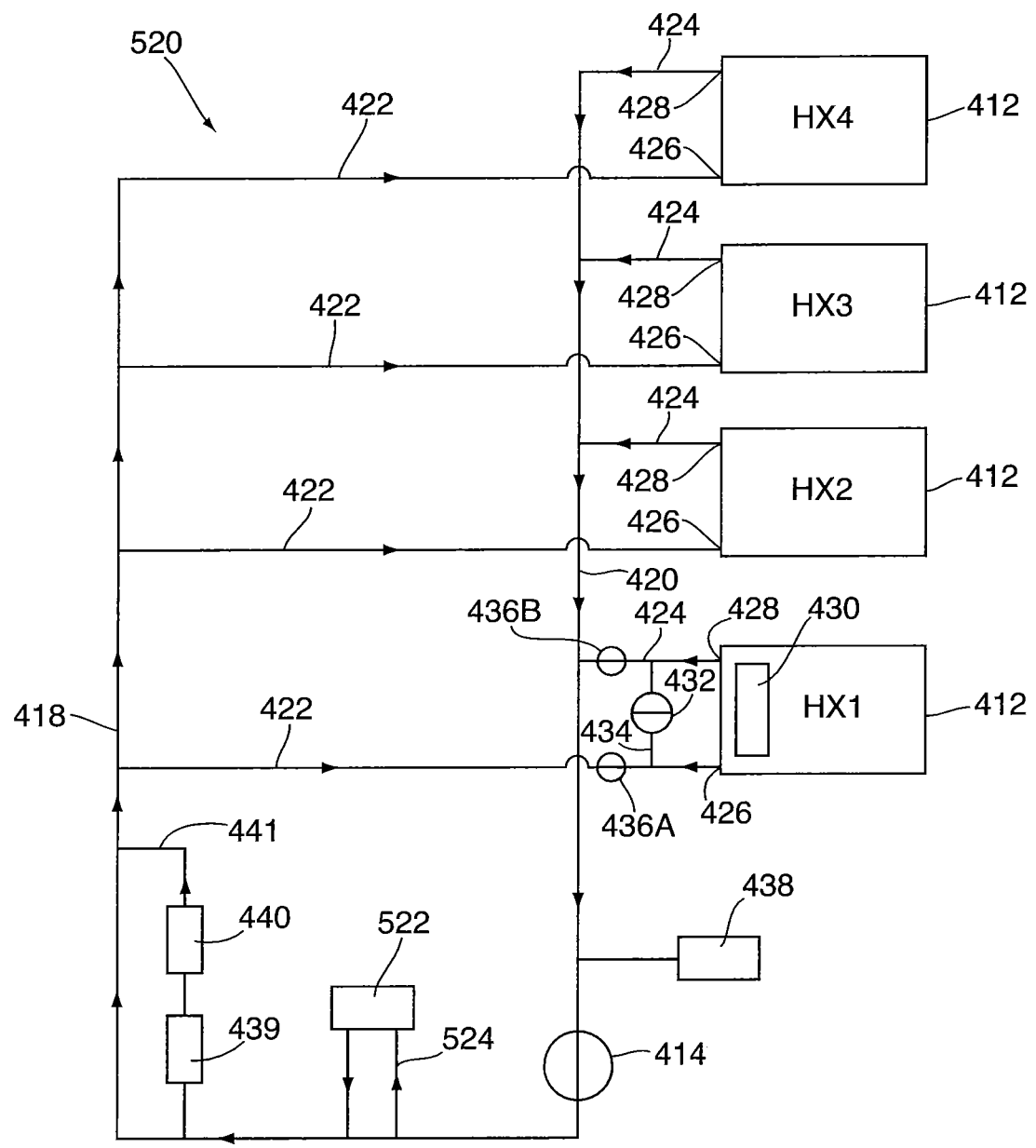
FIG. 44 illustrates the thermal management system according to the tenth embodiment, in a second mode of operation.

In the above embodiments, most of the heat for heating the battery heat exchangers 412 is ultimately derived from electrical energy provided by the vehicle battery. Although the above embodiments provide faster warm-up of portions of the battery, they do not necessarily reduce the total amount of energy required to heat the entire battery to its desired operating temperature. FIGS. 43 and 44 illustrate a battery cooling/heating subsystem 520 according to a tenth embodiment, in different modes of operation. Subsystem 520 is a variant of subsystem 410 shown in FIGS. 28 to 30 in that it includes the same parallel arrangement of battery heat exchangers 412. Unless otherwise indicated below, the description of the elements of subsystem 410 applies to like elements of subsystem 520.

Subsystem 520 differs from subsystem 410 in that it does not require a primary valve 416, since the primary circulation pump 414 may always be on. Also, system 520 includes a pair of secondary valves 436A, 436B. Instead of being located in the main lines 418 and/or 420, however, the secondary valves 436A, 436B are located in the respective first and second branch conduits 422, 424 connecting the fluid openings 426, 428 of HX1 to the first and second main conduits 418, 420. This arrangement isolates HX1 from the remainder of subsystem 520 in certain modes of operation, regardless of the mode of operation of pump 414. For example, the pump 414 may circulate fluid to the other battery heat exchangers HX2 to HX4 in all modes of operation. It will be appreciated that subsystem 520 may be operated with only one secondary heat exchanger 436, which may be located in either the first or second branch conduit 422 or 424 connected to HX1.

Subsystem 520 also includes a heat-generating component 522 which is shown as being located in a branch conduit 524 downstream of the primary circulation pump 414 and upstream of the branch conduit 441 in which the heat exchangers 439, 440 are located. A three-port valve (not shown) may be provided at one of the branch points between main conduit 418 and branch conduit 524 so as to permit the heat transfer fluid to flow through branch conduit 524 under certain modes of operation and extract heat from component 522, and to permit the heat transfer fluid to bypass the branch conduit 524 and heat-generating component 522 under certain modes of operation.

The heat-generating component 522 may comprise one or more electric components of the vehicle, such as the electric drive motor, the system electronics, and/or an electric resistance heater. More typically, the heat-generating component 522 may comprise a heat exchanger for extracting heat from one or more of these electric vehicle components.

Where the electric vehicle component 522 is an electric resistance heater and/or a heat exchanger which absorbs heat from a resistance heater, the energy source for the electric resistance heater may be an energy source which does not draw energy from the vehicle battery. For example, the energy source for the electric resistance heater may comprise excess electrical energy produced by the vehicle's regenerative braking module, some of which may otherwise be wasted, particularly when the vehicle is operated under cold conditions where part or all of the energy generated by the regenerative braking module may not be used for charging the battery. The advantages of subsystem 520 will become apparent from the following description.

FIG. 43 illustrates a first mode of operation which corresponds to an initial heating mode adopted under cold start-up conditions. In the FIG. 43 heating mode, the primary circulation pump 414 is on, the secondary circulation pump 432 is on, the secondary valves 436A, 4368 are closed, and the electric heating element 430 of HX1 is on. Accordingly, in the FIG. 43 heating mode, a small volume of heat transfer fluid is re-circulated through HX1 and short circuit flow conduit 434 while being rapidly heated by the electric heating element 430. Assuming that the battery cell(s) and/or module(s) associated with HX1 are connected together to provide the system voltage, the vehicle can be started and operated once HX1 is sufficiently heated.

In the meantime, the primary circulation pump 414 circulates the cold heat transfer fluid through the subsystem 520, except through HX1 and possibly bypassing heat exchangers 439, 440. In particular, in the FIG. 43 heating mode, the heat transfer fluid is pumped through the branch conduit 524 and heat-generating component 522, so as to add heat to subsystem 520. This heat from component 522 will be distributed to heat exchangers HX2 to HX4, thereby heating the battery cells and/or modules associated with HX2 to HX4 as the vehicle is operated and as heating of HX1 continues. Thus, the FIG. 43 heating mode uses at least some heat which may otherwise be wasted in order to heat HX2 to HX4.

Once HX1 is sufficiently heated, the secondary valves 436A, 436B may be opened and the secondary circulation pump 432 may be shut off, while electric heating element 430 remains on. In this heating mode, shown in FIG. 44, the heat transfer fluid is pumped through the branch conduit 524 and heat-generating component 522, and may continue to bypass branch conduit 441 and heat exchangers 439, 440. In the FIG. 44 heating mode, heat from electric heating element 430 and heat from component 522 will heat the entire volume of fluid circulating through the subsystem 520, thereby heating all heat exchangers HX1 to HX4.

Once the entire subsystem 520 is sufficiently heated, the subsystem 520 can be switched to cooling mode by shutting off the electric heating element 430 and passing the heat transfer fluid through the branch conduit 441 and heat exchangers 439, 440. In addition, the subsystem 520 may be operated so that fluid bypasses the branch conduit 524 containing heat-generating component 522 and, where component is an electrical resistance heater or a heat exchanger associated therewith, that heater may be shut off.

While various embodiments have been described in connection with the present disclosure, it will be understood that certain adaptations and modifications of the described exemplary embodiments can be made as construed within the scope of the present disclosure. Therefore, the above discussed embodiments are considered to be illustrative and not restrictive.

What is claimed is:

1. A thermal management system for a vehicle having an energy storage system including a plurality of rechargeable battery units, the thermal management system comprising a battery cooling/heating subsystem, comprising:
   (a) a circulation loop for circulating a first volume of heat transfer fluid throughout the battery cooling/heating subsystem, the circulation loop comprising a plurality of conduits for transporting the heat transfer fluid;
   (b) a plurality of battery heat exchangers provided in the circulation loop, wherein each of the battery heat exchangers is in thermal contact with one or more of the battery units, each of the battery heat exchangers having an internal fluid flow passage and plurality of fluid openings including an inlet and an outlet of the internal fluid flow passage;
   (c) an electric heater integrated with only a first battery heat exchanger of said plurality of battery heat exchangers so as to heat the heat transfer fluid flowing through the internal fluid flow passage of the first heat exchanger; and
   (d) a sub-loop of said circulation loop, comprising one or more of said conduits, which are in fluid flow communication with the inlet and outlet of the fluid flow passage of the first battery heat exchanger, and further comprising the internal fluid flow passage of the first battery heat exchanger;
      wherein the sub-loop is adapted for circulation of a second volume of said heat transfer fluid, wherein the second volume is less than the first volume and comprises a volume of the fluid flow passage of the first battery heat exchanger.

2. The thermal management system of claim 1, further comprising:
   (e) a primary circulation pump provided in the circulation loop for pumping the heat transfer fluid through said battery cooling/heating subsystem; and
   (f) a fluid-cooling heat exchanger provided in the circulation loop for removing heat from the heat transfer fluid circulating in the circulation loop.

3. The thermal management system according to claim 1, wherein one of the conduits of the sub-loop comprises a short circuit flow conduit which connects the inlet and the outlet of the internal fluid flow passage of the first battery heat exchanger; and
   wherein the battery cooling/heating subsystem further comprises a secondary circulation pump provided in the sub-loop for circulating the second volume of the heat transfer fluid throughout the sub-loop.

4. The thermal management system according to claim 2, wherein the battery cooling/heating subsystem further comprises a primary valve provided in the circulation loop for controlling flow of the heat transfer fluid to or from the plurality of battery heat exchangers; and
   wherein the primary valve is adapted for controlling flow of the heat transfer fluid to or from the primary circulation pump.

5. The thermal management system according to claim 1, wherein the battery cooling/heating subsystem further comprises at least one secondary valve for controlling flow of the heat transfer fluid within the plurality of battery heat exchangers; and
   wherein a first one of said secondary valves is provided in said circulation sub-loop for controlling flow of the heat transfer fluid between the first battery heat exchanger and other battery heat exchangers in the battery cooling/heating subsystem.

6. The thermal management system according to claim 5, wherein a second one of said secondary valves is provided between two of the battery heat exchangers located outside of said sub-loop.

7. The thermal management system according to claim 1, wherein some or all of the plurality of battery heat exchangers comprise an array of parallel-arranged heat exchangers;
   wherein the conduits of the battery cooling/heating subsystem include a plurality of main conduits and a plurality of branch conduits, wherein the inlets and outlets of the parallel-arranged heat exchangers are each connected to a main conduit through a branch conduit; and
   wherein each of the main conduits comprises a header or manifold for supply or discharge of the heat transfer fluid to or from the parallel-arranged heat exchangers.

8. The thermal management system according to claim 7, wherein the main conduits and/or the branch conduits are provided for balancing the flow of the heat transfer fluid to the parallel-arranged heat exchangers;
   wherein balancing the flow of the heat transfer fluid to the parallel-arranged heat exchangers includes flow restrictions in the main conduits and/or the branch conduits, wherein the flow restrictions are graduated throughout the array of parallel-arranged heat exchangers, such that there is greater flow restriction and higher pressure drop in the battery heat exchangers proximal to a primary circulation pump and lower flow restriction and lower pressure drop in the battery heat exchangers distal from the primary circulation pump; and
   wherein the flow restrictions comprise one or more of: graduated orifices, graduated conduit diameters, and/or differing degrees of local constriction or deformation of the main conduits and/or the branch conduits.

9. The thermal management system according to claim 7, wherein all of the plurality of battery heat exchangers are parallel-arranged heat exchangers;
wherein the battery heat exchangers are arranged in a plurality of pairs, with the branch conduits of each pair of battery heat exchangers having common points of connection to the main conduits;
wherein the battery cooling/heating subsystem further comprises a secondary valve for controlling flow of the heat transfer fluid within the plurality of battery heat exchangers; and
wherein the secondary valve is located in one of the main conduits between two adjacent pairs of battery heat exchangers.

10. The thermal management system according to claim 9, wherein the secondary valve is provided between a first pair of said battery heat exchangers and an adjacent second pair of said battery heat exchangers; and
wherein the first pair of said battery heat exchangers which is most proximal to or most distal from the pump.

11. The thermal management system according to claim 10, wherein the first battery heat exchanger which is integrated with the electric heater comprises one of the battery heat exchangers of the first pair; and
wherein the battery cooling/heating subsystem further comprises a second said electric heater which is integrated with the other one of the battery heat exchangers of the first pair.

12. The thermal management system according to claim 7, wherein all of the plurality of battery heat exchangers are parallel-arranged heat exchangers;
wherein the battery heat exchangers are arranged in a plurality of pairs, with the branch conduits of each pair of battery heat exchangers having common points of connection to the main conduits;
wherein the battery cooling/heating subsystem further comprises a secondary valve for controlling flow of the heat transfer fluid within the plurality of battery heat exchangers;
wherein the secondary valve is provided between the battery heat exchangers of a first pair of said battery heat exchangers;
wherein the first pair of said battery heat exchangers is most distal from a primary circulation pump;
wherein one of the battery heat exchangers of the first pair comprises the first battery heat exchanger which is integrated with the electric heater; and
wherein the other battery heat exchanger of the first pair is not integrated with an electric heater.

13. The thermal management system according to claim 2, wherein the plurality of battery heat exchangers includes a distal pair of battery heat exchangers, which are located distally from the primary circulation pump relative to the other battery heat exchangers of the battery cooling/heating subsystem;
wherein the distal pair of battery heat exchangers includes said first battery heat exchanger which is integrated with the electric heater;
wherein the distal pair of battery heat exchangers includes a second battery heat exchanger which is included in the array of parallel-arranged heat exchangers; and
wherein the first battery heat exchanger is connected to the second battery heat exchanger of the distal pair by a pair of connecting conduits connecting a pair of fluid openings of the first battery heat exchanger to a pair of fluid openings of the second battery heat exchanger.

14. The thermal management system according to claim 13, wherein one of the conduits of the sub-loop comprises a short circuit flow conduit which is connected between the connecting conduits between the first and second battery heat exchangers, such that the sub-loop further includes portions of the connecting conduits extending from the short circuit flow conduit to the fluid openings of the first battery heat exchanger; and
wherein the battery cooling/heating subsystem further comprises a secondary circulation pump provided in the sub-loop for circulating the second volume of the heat transfer fluid throughout the sub-loop.

15. The thermal management system according to claim 7, wherein one of the conduits of the sub-loop comprises a short circuit flow conduit which connects the inlet and the outlet of the internal fluid flow passage of the first battery heat exchanger;
wherein the battery cooling/heating subsystem further comprises a secondary valve provided in the branch conduit connected to the inlet or outlet of the first battery heat exchanger, and a secondary circulation pump provided in the sub-loop for circulating the second volume of the heat transfer fluid throughout the sub-loop;
wherein closing the secondary valve fluidically isolates the first battery heat exchanger from a primary circulation pump and the other battery heat exchangers of said plurality of battery heat exchangers, and opening the secondary valve fluidically connects the first battery heat exchanger to the primary circulation pump and the other battery heat exchangers of said plurality of battery heat exchangers;
wherein the battery cooling/heating subsystem further comprises a heat-generating component which is fluidically connected to the circulation loop to enable the heat transfer fluid in the circulation loop to extract heat from the heat-generating component; and
wherein the heat-generating component comprises one or more electric components of the vehicle selected from a group consisting of a electric drive motor, a system electronics, and an electric resistance heater, or a heat exchanger for extracting heat from one or more electric components of the vehicle selected from the group consisting of the electric drive motor, the system electronics, and an electric resistance heater.

16. The thermal management system according to claim 15, wherein the vehicle has a regenerative braking module which generates electrical energy;
wherein the heat-generating component comprises an electric resistance heater or a heat exchanger for extracting heat from an electric resistance heater; and
wherein the electric resistance heater is powered by the electrical energy generated by the regenerative braking module.

17. The thermal management system according to claim 1, wherein the first battery heat exchanger comprises:
(a) a first plate having an inner surface and an outer surface;
(b) a second plate having an inner surface and an outer surface, wherein the first and second plates are joined together with their inner surfaces in opposed facing relation to one another, and with portions of the inner surfaces being spaced apart from one another;

(c) a plurality of fluid flow passages adapted for flow of the heat transfer fluid, and located between the spaced apart portions of the inner surfaces of the first and second plates;

(d) an inlet port for supplying the heat transfer fluid to the plurality of fluid flow passages;

(e) an outlet port for discharging the heat transfer fluid from the plurality of fluid flow passages;

(f) an inlet manifold in fluid communication with the inlet port and the plurality of fluid flow passages, the inlet manifold defining a fluid distribution chamber in which the heat transfer fluid supplied through the inlet port is distributed to the plurality of fluid flow passages;

(g) an outlet manifold in fluid communication with the outlet port and the plurality of fluid flow passages, the outlet manifold defining a fluid collection chamber in which the heat transfer fluid discharged through the outlet port is collected from the plurality of fluid flow passages; and (h) an external heater support surface on which the electric heater is provided and having an area which is the same as the area of the electric heater, wherein the external heater support surface is directly opposite to an internal surface of the first battery heat exchanger which at least partly defines one or both of the inlet manifold and the outlet manifold.

18. The thermal management system according to claim 17, wherein the inlet and outlet manifolds of the first battery heat exchanger are at least partly located between the first and second plates, at ends of the fluid flow passages.

19. The thermal management system according to claim 17, wherein the first battery heat exchanger comprises a cold plate adapted to support one or more battery cells on the outer surface of the first plate.

20. The thermal management system according to claim 17, wherein the external heater support surface and the electric heater of the first battery heat exchanger are provided on the outer surface of the second plate or on the outer surface of the first plate.

21. The thermal management system according to claim 17, wherein the external heater support surface of the first battery heat exchanger is directly opposite to an internal surface of the first battery heat exchanger which at least partly defines the fluid flow passages.

22. The thermal management system according to claim 17, wherein the first battery heat exchanger further comprises a first manifold cover sealingly joined to the outer surface of the first plate and enclosing a first external manifold chamber which at least partially defines the inlet manifold or the outlet manifold of the first battery heat exchanger;

wherein the first manifold cover is elongate and extends transversely across at least a portion of the first plate;

wherein the inlet port or the outlet port is provided in the first manifold cover; and wherein the first manifold cover has a flat outer surface which defines the external heater support surface on which the electric heater is provided.

23. The thermal management system according to claim 22, wherein the first battery heat exchanger further comprises a second manifold cover sealingly joined to the outer surface of the first plate and enclosing a second external manifold chamber which at least partially defines the inlet manifold or the outlet manifold of the first battery heat exchanger;

wherein the second manifold cover is elongate and extends transversely across at least a portion of the first plate;

wherein the inlet port or the outlet port is provided in the second manifold cover; and wherein the second manifold cover has a flat outer surface which optionally defines a second said external heater support surface on which a second said electric heater is provided.

24. The thermal management system according to claim 17, wherein the first battery heat exchanger further comprises a short-circuit flow conduit having first and second ends, and provided between the inlet port and the outlet port to permit short-circuit recirculating flow directly between the inlet and outlet ports; and wherein a secondary circulation pump is provided between the first and second ends of the short-circuit flow conduit, the secondary circulation pump being adapted for pumping a volume of heat transfer fluid contained within the first battery heat exchanger, the secondary circulation pump having an inlet which is connected to the outlet manifold through the short-circuit flow conduit, and an outlet which is connected to the inlet manifold through the short-circuit flow conduit.

25. The thermal management system according to claim 17, wherein the first battery heat exchanger further comprises first and second manifold covers sealingly joined to the outer surface of the first plate and respectively enclosing first and second external manifold chambers, each of which at least partially defines the inlet manifold or the outlet manifold of the first battery heat exchanger;

wherein the first and second manifold covers are elongate and extend transversely across at least a portion of the first plate;

wherein the inlet and outlet ports are provided in the first and second manifold covers and are located side-by-side, proximate to ends of the manifold covers and to a longitudinal edge of the first battery heat exchanger; and wherein the inlet and outlet ports are provided with tubular fittings having extensions which project outwardly beyond an outer edge of the first battery heat exchanger and are adapted for connection to the conduits of the circulation loop.

26. The thermal management system according to claim 25, wherein a first end of a short-circuit flow conduit is connected to the tubular fitting extending from the inlet port, and the second end of the short-circuit flow conduit is connected to the tubular fitting extending from the outlet port; and wherein a secondary circulation pump is located outwardly of the longitudinal edge of the first battery heat exchanger.

27. The thermal management system according to claim 26, further comprising a short-circuit flow control valve adapted to alternately prevent and allow flow between the inlet port and/or the outlet port and the conduits of the circulation loop.

28. The thermal management system according to claim 17, wherein the first battery heat exchanger further comprises first and second manifold covers sealingly joined to the outer surface of the first plate and respectively enclosing first and second external manifold chambers, each of which at least partially defines the inlet manifold or the outlet manifold of the first battery heat exchanger;

wherein the first and second manifold covers are elongate and extend transversely across at least a portion of the first plate;

wherein the first and second manifold covers form part of an integrated manifold cover structure in which the first and second external manifold chambers are separated by a dividing rib;

wherein a short-circuit flow conduit extends directly between the first and second manifold covers to directly connect the first external manifold chamber and the second external manifold chamber; and wherein a secondary circulation pump is housed inside a pump chamber provided between the first and second ends of the short-circuit flow conduit.

29. The thermal management system according to claim 17, wherein the plurality of battery heat exchangers are connected together in series, wherein the inlet port of at least one of the heat exchangers is joined to an outlet opening of an adjacent one of the heat exchangers.

30. The thermal management system according to claim 1, wherein the plurality of rechargeable battery units comprises a plurality of battery cells and the plurality of battery heat exchangers comprises a plurality of ICE plate heat exchangers;

wherein one or more of the ICE plate heat exchangers are received between adjacent battery cells;

wherein the plurality of rechargeable battery units further comprises a support structure for supporting the plurality of ICE plate heat exchangers and the plurality of battery cells; and wherein the support structure includes fluid flow passages for supplying heat transfer fluid to the ICE plate heat exchangers and discharging the heat transfer fluid from the ICE plate heat exchangers, and wherein the fluid flow passages of the support structure are located under the plurality of ICE plate heat exchangers and the plurality of battery cells in a base of the support structure.

31. The thermal management system according to claim 30, wherein the support structure includes a front end plate and a rear end plate, and wherein the front end plate includes inlet and outlet fittings through which the heat transfer fluid is supplied to and discharged from the fluid flow passages of the support structure;

wherein the rear end plate comprises an internal fluid flow passage providing flow communication between ends of the fluid flow passages of the support structure;

wherein the rear end plate further comprises a valve to alternately block and permit flow through the internal fluid flow passage; and wherein the external heater support surface and the electric heater are provided on an outer surface of the rear end plate.

32. The thermal management system according to claim 31, further comprising a short-circuit flow conduit having first and second ends, and provided between the inlet port and the outlet port to permit short-circuit recirculating flow directly between the inlet and outlet fittings;

wherein a secondary circulation pump is provided between the first and second ends of the short-circuit flow conduit, the secondary circulation pump being adapted for pumping a volume of heat transfer fluid contained within the plurality of rechargeable battery units, the secondary circulation pump having an inlet which is connected to the outlet fitting through the short-circuit flow conduit, and an outlet which is connected to the inlet fitting through the short-circuit flow conduit.

33. The thermal management system according to claim 31, wherein the external heater support surface and the electric heater are provided on an outer surface of a saddle heater which is provided on an underside of the base portion of the support structure, in close proximity to the fluid flow passages of the support structure;

wherein the saddle heater comprises a metal plate having an upper surface and a lower surface, wherein the lower surface defines the external heater support surface on which the electric heater is provided; and wherein the metal plate and/or the electric heater extends along part or all of a length of the plurality of rechargeable battery units.

34. The thermal management system according to claim 33, wherein the saddle heater further comprises one or more heat conducting fins projecting upwardly from the upper surface and adapted to extend between the battery cells and/or the ICE plate heat exchangers of the plurality of rechargeable battery units.

* * * * *